United States Patent
Nudd et al.

(10) Patent No.: US 7,551,780 B2
(45) Date of Patent: Jun. 23, 2009

(54) SYSTEM AND METHOD FOR USING INDIVIDUALIZED MIXED DOCUMENT

(75) Inventors: Geoffrey H. Nudd, San Francisco, CA (US); Stephen Weyl, Los Altos Hills, CA (US); Jamey Graham, San Jose, CA (US); Berna Erol, San Jose, CA (US); Peter E. Hart, Menlo Park, CA (US); Jonathan J. Hull, San Carlos, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 11/461,090

(22) Filed: Jul. 31, 2006

(65) Prior Publication Data

US 2007/0165904 A1 Jul. 19, 2007

Related U.S. Application Data

(60) Provisional application No. 60/807,654, filed on Jul. 18, 2006, provisional application No. 60/792,912, filed on Apr. 17, 2006, provisional application No. 60/710,767, filed on Aug. 23, 2005.

(51) Int. Cl.
*G06K 9/46* (2006.01)
(52) U.S. Cl. .................. 382/190; 382/305; 705/25; 709/246; 709/217; 709/224; 715/863; 348/211.2
(58) Field of Classification Search .................. 382/190, 382/305; 705/25; 709/246, 217, 224; 715/863; 348/211.2
See application file for complete search history.

(56) References Cited

U.S. PATENT DOCUMENTS

| | | |
|---|---|---|
| 1,915,993 A | 6/1933 | Handel |
| 5,109,439 A | 4/1992 | Froessl |
| 5,432,864 A | 7/1995 | Lu et al. |
| 5,465,353 A | 11/1995 | Hull et al. |

(Continued)

FOREIGN PATENT DOCUMENTS

EP 0706283 A 4/1996

(Continued)

OTHER PUBLICATIONS

Esposito, F. et al., "Machine Learning Methods for Automatically Processing Historical Documents: From Paper Acquisition to XML Transformation," Proceedings of the First International Workshop on Document Image Analysis for Libraries (DIAL '04), IEEE, 2004, pp. 1-8.

(Continued)

*Primary Examiner*—Brian Q Le
*Assistant Examiner*—Aklilu K Woldemariam
(74) *Attorney, Agent, or Firm*—Fenwick & West LLP

(57) ABSTRACT

A Mixed Media Reality (MMR) system and associated techniques are disclosed. The MMR system provides mechanisms for forming a mixed media document that includes media of at least two types (e.g., printed paper as a first medium and digital content and/or web link as a second medium). In one particular embodiment, the mixed media document may also include hotspot images that uniquely identify a user associated with the mixed media document. Such individualized mixed media documents are used to identify users of the mixed media document, when orders for products or services are made using the mixed media documents through the MMR system.

20 Claims, 62 Drawing Sheets

U.S. PATENT DOCUMENTS

| | | | |
|---|---|---|---|
| 5,546,502 | A | 8/1996 | Hart et al. |
| 5,806,005 | A | 9/1998 | Hull et al. |
| 5,968,175 | A | 10/1999 | Morishita et al. |
| 5,999,915 | A | 12/1999 | Nahan et al. |
| 6,104,834 | A | 8/2000 | Hull |
| 6,138,129 | A | 10/2000 | Combs |
| 6,332,039 | B1 | 12/2001 | Bando et al. |
| 6,363,381 | B1 | 3/2002 | Lee et al. |
| 6,397,213 | B1 | 5/2002 | Cullen et al. |
| 6,408,257 | B1 | 6/2002 | Harrington et al. |
| 6,448,979 | B1 | 9/2002 | Schena et al. |
| 6,457,026 | B1 | 9/2002 | Graham et al. |
| 6,537,324 | B1 | 3/2003 | Tabata et al. |
| 6,574,644 | B2 | 6/2003 | Hsu et al. |
| 6,611,862 | B2 | 8/2003 | Reisman |
| 6,732,915 | B1 | 5/2004 | Nelson et al. |
| 6,753,883 | B2 | 6/2004 | Schena et al. |
| 6,766,363 | B1 | 7/2004 | Rothschild |
| 6,804,659 | B1 | 10/2004 | Graham et al. |
| 6,824,057 | B2 | 11/2004 | Rathus et al. |
| 6,827,267 | B2 | 12/2004 | Rathus et al. |
| 6,830,187 | B2 | 12/2004 | Rathus et al. |
| 6,834,804 | B2 | 12/2004 | Rathus et al. |
| 6,842,755 | B2 | 1/2005 | Maslov |
| 6,843,411 | B2 | 1/2005 | Rathus et al. |
| 6,866,196 | B1 | 3/2005 | Rathus et al. |
| 6,929,182 | B2 | 8/2005 | Rathus et al. |
| 6,940,491 | B2 | 9/2005 | Incertis Carro |
| 6,963,358 | B2 | 11/2005 | Cohen et al. |
| 6,964,374 | B1 | 11/2005 | Djuknic et al. |
| 6,993,573 | B2 | 1/2006 | Hunter |
| 7,051,086 | B2 | 5/2006 | Rhoads et al. |
| 7,092,953 | B1 | 8/2006 | Haynes |
| 7,185,274 | B1 | 2/2007 | Rubin et al. |
| 7,206,820 | B1 | 4/2007 | Rhoads et al. |
| 7,232,057 | B2 | 6/2007 | Rathus et al. |
| 7,236,632 | B2 | 6/2007 | Erol et al. |
| 7,251,689 | B2 | 7/2007 | Wesley |
| 7,263,205 | B2 | 8/2007 | Lev |
| 7,305,435 | B2 | 12/2007 | Hamynen |
| 7,366,979 | B2 | 4/2008 | Spielberg et al. |
| 7,406,214 | B2 | 7/2008 | Rhoads et al. |
| 7,421,155 | B2 | 9/2008 | King et al. |
| 7,437,023 | B2 | 10/2008 | King et al. |
| 7,450,760 | B2 | 11/2008 | Molnar et al. |
| 2001/0011276 | A1 | 8/2001 | Durst Jr. et al. |
| 2001/0013546 | A1 | 8/2001 | Ross |
| 2001/0042030 | A1* | 11/2001 | Ito et al. ............ 705/27 |
| 2001/0043741 | A1 | 11/2001 | Mahoney et al. |
| 2002/0073236 | A1 | 6/2002 | Helgeson et al. |
| 2002/0102966 | A1 | 8/2002 | Lev et al. |
| 2002/0118379 | A1 | 8/2002 | Chakraborty et al. |
| 2002/0157028 | A1 | 10/2002 | Koue et al. |
| 2002/0191003 | A1* | 12/2002 | Hobgood et al. ............ 345/633 |
| 2002/0194264 | A1 | 12/2002 | Uchiyama et al. |
| 2003/0025714 | A1* | 2/2003 | Ebersole et al. ............ 345/632 |
| 2003/0110216 | A1 | 6/2003 | Althin |
| 2003/0121006 | A1 | 6/2003 | Tabata et al. |
| 2003/0152293 | A1 | 8/2003 | Bresler et al. |
| 2003/0193530 | A1 | 10/2003 | Blackman et al. |
| 2004/0017482 | A1 | 1/2004 | Weitman |
| 2004/0027604 | A1 | 2/2004 | Jeran et al. |
| 2004/0122811 | A1 | 6/2004 | Page |
| 2004/0133582 | A1* | 7/2004 | Howard et al. ............ 707/100 |
| 2004/0139391 | A1 | 7/2004 | Stumbo et al. |
| 2004/0238621 | A1 | 12/2004 | Beenau et al. |
| 2004/0243514 | A1 | 12/2004 | Wankmueller |
| 2004/0260680 | A1 | 12/2004 | Best et al. |
| 2005/0160115 | A1 | 7/2005 | Starkweather |
| 2005/0165747 | A1 | 7/2005 | Bargeron et al. |
| 2005/0182773 | A1 | 8/2005 | Feinsmith et al. |
| 2005/0185060 | A1 | 8/2005 | Neven |
| 2005/0185225 | A1 | 8/2005 | Brawn et al. |
| 2005/0198095 | A1 | 9/2005 | Du et al. |
| 2005/0288859 | A1 | 12/2005 | Golding et al. |
| 2005/0289447 | A1 | 12/2005 | Hadley et al. |
| 2006/0012677 | A1 | 1/2006 | Neven et al. |
| 2006/0026140 | A1 | 2/2006 | King et al. |
| 2006/0085477 | A1* | 4/2006 | Phillips et al. ............ 707/104.1 |
| 2006/0122884 | A1 | 6/2006 | Graham et al. |
| 2006/0122983 | A1 | 6/2006 | King et al. |
| 2006/0200480 | A1 | 9/2006 | Harris et al. |
| 2006/0240862 | A1 | 10/2006 | Neven et al. |
| 2006/0262352 | A1 | 11/2006 | Hull et al. |
| 2006/0262962 | A1 | 11/2006 | Hull et al. |
| 2006/0262976 | A1 | 11/2006 | Hart et al. |
| 2006/0285172 | A1 | 12/2006 | Hull et al. |
| 2006/0285772 | A1 | 12/2006 | Hull et al. |
| 2007/0233613 | A1 | 10/2007 | Barrus et al. |
| 2008/0071767 | A1 | 3/2008 | Grieselhuber et al. |

FOREIGN PATENT DOCUMENTS

| | | |
|---|---|---|
| EP | 1229496 A2 | 8/2002 |
| EP | 1555626 A | 7/2005 |
| EP | 1555626 A2 | 7/2005 |
| EP | 1662064 A1 | 5/2006 |
| JP | 10-228468 A | 8/1998 |
| JP | 2000-165645 A | 6/2000 |
| WO | WO 99/05658 A1 | 2/1999 |
| WO | WO 2004/072897 A2 | 8/2004 |
| WO | WO 2005/043270 A2 | 5/2005 |

OTHER PUBLICATIONS

Lu, Y. et al., "Document Retrieval from Compressed Images," Pattern Recognition, 2003, pp. 987-996, vol. 36.

"Call for Papers: ICAT 2007," 17th International Conference on Artificial Reality and Telexistence, 2007, [Online] [Retrieved on Nov. 4, 2008] Retrieved from the Internet<URL:http://www.idemployee.id.tue.nl/g.w.m.rauterberg/conferences/ICAT2007-CfP.pdf>.

European Search Report, European Application No. 06796845.3, Oct. 30, 2008, 12 pages.

European Search Report, European Application No. 06796844.6, Oct. 30, 2008, 12 pages.

European Search Report, European Application No. 06796848.7, Oct. 31, 2008, 12 pages.

European Search Report, European Application No. 06796846.1, Nov. 5, 2008, 11 pages.

European Search Report, European Application No. 08159971.4, Nov. 14, 2008, 7 pages.

European Search Report, European Application No. 08160115.5, Nov. 12, 2008, 7 pages.

European Search Report, European Application No. 08160130.4, Nov. 12, 2008, 7 pages.

European Search Report, European Application No. 08160112.2, Nov. 10, 2008, 7 pages.

Schalkoff, R.J., "Syntactic Pattern Recognition (SYNTPR) Overview," Pattern Recognition: Statistical, Structural and Neural Approaches, Jan. 1, 1992, pp. 127-150, vol. 3, Wiley.

Hull, J.J., "Document Image Similarity and Equivalence Detection," International Journal on Document Analysis and Recognition, 1998, pp. 37-42, vol. 1, Springer-Verlag.

Brassil, J. et al., "Hiding Information in Document Images," Proc. Conf. Information Sciences and Systems (CISS-95), Mar. 1995, Johns Hopkins University, Baltimore, MD, pp. 482-489.

Ho, T.K. et al., "Decision Combination in Multiple Classifier Systems," IEEE Transactions on Pattern Analysis and Machine Intelligence, Jan. 1994, pp. 66-75, vol. 16, No. 1.

Hull, J., "Document Image Skew Detection: Survey and Annotated Bibliography," Document Analysis Systems II, World Scientific, 1998, pp. 40-64.

Khoubyari, S. et al., "Font and Funct on Word Ident ficat on n Document Recogn t on," Computer Vision and Image Understanding, Jan. 1996, pp. 66-74, vol. 63, No. 1.

Kopec, G.E. et al., "Document Image Decoding Using Markov Source Models," IEEE Transactions on Pattern Analysis and Machine Intelligence, Jun. 1994, pp. 602-617, vol. 16, No. 6.

McDonald, G., "Third Voice: Invisible Web Graffiti," PC World, May 18, 1999, [online] [Retrieved on Nov. 14, 2006] Retrieved from the Internet<URL:http://www.pcworld.com/news/article/0,aid,11016,00.asp>.

PCT International Search Report and Written Opinion, PCT/JP2006/316810, Oct. 10, 2006, 9 pages.

PCT International Search Report and Written Opinion, PCT/JP2006/316811, Oct. 10, 2006, 9 pages.

PCT International Search Report and Written Opinion, PCT/JP2006/316812, Oct. 10, 2006, 9 pages.

PCT International Search Report and Written Opinion, PCT/JP2006/316814, Oct. 10, 2006, 11 pages.

U.S. Appl. No. 10/813,901, Mar. 30, 2004, Erol et al.

Aggarwal, M. et al., "On Cosine-fourth and Vignetting Effects in Real Lenses," ICCV Proceedings, IEEE, 2001, vol. 1, pp. 472-479, [Online] Retrieved from the Internet<URL:http://www.metaverselab.org/classis/635/reading/aggarwal-iccv.pdf>.

Akenine-Moller, T. et al., "Real-Time Rendering," A.K. Peters, Natick, MA, 2nd Edition, 2002, pp. 70-84.

Archive of "Barcodepedia.com —the online barcode database," [online] [Archived by http://archive.org on Jul. 9, 2006; Retrieved on Aug. 18, 2008] Retrieved from the Internet<http://web.archive.org/web/20060709101455/http://en.barcodepedia.com/>.

Archive of Scanbury Solutions | Optical Intelligence for your Mobile Devices, Scanbuy® Inc., www.scanbury.com/website/solutions_summary.htm, [Online] [Archived by http://archive.org on Jun. 19, 2006; Retrieved on Mar. 3, 2009] Retrieved from the Internet<URL:http://web.archive.org/web/20060619172549/http://www.scanbuy.com/website/solutions_su . . . >.

Baba, M. et al., "Shadow Removal from a Real Image Based on Shadow Density," Poster at SIGGRAPH2004, Updated Aug. 16, 2004, 4 pages, [online] Retrieved from the Internet<URL:http://www..cv.its.hiroshima-cu.ac.jp/baba/Shadow/poster04-02.pdf>.

Baird, H.S., "Document Image Defect Models and Their Uses," Proc., IAPR 2nd International Conference on Document Analysis and Recognition, Tsukuba Science City, Japan, Oct. 20-22, 1993, 7 pages.

Baird, H., "Document Image Defect Models," In Proc. Of IAPR Workshop on Syntactic and Structural Pattern Recognition, Murray Hill, NJ, Jun. 1990, Structured Document Image Analysis, Springer-Verlag, pp. 546-556.

Baird, H., "The State of the Art of Document Image Degradation Modeling," In Proc. Of the 4th IAPR International Workshop on Document Analysis Systems, Rio de Janeiro, Brazil, 2000, pp. 1-16, [online] Retrieved from the Internet<URL:http://www2.parc.xerox.com/istl/members/baird/das00.pas.gz>.

Barney Smith, E.H. et al., "Text Degradations and OCR Training," International Conference on Document Analysis and Recognition 2005, Seoul, Korea, Aug. 2005, 5 pages, [online] Retrieved from the Internet<URL:http://coen.boisestate.edu/EBarneySmith/Papers/ICDAR05_submit.pdf>.

Bouget, J., "Camera Calibration Toolbox for Matlab," Online Source, Updated Jul. 24, 2006, 6 pages, [online] Retrieved from the Internet<URL:http:www.vision.caltech.edu/bougetj/calib_doc/index.html#ref>.

Boukraa, M. et al., "Tag-Based Vision: Assisting 3D Scene Analysis with Radio-Frequency Tags," Jul. 8, 2002, Proceedings of the Fifth International Conference on Information Fusion, Piscataway, N.J., IEEE, Jul. 8-11, 2002, pp. 412-418.

Boyd, S., "EE263: Introduction to Linear Dynamical Systems," Online Lecture Notes, Stanford University, Spring Quarter, 2006-2007, Accessed on Sep. 11, 2006, 4 pages, [online] Retrieved from the Internet<URL:http://www.standford/edu/class/ee263/#lectures>.

Canny, J., "A Computational Approach To Edge Detection," IEEE Transactions on Pattern Analysis and Machine Intelligence, Nov. 1986, pp. 679-714, vol. PAMI-8, No. 6.

Constantini, R. et al., "Virtual Sensor Design," Proceedings of the SPIE, vol. 5301, 2004, pp. 408-419, Retrieved from the Internet<URL:http://ivrgwww.epfl.ch/publications/cs04.pdf>.

Cover, T.M. et al., "Nearest Neighbor Pattern Classification," IEEE Transactions on Information Theory, Jan. 1967, pp. 21-27, vol. IT-13, No. 1.

Davis, M. et al., "Towards Context-Aware Face Recognition," Proceedings of the 13th Annual ACM International Conference on Multimedia, Nov. 6-11, 2005, pp. 483-486, vol. 13.

Di Stefano, L. et al., "A Simple and Efficient Connected Components Labeling Algorithm," International Conference on Image Analysis and Processing, 1999, pp. 322-327.

Doermann, D. et al., "Progress in Camera-Based Document Image Analysis," Proceedings of the Seventh International Conference on Document Analysis and Recognition, ICDAR 2003, 11 pages, [online] Retrieved from the Internet<URL:http://www.cse.salford.ac.uk/prima/ICDAR2003/Papers/0111_keynote_III_doermann_d.pdf>.

Duda, R. O. et al., "Use Of The Hough Transformation To Detect Lines And Curves In Pictures," Communications of the ACM, Jan. 1972, pp. 11-15, vol. 15, No. 1.

Erol, B. et al., "Linking Multimedia Presentations with Their Symbolic Source Documents: Algorithm and Applications," Nov. 2-8, 2003, pp. 498-507, [Online] [Retrieved on Oct. 15, 2008] Retrieved from the Internet<URL:http://rii.ricoh.com/{hull/pubs/p225_erol.pdf>.

Erol, B. et al., "Prescient Paper: Multimedia Document Creation with Document Image Matching," $17^{th}$ International Conference on Pattern Recognition, Aug. 23-26, 2004, Cambridge, UK.

Erol, B. et al., "Retrieval of Presentation Recordings with Digital Camera Images," IEEE Conference on Computer Vision and Pattern Recognition, Jun. 27-Jul. 2, 2004.

European Partial Search Report, European Application No. EP07015093.3, Dec. 17, 2007, 7 pages.

European Search Report, European Application No. 08160125.4, Oct. 13, 2008, 5 pages.

Ezaki, N. et al., "Text Detection from Natural Scene Images: Towards A System For Visually Impaired Persons," Proc. of 17th Int. Conf. on Pattern Recognition (ICPR 2004), IEEE Computer Society, Aug. 23-26, 2004, Cambridge, UK, pp. 683-686, vol. II.

Fadoua, D. et al., "Restoring Ink Bleed-Through Degraded Document Images Using a Recursive Unsupervised Classification Technique," Lecture Notes in Computer Science 3872, Document Analysis Systems VII, $7^{th}$ International Workshop, DAS 2006, Feb. 13-15, 2006, Nelson, New Zealand, Bunke, H. et al. (eds.), pp. 38-49.

Freund, Y. et al., "A Short Introduction To Boosting," Journal of Japanese Society for Artificial Intelligence, Sep. 1999, pp. 771-780, vol. 14, No. 5.

Hjelmas, E. et al., "Face Detection: A Survey," Computer Vision and Image Understanding, 2001, pp. 236-274, vol. 83.

Ho, T.K. et al., "Evaluation of OCT Accuracy Using Synthetic Data," Proceedings of the 4th Annual Symposium on Document Analysis and Information Retrieval, Apr. 24-26, 1995, pp. 413-422. [online] Retrieved from the Internet<URL:http://citeseer.ist.psu.edu/cache/papers/cs/2303/http:zSzzSzcm.bell-labs.comzSzcmzSzcszSzwhozSzhsbzSzeoasd.pdf/ho95evaluation.pdf>.

Hull, J.J., "Document Image Matching and Retrieval with Multiple Distortion-Invariant Descriptors," International Association for Pattern Recognition Workshop on Document Analysis Systems, Jan. 1, 1995, pp. 375-396.

Hull, J.J. et al., "Document Image Matching Techniques," Apr. 30, 1997, pp. 31-35, [Online] [Retrieved on May 2, 1997] Retrieved from the Internet<URL:http://rii.ricoch.com/hull/pubs/hull_sdiut97.pdf>.

Hull, J.J., "Document Image Matching on CCITT Group 4 Compressed Images," SPIE Conference on Document Recognition IV, Feb. 8, 1997, pp. 82-87.

Hull, J.J. et al., "Paper-Based Augmented Reality," 17th International Conference on Artificial Reality and Telexistence, Nov. 1, 2007, pp. 205-209.

Jagannathan, L. et al., Perspective Correction Methods For Camera Based Document Analysis, Proc. First Int. Workshop on Camera-based Document Analysis and Recognition, 2005, pp. 148-154.

Jain, A.K. et al., "An Introduction to Biometric Recognition," IEEE Transactions on Circuits and Systems for Video Technology, Jan. 2004, pp. 4-20, vol. 14, No. 1.

Kanungo, T. et al., "A Downhill Simplex Algorithm for Estimating Morphological Degradation Model Parameters," University of Maryland Technical Report, LAMP-RT-066, Feb. 2001, 15 pages, [online] Retrieved from the Internet<URL:http://lampsrv01.umiacs.umd.edu/pubs/TechReports/LAMP_066/LAMP_066.pdf>.

Kanungo, T. et al., "Global and Local Document Degradation Models," Document Analysis and Recognition, 1993, Proceedings of the Second International Conference on Volume, Oct. 20-22, 1993, pp. 730-734.

Khoubyari, S. et al., "Keyword Location and Noisy Document Images," Second Annual Symposium on Document Analysis and Information Retrieval, Las Vegas, NV, Apr. 26-28, 1993, pp. 217-231.

Li, Y. et al., "Validation of Image Defect Models for Optical Character Recognition," IEEE Trans. Pattern Anal. Mach. Intell. 18, 2, Feb. 1996, pp. 99-108, [online] Retrieved from the Internet<URL:http://www.cs.cmu.edu/afs/cs/usr/andrewt/papers/Validate/journal.ps.gz>.

Liang, J. et al., "Flattening Curved Documents in Images," In Proc. Of the IEEE Conf. on Computer Vision and Pattern Recognition (CVPR), 2005, 8 pages, [online] Retrieved from the Internet<URL:http://www.cfar.umd.edu/~daniel/daniel_papersfordownload/liang-j_cpvr2005.pdf>.

Microsoft Computer Dictionary, 5th ed., "Hyperlink" Definition, 2002, pp. 260-261.

"Mobile Search Engines," Sonera MediaLab, Nov. 15, 2002, pp. 1-12.

"Mobile Video Managed Service," Vidiator, 2008, [online] [Retrieved on Aug. 29, 2008] Retrieved from the Internet<URL:http://www.vidiator.com/services/managed_managed_mobile_video.aspx>.

Mukherjea, S. et al., "AMORE: A World Wide Web Image Retrieval Engine," C&C Research Laboratories, NEC USA Inc., Baltzer Science Publishers BV, World Wide Web 2, 1999, pp. 115-132.

Pavlidis, T., "Effects of Distortions on the Recognition Rate of a Structural OCR System," In Pro. Conf. on Comp. Vision and Pattern Recog., IEEE, Washington, DC, 1983, pp. 303-309.

Po, L-M. et al., "A Novel Four-Step Search Algorithm for Fast Block Motion Estimation," IEEE Transactions on Circuits and Systems for Video Technology, Jun. 1996, pp. 313-317, vol. 6, Issue 3.

Rangarajan, K. et al. "Optimal Corner Detector," 1988, IEEE, pp. 90-94.

Rosin, P.L. et al., "Image Difference Threshold Strategies And Shadow Detection," Proceedings of the 6$^{th}$ British Machine Vision Conference, 1995, 10 pages.

Sato, T. et al., "High Resolution Video Mosaicing for Documents and Photos by Estimating Camera Motion," Proceedings of the SPIE 5299, 246, 2004, 8 pages, [online] Retrieved from the Internet<URL:http://yokoya.naist.jp/paper/datas/711/spie2004.pdf>.

Sezgin, M. et al., "Survey Over Image Thresholding Techniques And Quantitive Performance Evaluation," Journal of Electronic Imaging, Jan. 2004, pp. 146-165, vol. 13, No. 1.

Sivic, J. et al., "Video Google: A Text Retrieval Approach to Object Matching in Videos," Proceedings of the Ninth IEEE International Conference on Computer Vision (ICCV 2003), 2-Volume Set, 2003, IEEE, pp. 1-8.

Stoyanov, D., "Camera Calibration Tools," Online Source, Updated Aug. 24, 2006, Accessed Aug. 31, 2006, 12 pages, [online] Retrieved from the Intervet<URL:http://ubimon.doc.ic.ac.uk/dvs/index.php?m=581>.

Triantafyllidis, G.A. et al., "Detection Of Blocking Artifacts Of Compressed Still Images," Proceedings of the 11$^{th}$ International Conference on Image Analysis and Processing (ICIAP '01), IEEE, 2001, pp. 1-5.

U.S. Appl. No. 10/696,735, filed Oct. 28, 2003, Erol, B. et al., "Techniques for Using a Captured Image for the Retrieval of Recorded Information," 58 pages.

Veltkamp, R. et al., "Content-Based Image Retrieval Systems: A Survey," Department of Computing Science, Utrecht University, Oct. 28, 2002, pp. 1-62.

Wikipedia Online Definition, "Optical Character Recognition," Sep. 14, 2008, pp. 1-7, [Online] [Retrieved on Sep. 14, 2008] Retrieved from the Internet<URL:http://en.wikipedia.org/wiki/Optical_character_recognition>.

Wikipedia Online Encyclopedia, "Automatic Identification and Data Capture," Jul. 21, 2008, pp. 1-2, [Online] [Retrieved on Sep. 27, 2008] Retrieved from the Internet<URL:http://en.wikipedia.org/wiki/Automatic_identification_and_data_capture>.

Zanibbi, R. et al. "A Survey Of Table Recognition," International Journal on Document Analysis and Recognition, 2004, pp. 1-33.

Zhang, Z., "A Flexible New Technique for Camera Calibration," IEEE Transactions on Pattern Analysis and Machine Intelligence, Nov. 2000, pp. 1330-1334, vol. 22, No. 11.

Zhao, W. et al., Face Recognition: A Literature Survey, ACM Computing Surveys (CSUR), 2003, pp. 399-458, vol. 35, No. 4.

Zheng, Q.-F. et al., "Effective and Efficient Object-Based Image Retrieval Using Visual Phases," Proceedings of the 14th Annual ACM International Conference on Multimedia, MM'06, Oct. 23-27, 2006, Santa Barbara, CA, pp. 77-80.

Zi, G., "Groundtruth Generation and Document Imagep Degradation," University of Maryland Language and Media Processing Laboratory Technical report (LAMP-TR-121), May 2005, 72 pages, [online] Retrieved from the Internet<URL:http://lampsrv01.umiacs.umd.edu/pubs/TechReports/LAMP_121/LAMP_121.pdf>.

* cited by examiner

```
<html>
Get the greatest copiers
<a
href=http://www.ricoh.com>here.
</a>
</html>
```
3910
3920

Fig. 39A

```
<BODY style="TEXT-DECORATION: none">
Get the greatest copiers

<SPAN>

<SPAN style="FONT-SIZE: 1px;
            COLOR: blue;
            FONT-FAMILY: 'MMR Courier New'">b0</SPAN>

<A style="TEXT-DECORATION: none"
    href="http://www.ricoh.com/">here.</A>

<SPAN style="FONT-SIZE: 1px;
            COLOR: blue;
            FONT-FAMILY: 'MMR Courier New'">e0</SPAN>

</SPAN> </BODY>
```
3950
3960
3960

Fig. 39B

```
<?xml version="1.0" encoding="iso-8859-1" ?>
<hotspotlist>
        <hotspot>
                <id>0</id>
                <url><![CDATA[http://www.ricoh.com/]]></url>
        </hotspot>
</hotspotlist>
```

```
    <?xml version="1.0" encoding="iso-8859-1" ?>
    <hotspotlayout>
        <setup>
            <printcapfile>01150225563.xml</printcapfile>
            <printername>ricoh-lpr</printername>
            <documentname>
                <![CDATA[
                    file://C:\export_to_paper.htm
                ]]>
            </documentname>
            <prfile>01150225563.spool</prfile>
            <textfile>01150225563.txt</textfile>
            <app>IEXPLORE.EXE</app>
            <date>Tue Jun 13 12:06:08 2006</date>
            <dpix>600</dpix>
            <dpiy>600</dpiy>
            <resx>5100</resx>
            <resy>6600</resy>
            <width>8.5</width>
            <height>11</height>
            <imagescale>0.5</imagescale>
        </setup>

<hotspot box="1303 350 190 71">
                <id>0</id>
                <url>
                    <![CDATA[ http://www.ricoh.com/ ]]>
                </url>
            </hotspot>

</hotspotlayout>
```

```
<?xml version="1.0" encoding="iso-8859-1" ?>
  <doclayout ID="01150225563">
    <setup>
        <printername>ricoh-lpr</printername>
        <documentname>file://C:\export_to_paper.htm</documentname>
        <prfile>01150225563.spool</prfile>
        <textfile>01150225563.txt</textfile>
        <app>IEXPLORE.EXE</app>
        <date>Tue Jun 13 12:06:08 2006</date>
        <dpix>600</dpix>
        <dpiy>600</dpiy>
        <resx>5100</resx>
        <resy>6600</resy>
        <printable_resx>4860</printable_resx>
        <printable_resy>6360</printable_resy>
        <printable_offx>120</printable_offx>
        <printable_offy>120</printable_offy>
        <width>8.5</width>
        <height>11.0</height>
        <imagescale>0.50</imagescale>
    </setup>
       <image>01150225563_1.jpg</image>
    <sequence box="333 350 935 91">
       <text>Get the greatest copiers</text>
       <font>
            <face>Times New Roman</face>
            <height>114</height>
            <weight>400</weight>
            <italic>0</italic>
            <underlined>0</underlined>
            <type>0xf</type>
            <truetype>1</truetype>
            <points>12</points>
        </font>
       <word box="333 352 141 69">
          <text>Get</text>
              <char box="333 352 68 69">G</char>
              <char box="405 374 39 47">e</char>
              <char box="447 360 27 61">t</char>
          </word>
       <word box="500 350 119 71">
          <text>the</text>
              <char box="500 360 27 61">t</char>
              <char box="527 350 50 70">h</char>
              <char box="580 374 39 47">e</char>
          </word>
       <word box="648 360 309 81">
          <text>greatest</text>
              <char box="648 374 46 67">g</char>
              <char box="696 374 34 46">r</char>
              <char box="732 374 39 47">e</char>
              <char box="777 374 41 47">a</char>
              <char box="819 360 27 61">t</char>
              <char box="849 374 39 47">e</char>
              <char box="894 374 32 47">s</char>
              <char box="930 360 27 61">t</char>
          </word>
       <word box="985 350 283 91">
          <text>copiers</text>
              <char box="985 374 38 47">c</char>
              <char box="1030 374 44 47">o</char>
              <char box="1076 374 48 67">p</char>
              <char box="1130 350 23 70">i</char>
              <char box="1157 374 39 47">e</char>
              <char box="1199 374 34 46">r</char>
```

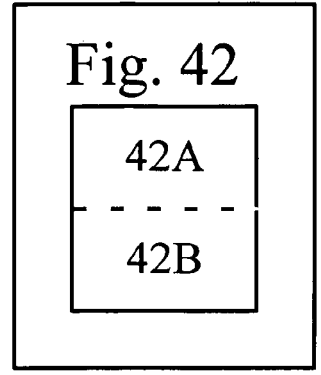

```
                <char box="1236 374 32 47">s</char>
            </word>
        </sequence>
        <sequence box="1296 418 4 1">
        <text>b0</text>
        <font>
                <face>MMR Courier New</face>
                <height>6</height>
                <weight>400</weight>
                <italic>0</italic>
                <underlined>0</underlined>
                <type>0xf</type>
                <truetype>1</truetype>
                <points>0</points>
        </font>
        <word box="1296 418 4 1">
           <text>b0</text>
                <char box="1296 418 1 1">b</char>
                <char box="1299 418 1 1">0</char>
        </word>
        </sequence>
        <sequence box="1303 350 190 71">
        <text>here.</text>
        <font>
                <face>Times New Roman</face>
                <height>114</height>
                <weight>400</weight>
                <italic>0</italic>
                <underlined>0</underlined>
                <type>0xf</type>
                <truetype>1</truetype>
                <points>12</points>
        </font>
        <word box="1303 350 169 71">
           <text>here</text>
                <char box="1303 350 50 70">h</char>
                <char box="1356 374 39 47">e</char>
                <char box="1397 374 34 46">r</char>
                <char box="1433 374 39 47">e</char>
        </word>
        <punctuation box="1482 410 11 11">
           <text>.</text>
                <char box="1482 410 11 11">.</char>
        </punctuation>
        </sequence>
        <sequence box="1500 418 4 1">
        <text>e0</text>
        <font>
                <face>MMR Courier New</face>
                <height>6</height>
                <weight>400</weight>
                <italic>0</italic>
                <underlined>0</underlined>
                <type>0xf</type>
                <truetype>1</truetype>
                <points>0</points>
        </font>
        <word box="1500 418 4 1">
           <text>e0</text>
                <char box="1500 418 1 1">e</char>
                <char box="1503 418 1 1">0</char>
        </word>
        </sequence>
```

4230

4240

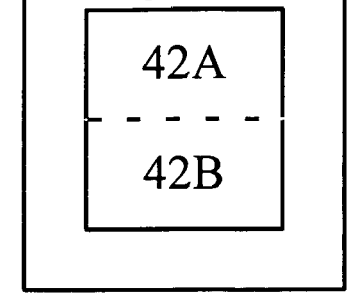

Fig. 42B http://www.jerrybuttergame.com — 4910

Jerry Butter Game

Troublemaker's Map
*Pigmole's secret spell cheats for this level*

To open the map, enter "I hereby declare my intention to cause mischief."

To close the map, enter "Trouble untroubled."

Fig. 49A http://www.jerrybuttergame.com — 4920

Jerry Butter Game

Troublemaker's Map
*Pigmole's secret spell cheats for this level*

To open the map, enter "I hereby declare my intention to cause mischief." — 4930

To close the map, enter "Trouble untroubled."

Video Clip 4940

Fig. 49B http://www.jerrybuttergame.com

Jerry Butter Game

<u>Troublemaker's Map</u>
*Pigmole's secret spell cheats for this level*

To open the map, enter "I hereby declare my intention to cause mischief."

To close the map, enter "Trouble untroubled."

Fig. 49C

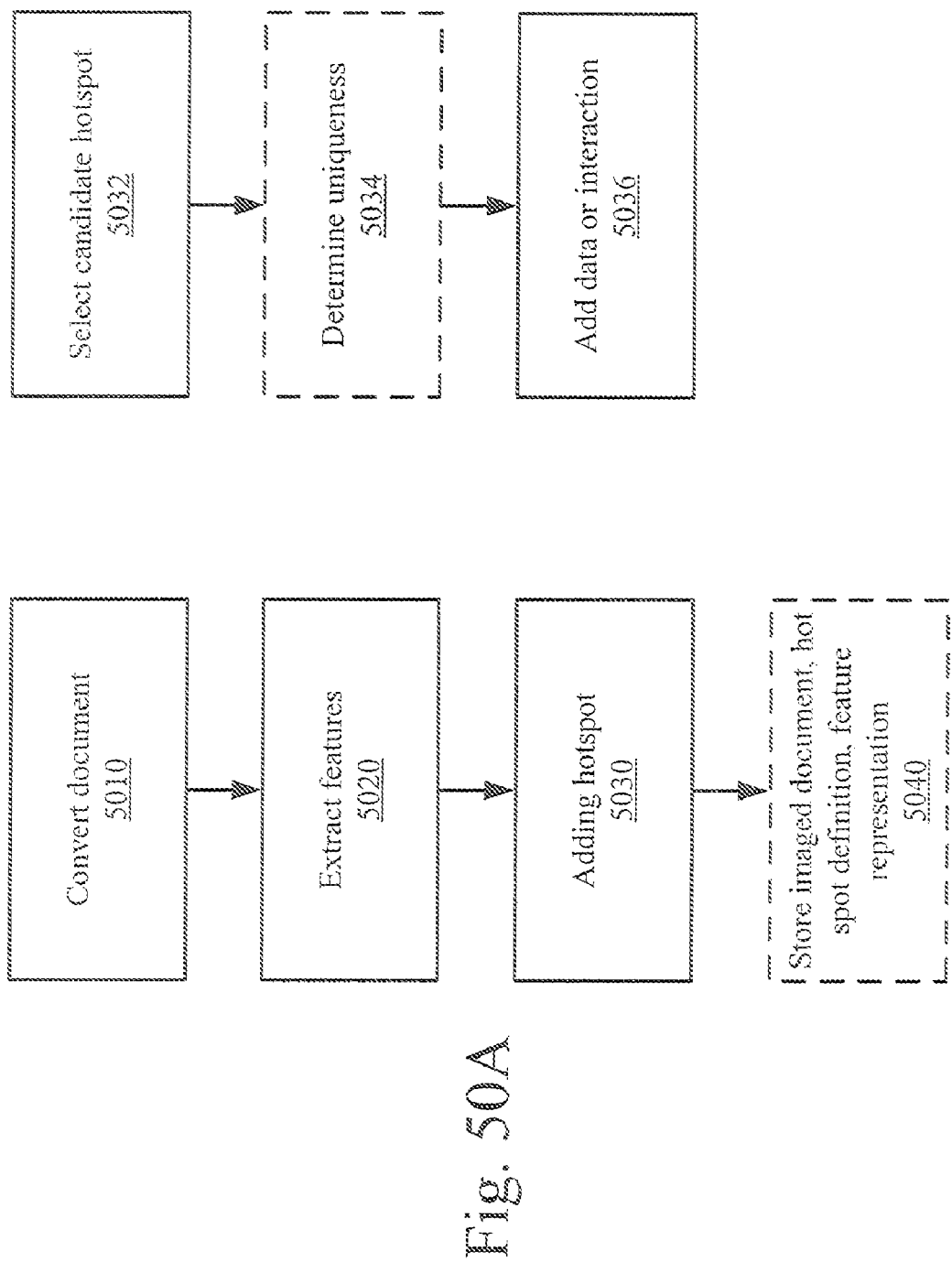

Fig. 51D

SYSTEM AND METHOD FOR USING INDIVIDUALIZED MIXED DOCUMENT

CROSS-REFERENCE TO RELATED APPLICATIONS

The present application claims priority, under 35 U.S.C. § 119(e), of: U.S. Provisional Patent Application No. 60/710,767, filed on Aug. 23, 2005 and entitled "Mixed Document Reality"; U.S. Provisional Patent Application No. 60/792,912, filed on Apr. 17, 2006 and entitled "Systems and Method for the Creation of a Mixed Document Environment"; and U.S. Provisional Patent Application No. 60/807,654, filed on Jul. 18, 2006 and entitled "Layout-Independent MMR Recognition", each of which are herein incorporated by reference in their entirety.

FIELD OF THE INVENTION

The invention relates to techniques for producing a mixed media document that is formed from at least two media types, and more particularly, to a Mixed Media Reality (MMR) system that uses printed media in combination with electronic media to produce mixed media documents.

BACKGROUND OF THE INVENTION

Document printing and copying technology has been used for many years in many contexts. By way of example, printers and copiers are used in private and commercial office environments, in home environments with personal computers, and in document printing and publishing service environments. However, printing and copying technology has not been thought of previously as a means to bridge the gap between static printed media (i.e., paper documents), and the "virtual world" of interactivity that includes the likes of digital communication, networking, information provision, advertising, entertainment, and electronic commerce.

Printed media has been the primary source of communicating information, such as news and advertising information, for centuries. The advent and ever-increasing popularity of personal computers and personal electronic devices, such as personal digital assistant (PDA) devices and cellular telephones (e.g., cellular camera phones), over the past few years has expanded the concept of printed media by making it available in an electronically readable and searchable form and by introducing interactive multimedia capabilities, which are unparalleled by traditional printed media.

Unfortunately, a gap exists between the virtual multimedia-based world that is accessible electronically and the physical world of print media. For example, although almost everyone in the developed world has access to printed media and to electronic information on a daily basis, users of printed media and of personal electronic devices do not possess the tools and technology required to form a link between the two (i.e., for facilitating a mixed media document).

Moreover, there are particular advantageous attributes that conventional printed media provides such as tactile feel, no power requirements, and permanency for organization and storage, which are not provided with virtual or digital media. Likewise, there are particular advantageous attributes that conventional digital media provides such as portability (e.g., carried in storage of cell phone or laptop) and ease of transmission (e.g., email).

For these reasons, a need exists for techniques that enable exploitation of the benefits associated with both printed and virtual media.

SUMMARY OF THE INVENTION

At least one aspect of one or more embodiments of the present invention provides a Mixed Media Reality (MMR) system and associated methods. The MMR system of the present invention provides mechanisms for forming a mixed media document that includes media of at least two types, such as printed paper as a first medium and text or data in electronic form, a digital picture, a digital photograph, digital movie, digital audio file, or web link as a second medium. Furthermore, the MMR system of the present invention facilitates business methods that take advantage of the combination of a portable electronic device, such as a cellular camera phone, and a paper document. The MMR system of the present invention includes an MMR processor, a capture device, a communication mechanism and a memory including MMR software. The MMR processor may also be coupled to a storage or source of media types, an input device and an output device. The MMR software includes routines executable by the MMR processor for accessing MMR documents with additional digital content, creating or modifying MMR documents, and using a document to perform other operations such business transactions, data queries, reporting, etc.

The present invention also includes a number of novel methods including: a method for creating a mixed media reality document, a method for using a mixed media reality document and a method for modifying or deleting a mixed media reality document.

In one embodiment of the present invention, the mixed media reality document is embedded with hotspot images that uniquely identify a user associated with the document as well as hotspots that identify the document. Such "MMR-individualized" documents are used to identify a user associated with the document and retrieve user information associated with the identity of the user.

One application of the MMR-individualized documents is in ordering goods or services. The hotspots can be used to identify a user and retrieve user information associated with the identified user. On-line order forms displayed on the user's capturing device may be pre-populated with the retrieved user information. Furthermore, processing information of the order can be tracked, and a calendar application running on the capturing device of the identified user may be updated to include up-to-date processing information corresponding to the order.

At least one other aspect of one or more embodiments of the present invention provide a machine-readable medium (e.g., one or more compact disks, diskettes, servers, memory sticks, or hard drives, ROMs, RAMs, or any type of media suitable for storing electronic instructions) encoded with instructions, that when executed by one or more processors, cause the processor to carry out a process for accessing information in a mixed media document system. This process can be, for example, similar to or a variation of the method described here.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIG. 39A illustrates an example of an HTML file in accordance with an embodiment of the present invention FIG. 39B illustrates an example of a marked-up version of the HTML file of FIG. 39A.

FIG. 41 illustrates a symbolic hotspot description in accordance with an embodiment of the present invention.

FIGS. 42A and 42B show an example page_desc.xml file for the HTML file of FIG. 39A, in accordance with an embodiment of the present invention.

FIG. 43 illustrates a hotspot.xml file corresponding to FIGS. 41, 42A, and 42B, in accordance with an embodiment of the present invention.

FIG. 49A illustrates a sample source web page in a browser according to an embodiment of the present invention.

FIG. 49B illustrates a sample modified web page in a browser according to an embodiment of the present invention.

FIG. 49C illustrates a sample printed web page according to an embodiment of the present invention.

FIG. 50A illustrates a flowchart of a method of adding a hotspot to an imaged document in accordance with an embodiment of the present invention.

FIG. 50B illustrates a flowchart of a method of defining a hotspot for addition to an imaged document in accordance with an embodiment of the present invention.

FIG. 51D illustrates a user interface for displaying hotspots within a document in accordance with an embodiment of the present invention.

DETAILED DESCRIPTION OF PREFERRED EMBODIMENTS

A Mixed Media Reality (MMR) system and associated methods are described. The MMR system provides mechanisms for forming a mixed media document that includes media of at least two types, such as printed paper as a first medium and a digital photograph, digital movie, digital audio file, digital text file, or web link as a second medium. The MMR system and/or techniques can be further used to facilitate various business models that take advantage of the combination of a portable electronic device (e.g., a PDA or cellular camera phone) and a paper document to provide mixed media documents.

In one particular embodiment, the MMR system includes a content-based retrieval database that represents two-dimensional geometric relationships between objects extracted from a printed document in a way that allows look-up using a text-based index. Evidence accumulation techniques combine the frequency of occurrence of a feature with the likelihood of its location in a two-dimensional zone. In one such embodiment, an MMR database system includes an index table that receives a description computed by an MMR feature extraction algorithm. The index table identifies the documents, pages, and x-y locations within those pages where each feature occurs. An evidence accumulation algorithm computes a ranked set of document, page and location hypotheses given the data from the index table. A relational database (or other suitable storage facility) can be used to store additional characteristics about each document, page, and location, as desired.

The MMR database system may include other components as well, such as an MMR processor, a capture device, a communication mechanism and a memory including MMR software. The MMR processor may also be coupled to a storage or source of media types, an input device and an output device. In one such configuration, the MMR software includes routines executable by the MMR processor for accessing MMR documents with additional digital content, creating or modifying MMR documents, and using a document to perform other operations such business transactions, data queries, reporting, etc.

MMR System Overview

Figure 1A:
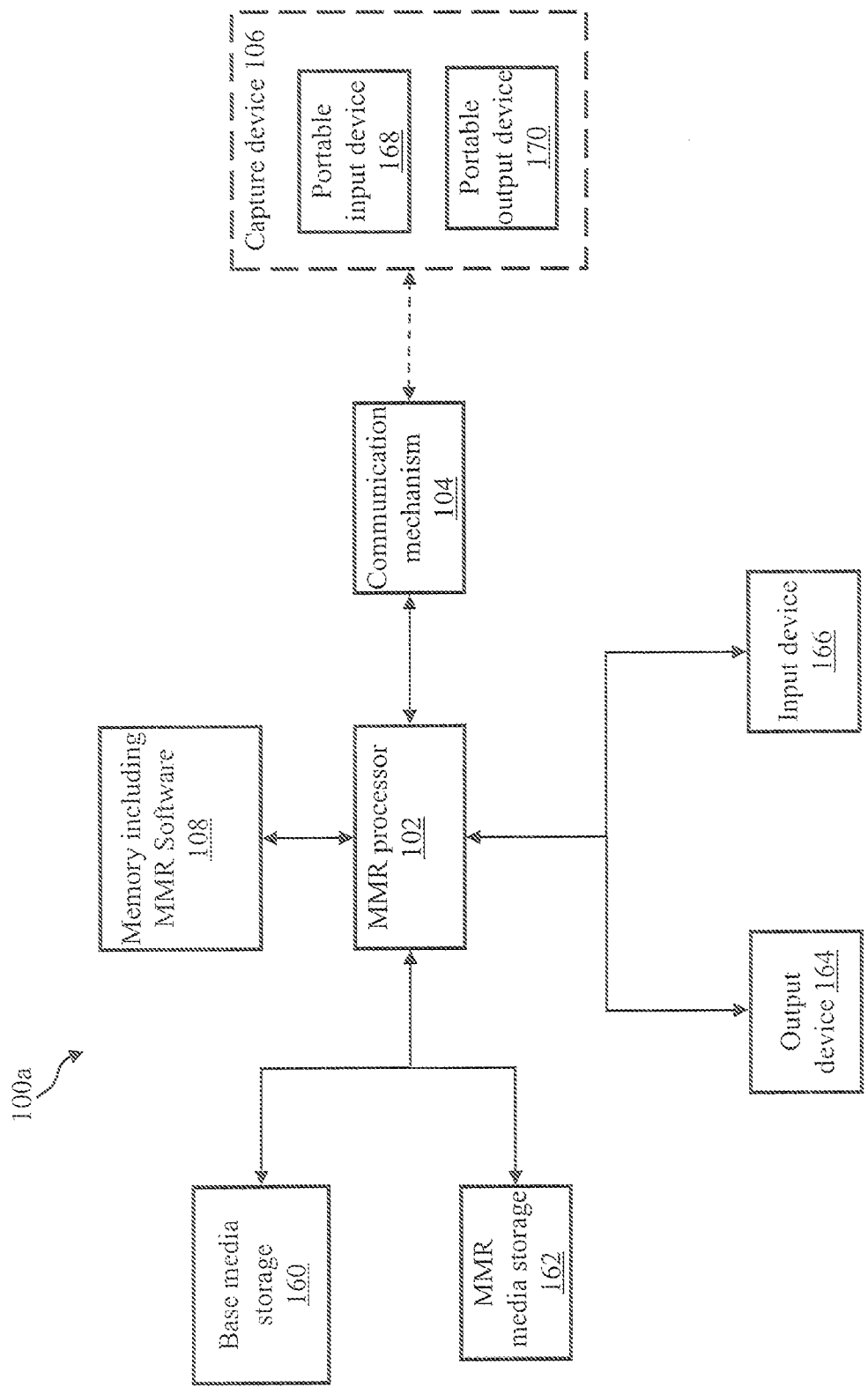
FIG. 1A illustrates a functional block diagram of a Mixed Media Reality (MMR) system configured in accordance with an embodiment of the present invention.

Referring now to FIG. 1A, a Mixed Media Reality (MMR) system 100a in accordance with an embodiment of the present invention is shown. The MMR system 100a comprises a MMR processor 102; a communication mechanism 104; a capture device 106 having a portable input device 168 and a portable output device 170; a memory including MMR software 108; a base media storage 160; an MMR media storage 162; an output device 164; and an input device 166. The MMR system 100a creates a mixed media environment by providing a way to use information from an existing printed document (a first media type) as an index to a second media type(s) such as audio, video, text, updated information and services.

The capture device 106 is able to generate a representation of a printed document (e.g., an image, drawing, or other such representation), and the representation is sent to the MMR processor 102. The MMR system 100a then matches the representation to an MMR document and other second media types. The MMR system 100a is also responsible for taking an action in response to input and recognition of a representation. The actions taken by the MMR system 100a can be any type including, for example, retrieving information, placing an order, retrieving a video or sound, storing information, creating a new document, printing a document, displaying a document or image, etc. By use of content-based retrieval database technology described herein, the MMR system 100a provides mechanisms that render printed text into a dynamic medium that provides an entry point to electronic content or services of interest or value to the user.

The MMR processor 102 processes data signals and may comprise various computing architectures including a complex instruction set computer (CISC) architecture, a reduced instruction set computer (RISC) architecture, or an architecture implementing a combination of instruction sets. In one particular embodiment, the MMR processor 102 comprises an arithmetic logic unit, a microprocessor, a general purpose computer, or some other information appliance equipped to perform the operations of the present invention. In another embodiment, MMR processor 102 comprises a general purpose computer having a graphical user interface, which may be generated by, for example, a program written in Java running on top of an operating system like WINDOWS or UNIX based operating systems. Although only a single processor is shown in FIG. 1A, multiple processors may be included. The processor is coupled to the MMR memory 108 and executes instructions stored therein.

The communication mechanism 104 is any device or system for coupling the capture device 106 to the MMR processor 102. For example, the communication mechanism 104 can be implemented using a network (e.g., WAN and/or LAN), a wired link (e.g., USB, RS232, or Ethernet), a wireless link (e.g., infrared, Bluetooth, or 802.11), a mobile device communication link (e.g., GPRS or GSM), a public switched telephone network (PSTN) link, or any combination of these. Numerous communication architectures and protocols can be used here.

The capture device 106 includes a means such as a transceiver to interface with the communication mechanism 104, and is any device that is capable of capturing an image or data digitally via an input device 168. The capture device 106 can optionally include an output device 170 and is optionally portable. For example, the capture device 106 is a standard cellular camera phone; a PDA device; a digital camera; a barcode reader; a radio frequency identification (RFID) reader; a computer peripheral, such as a standard webcam; or a built-in device, such as the video card of a PC. Several examples of capture devices 106a-d are described in more detail with reference to FIGS. 2A-2D, respectively. Additionally, capture device 106 may include a software application that enables content-based retrieval and that links capture device 106 to the infrastructure of MMR system 100a/100b. More functional details of capture device 106 are found in reference to FIG. 2E. Numerous conventional and customized capture devices 106, and their respective functionalities and architectures, will be apparent in light of this disclosure.

The memory 108 stores instructions and/or data that may be executed by processor 102. The instructions and/or data may comprise code for performing any and/or all of techniques described herein. The memory 108 may be a dynamic random access memory (DRAM) device, a static random access memory (SRAM) device, or any other suitable memory device. The memory 108 is described in more detail below with reference to FIG. 4. In one particular embodiment, the memory 108 includes the MMR software suite, an operating system and other application programs (e.g., word processing applications, electronic mail applications, financial applications, and web browser applications).

The base media storage 160 is for storing second media types in their original form, and MMR media storage 162 is for storing MMR documents, databases and other information as detailed herein to create the MMR environment. While shown as being separate, in another embodiment, the base media storage 160 and the MMR media storage 162 may be portions of the same storage device or otherwise integrated. The data storage 160, 162 further stores data and instructions for MMR processor 102 and comprises one or more devices including, for example, a hard disk drive, a floppy disk drive, a CD-ROM device, a DVD-ROM device, a DVD-RAM device, a DVD-RW device, a flash memory device, or any other suitable mass storage device.

The output device 164 is operatively coupled the MMR processor 102 and represents any device equipped to output data such as those that display, sound, or otherwise present content. For instance, the output device 164 can be any one of a variety of types such as a printer, a display device, and/or speakers. Example display output devices 164 include a cathode ray tube (CRT), liquid crystal display (LCD), or any other similarly equipped display device, screen, or monitor. In one embodiment, the output device 164 is equipped with a touch screen in which a touch-sensitive, transparent panel covers the screen of the output device 164.

The input device 166 is operatively coupled the MMR processor 102 and is any one of a variety of types such as a keyboard and cursor controller, a scanner, a multifunction printer, a still or video camera, a keypad, a touch screen, a detector, an RFID tag reader, a switch, or any mechanism that allows a user to interact with system 100a. In one embodiment the input device 166 is a keyboard and cursor controller. Cursor control may include, for example, a mouse, a trackball, a stylus, a pen, a touch screen and/or pad, cursor direction keys, or other mechanisms to cause movement of a cursor. In another embodiment, the input device 166 is a microphone, audio add-in/expansion card designed for use within a general purpose computer system, analog-to-digital converters, and digital signal processors to facilitate voice recognition and/or audio processing.

Figure 1B:
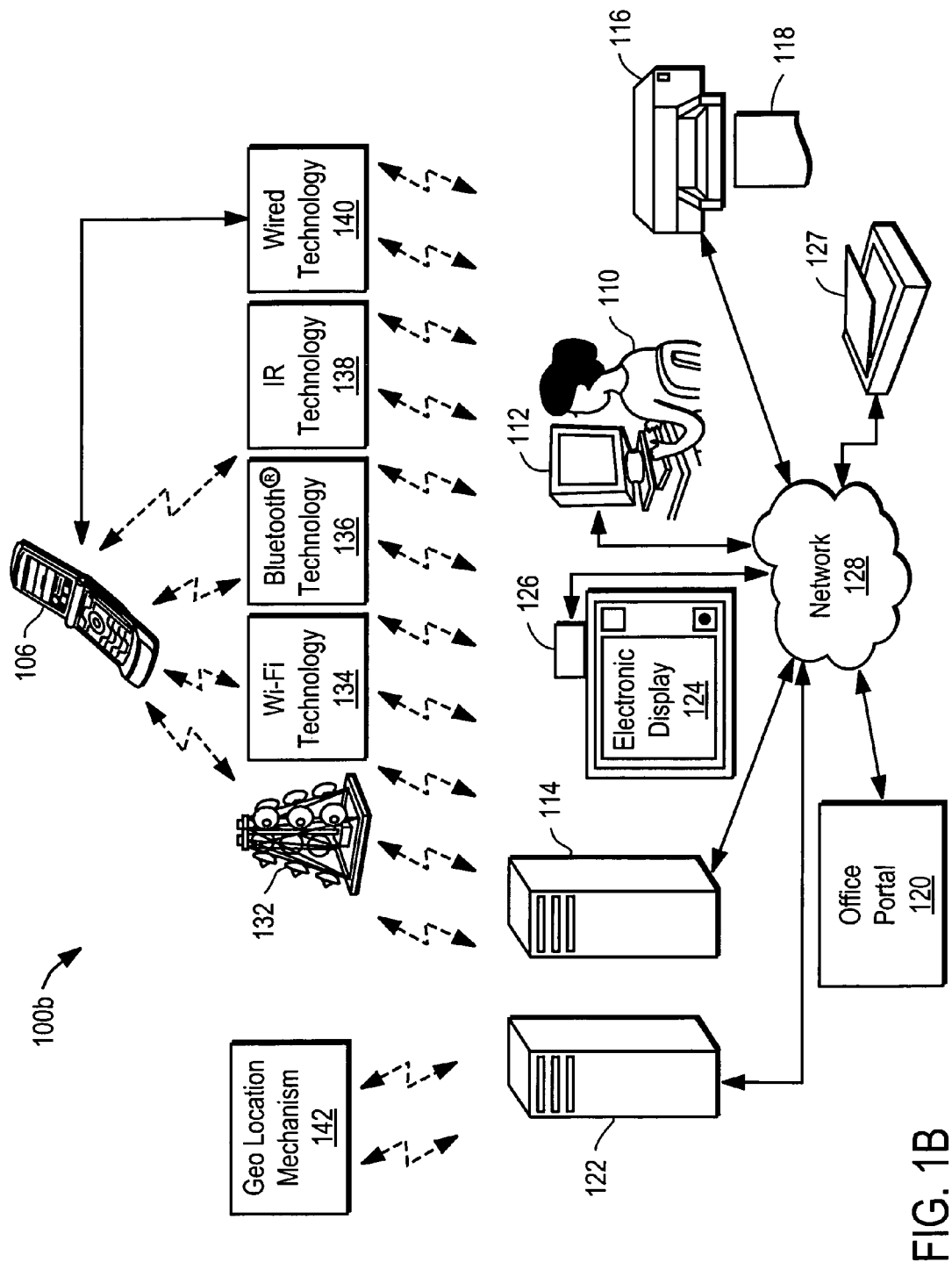
FIG. 1B illustrates a functional block diagram of an MMR system configured in accordance with another embodiment of the present invention.

FIG. 1B illustrates a functional block diagram of an MMR system 100b configured in accordance with another embodiment of the present invention. In this embodiment, the MMR system 100b includes a MMR computer 112 (operated by user 110), a networked media server 114, and a printer 116 that produces a printed document 118. The MMR system 100b further includes an office portal 120, a service provider server 122, an electronic display 124 that is electrically connected to a set-top box 126, and a document scanner 127. A communication link between the MMR computer 112, networked media server 114, printer 116, office portal 120, service provider server 122, set-top box 126, and document scanner 127 is provided via a network 128, which can be a LAN (e.g., office or home network), WAN (e.g., Internet or corporate network), LAN/WAN combination, or any other data path across which multiple computing devices may communicate.

The MMR system 100b further includes a capture device 106 that is capable of communicating wirelessly to one or more computers 112, networked media server 114, user printer 116, office portal 120, service provider server 122, electronic display 124, set-top box 126, and document scanner 127 via a cellular infrastructure 132, wireless fidelity (Wi-Fi) technology 134, Bluetooth technology 136, and/or infrared (IR) technology 138. Alternatively, or in addition to, capture device 106 is capable of communicating in a wired fashion to MMR computer 112, networked media server 114, user printer 116, office portal 120, service provider server 122, electronic display 124, set-top box 126, and document scanner 127 via wired technology 140. Although Wi-Fi technology 134, Bluetooth technology 136, IR technology 138, and wired technology 140 are shown as separate elements in FIG. 1B, such technology can be integrated into the processing environments (e.g., MMR computer 112, networked media server 114, capture device 106, etc) as well. Additionally, MMR system 100b further includes a geo location mechanism 142 that is in wireless or wired communication with the service provider server 122 or network 128. This could also be integrated into the capture device 106.

The MMR user 110 is any individual who is using MMR system 100b. MMR computer 112 is any desktop, laptop, networked computer, or other such processing environment. User printer 116 is any home, office, or commercial printer that can produce printed document 118, which is a paper document that is formed of one or more printed pages.

Networked media server 114 is a networked computer that holds information and/or applications to be accessed by users of MMR system 100b via network 128. In one particular embodiment, networked media server 114 is a centralized computer, upon which is stored a variety of media files, such as text source files, web pages, audio and/or video files, image files (e.g., still photos), and the like. Networked media server 114 is, for example, the Comcast Video-on-Demand servers of Comcast Corporation, the Ricoh Document Mall of Ricoh Innovations Inc., or the Google Image and/or Video servers of Google Inc. Generally stated, networked media server 114 provides access to any data that may be attached to, integrated with, or otherwise associated with printed document 118 via capture device 106.

Office portal 120 is an optional mechanism for capturing events that occur in the environment of MMR user 110, such as events that occur in the office of MMR user 110. Office portal 120 is, for example, a computer that is separate from MMR computer 112. In this case, office portal 120 is connected directly to MMR computer 112 or connected to MMR computer 112 via network 128. Alternatively, office portal 120 is built into MMR computer 112. For example, office portal 120 is constructed from a conventional personal computer (PC) and then augmented with the appropriate hardware that supports any associated capture devices 106. Office portal 120 may include capture devices, such as a video camera and an audio recorder. Additionally, office portal 120 may capture and store data from MMR computer 112. For example, office portal 120 is able to receive and monitor functions and events that occur on MMR computer 112. As a result, office portal 120 is able to record all audio and video in the physical environment of MMR user 110 and record all events that occur on MMR computer 112. In one particular embodiment, office portal 120 captures events, e.g., a video screen capture while a document is being edited, from MMR computer 112. In doing so, office portal 120 captures which websites that were browsed and other documents that were consulted while a given document was created. That information may be made available later to MMR user 110 through his/her MMR computer 112 or capture device 106. Additionally, office portal 120 may be used as the multimedia server for clips that users add to their documents. Furthermore, office portal 120 may capture other office events, such as conversations (e.g., telephone or in-office) that occur while paper documents are on a desktop, discussions on the phone, and small meetings in the office. A video camera (not shown) on office portal 120 may identify paper documents on the physical desktop of MMR user 110, by use of the same content-based retrieval technologies developed for capture device 106.

Service provider server 122 is any commercial server that holds information or applications that can be accessed by MMR user 110 of MMR system 100b via network 128. In particular, service provider server 122 is representative of any service provider that is associated with MMR system 100b. Service provider server 122 is, for example, but is not limited to, a commercial server of a cable TV provider, such as Comcast Corporation; a cell phone service provider, such as Verizon Wireless; an Internet service provider, such as Adelphia Communications; an online music service provider, such as Sony Corporation; and the like.

Electronic display 124 is any display device, such as, but not limited to, a standard analog or digital television (TV), a flat screen TV, a flat panel display, or a projection system. Set-top box 126 is a receiver device that processes an incoming signal from a satellite dish, aerial, cable, network, or telephone line, as is known. An example manufacturer of set-top boxes is Advanced Digital Broadcast. Set-top box 126 is electrically connected to the video input of electronic display 124.

Document scanner 127 is a commercially available document scanner device, such as the KV-S2026C full-color scanner, by Panasonic Corporation. Document scanner 127 is used in the conversion of existing printed documents into MMR-ready documents.

Cellular infrastructure 132 is representative of a plurality of cell towers and other cellular network interconnections. In particular, by use of cellular infrastructure 132, two-way voice and data communications are provided to handheld, portable, and car-mounted phones via wireless modems incorporated into devices, such as into capture device 106.

Wi-Fi technology 134, Bluetooth technology 136, and IR technology 138 are representative of technologies that facilitate wireless communication between electronic devices. Wi-Fi technology 134 is technology that is associated with wireless local area network (WLAN) products that are based on 802.11 standards, as is known. Bluetooth technology 136 is a telecommunications industry specification that describes how cellular phones, computers, and PDAs are interconnected by use of a short-range wireless connection, as is known. IR technology 138 allows electronic devices to communicate via short-range wireless signals. For example, IR technology 138 is a line-of-sight wireless communications medium used by television remote controls, laptop computers, PDAs, and other devices. IR technology 138 operates in the spectrum from mid-microwave to below visible light. Further, in one or more other embodiments, wireless communication may be supported using IEEE 802.15 (UWB) and/or 802.16 (WiMAX) standards.

Wired technology 140 is any wired communications mechanism, such as a standard Ethernet connection or universal serial bus (USB) connection. By use of cellular infrastructure 132, Wi-Fi technology 134, Bluetooth technology 136, IR technology 138, and/or wired technology 140, capture device 106 is able to communicate bi-directionally with any or all electronic devices of MMR system 100b.

Geo-location mechanism 142 is any mechanism suitable for determining geographic location. Geo-location mechanism 142 is, for example, GPS satellites which provide position data to terrestrial GPS receiver devices, as is known. In the example, embodiment shown in FIG. 1B, position data is provided by GPS satellites to users of MMR system 100b via service provider server 122 that is connected to network 128 in combination with a GPS receiver (not shown). Alternatively, geo-location mechanism 142 is a set of cell towers (e.g., a subset of cellular infrastructure 132) that provide a triangulation mechanism, cell tower identification (ID)

mechanism, and/or enhanced 911 service as a means to determine geographic location. Alternatively, geo-location mechanism 142 is provided by signal strength measurements from known locations of WiFi access points or BlueTooth devices.

In operation, capture device 106 serves as a client that is in the possession of MMR user 110. Software applications exist thereon that enable a content-based retrieval operation and links capture device 106 to the infrastructure of MMR system 100b via cellular infrastructure 132, Wi-Fi technology 134, Bluetooth technology 136, IR technology 138, and/or wired technology 140. Additionally, software applications exist on MMR computer 112 that perform several operations, such as but not limited to, a print capture operation, an event capture operation (e.g., save the edit history of a document), a server operation (e.g., data and events saved on MMR computer 112 for later serving to others), or a printer management operation (e.g., printer 116 may be set up to queue the data needed for MMR such as document layout and multimedia clips). Networked media server 114 provides access to the data attached to a printed document, such as printed document 118 that is printed via MMR computer 112, belonging to MMR user 110. In doing so, a second medium, such as video or audio, is associated with a first medium, such as a paper document. More details of the software applications and/or mechanisms for forming the association of a second medium to a first medium are described in reference to FIGS. 2E, 3, 4, and 5 below.

Capture Device

Figure 2B:
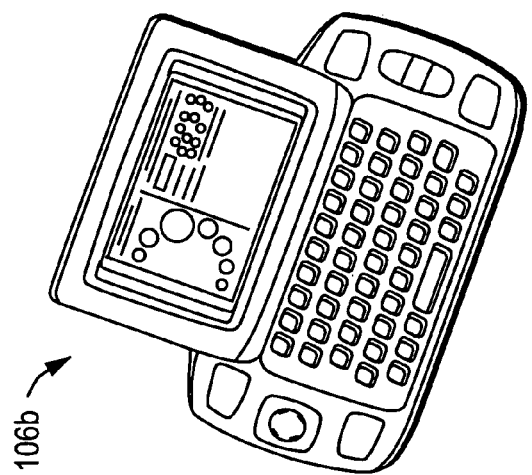
FIGS. 2A, 2B, 2C, and 2D illustrate capture devices in accordance with embodiments of the present invention.
Figure 2D:
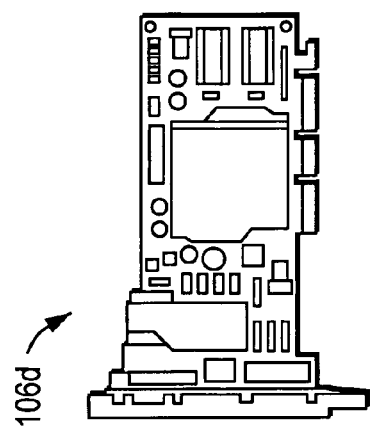
Figure 2A:
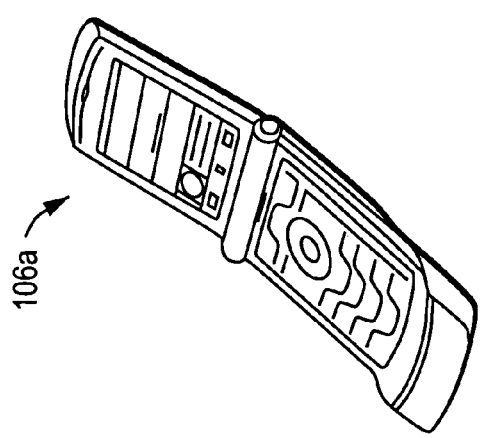
Figure 2C:
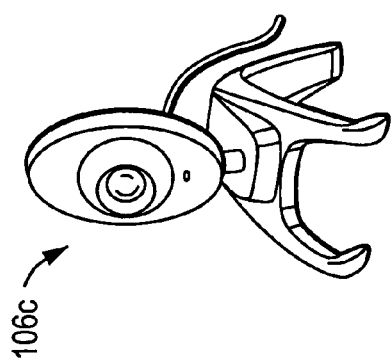

FIGS. 2A, 2B, 2C, and 2D illustrate example capture devices 106 in accordance with embodiments of the present invention. More specifically, FIG. 2A shows a capture device 106a that is a cellular camera phone. FIG. 2B shows a capture device 106b that is a PDA device. FIG. 2C shows a capture device 106c that is a computer peripheral device. One example of a computer peripheral device is any standard webcam. FIG. 2D shows a capture device 106d that is built into a computing device (e.g., such as MMR computer 112). For example, capture device 106d is a computer graphics card. Example details of capture device 106 are found in reference to FIG. 2E.

In the case of capture devices 106a and 106b, the capture device 106 may be in the possession of MMR user 110, and the physical location thereof may be tracked by geo location mechanism 142 or by the ID numbers of each cell tower within cellular infrastructure 132.

Figure 2E:
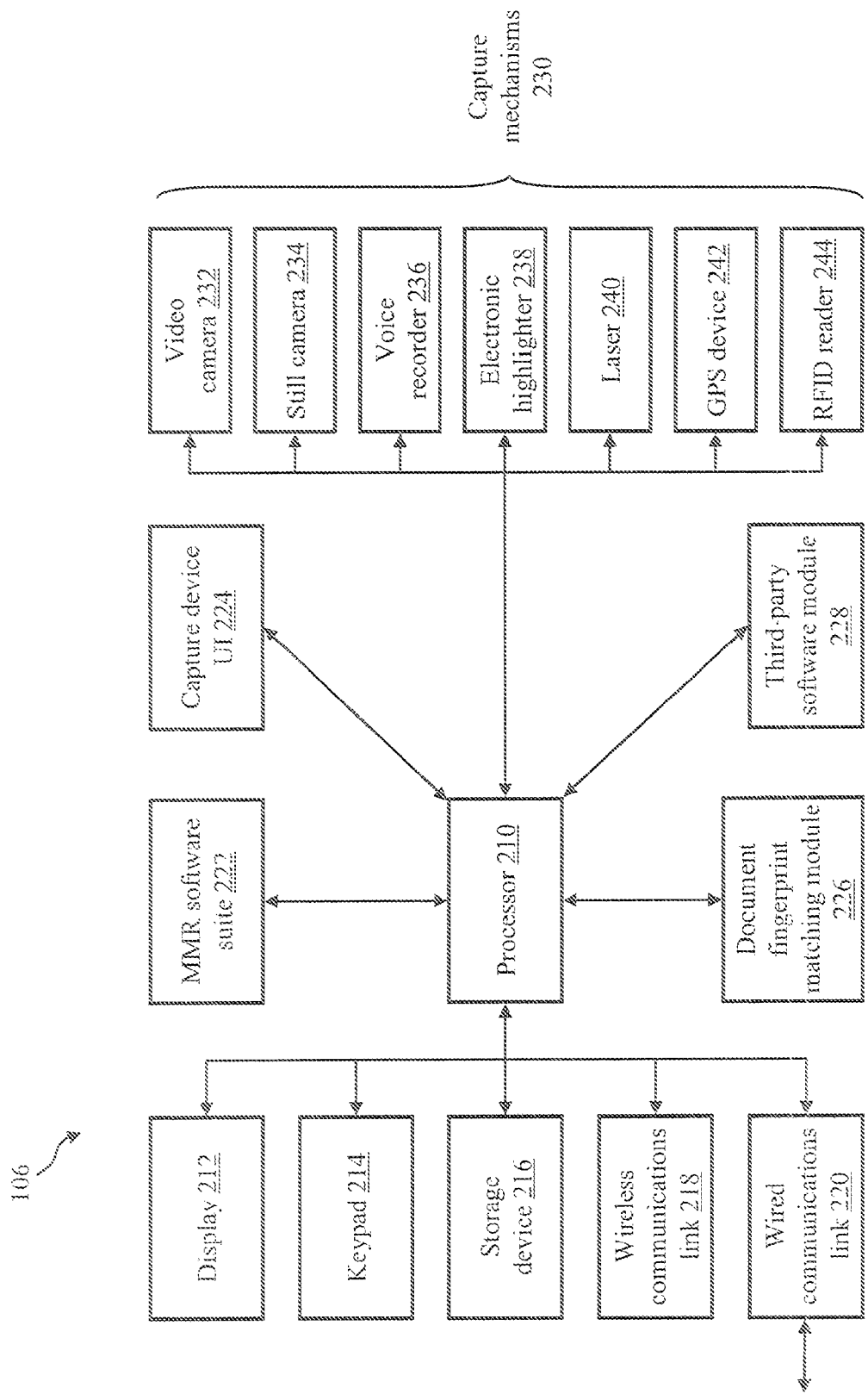
FIG. 2E illustrates a functional block diagram of a capture device configured in accordance with an embodiment of the present invention.

Referring now to FIG. 2E, a functional block diagram for one embodiment of the capture device 106 in accordance with the present invention is shown. The capture device 106 includes a processor 210, a display 212, a keypad 214, a storage device 216, a wireless communications link 218, a wired communications link 220, an MMR software suite 222, a capture device user interface (UI) 224, a document fingerprint matching module 226, a third-party software module 228, and at least one of a variety of capture mechanisms 230. Example capture mechanisms 230 include, but are not limited to, a video camera 232, a still camera 234, a voice recorder 236, an electronic highlighter 238, a laser 240, a GPS device 242, and an RFID reader 244.

Processor 210 is a central processing unit (CPU), such as, but not limited to, the Pentium microprocessor, manufactured by Intel Corporation. Display 212 is any standard video display mechanism, such those used in handheld electronic devices. More particularly, display 212 is, for example, any digital display, such as a liquid crystal display (LCD) or an organic light-emitting diode (OLED) display. Keypad 214 is any standard alphanumeric entry mechanism, such as a keypad that is used in standard computing devices and handheld electronic devices, such as cellular phones. Storage device 216 is any volatile or non-volatile memory device, such as a hard disk drive or a random access memory (RAM) device, as is well known.

Wireless communications link 218 is a wireless data communications mechanism that provides direct point-to-point communication or wireless communication via access points (not shown) and a LAN (e.g., IEEE 802.11 Wi-Fi or Bluetooth technology) as is well known. Wired communications link 220 is a wired data communications mechanism that provides direct communication, for example, via standard Ethernet and/or USB connections.

MMR software suite 222 is the overall management software that performs the MMR operations, such as merging one type of media with a second type. More details of MMR software suite 222 are found with reference to FIG. 4.

Capture device User Interface (UI) 224 is the user interface for operating capture device 106. By use of capture device UI 224, various menus are presented to MMR user 110 for the selection of functions thereon. More specifically, the menus of capture device UI 224 allow MMR user 110 to manage tasks, such as, but not limited to, interacting with paper documents, reading data from existing documents, writing data into existing documents, viewing and interacting with the augmented reality associated with those documents, and viewing and interacting with the augmented reality associated with documents displayed on his/her MMR computer 112.

The document fingerprint matching module 226 is a software module for extracting features from a text image captured via at least one capture mechanism 230 of capture device 106. The document fingerprint matching module 226 can also perform pattern matching between the captured image and a database of documents. At the most basic level, and in accordance with one embodiment, the document fingerprint matching module 226 determines the position of an image patch within a larger page image wherein that page image is selected from a large collection of documents. The document fingerprint matching module 226 includes routines or programs to receive captured data, to extract a representation of the image from the captured data, to perform patch recognition and motion analysis within documents, to perform decision combinations, and to output a list of x-y locations within pages where the input images are located. For example, the document fingerprint matching module 226 may be an algorithm that combines horizontal and vertical features that are extracted from an image of a fragment of text, in order to identify the document and the section within the document from which it was extracted. Once the features are extracted, a printed document index (not shown), which resides, for example, on MMR computer 112 or networked media server 114, is queried, in order to identify the symbolic document. Under the control of capture device UI 224, document fingerprint matching module 226 has access to the printed document index. The printed document index is described in more detail with reference to MMR computer 112 of FIG. 3. Note that in an alternate embodiment, the document fingerprint matching module 226 could be part of the MMR computer 112 and not located within the capture device 106. In such an embodiment, the capture device 106 sends raw captured data to the MMR computer 112 for image extraction, pattern matching, and document and position recognition. In yet another embodiment, the document fingerprint matching module 226 only performs feature extraction, and the extracted features are sent to the MMR computer 112 for pattern matching and recognition.

Third-party software module 228 is representative of any third-party software module for enhancing any operation that may occur on capture device 106. Example third-party software includes security software, image sensing software, image processing software, and MMR database software.

As noted above, the capture device 106 may include any number of capture mechanisms 230, examples of which will now be described.

Video camera 232 is a digital video recording device, such as is found in standard digital cameras or some cell phones.

Still camera 234 is any standard digital camera device that is capable of capturing digital images.

Voice recorder 236 is any standard audio recording device (microphone and associated hardware) that is capable of capturing audio signals and outputting it in digital form.

Electronic highlighter 238 is an electronic highlighter that provides the ability to scan, store and transfer printed text, barcodes, and small images to a PC, laptop computer, or PDA device. Electronic highlighter 238 is, for example, the Quicklink Pen Handheld Scanner, by Wizcom Technologies, which allows information to be stored on the pen or transferred directly to a computer application via a serial port, infrared communications, or USB adapter.

Laser 240 is a light source that produces, through stimulated emission, coherent, near-monochromatic light, as is well known. Laser 240 is, for example, a standard laser diode, which is a semiconductor device that emits coherent light when forward biased. Associated with and included in the laser 240 is a detector that measures the amount of light reflected by the image at which the laser 240 is directed.

GPS device 242 is any portable GPS receiver device that supplies position data, e.g., digital latitude and longitude data. Examples of portable GPS devices 242 are the NV-U70 Portable Satellite Navigation System, from Sony Corporation, and the Magellan brand RoadMate Series GPS devices, Meridian Series GPS devices, and explorist Series GPS devices, from Thales North America, Inc. GPS device 242 provides a way of determining the location of capture device 106, in real time, in part, by means of triangulation, to a plurality of geo location mechanisms 142, as is well known.

RFID reader 244 is a commercially available RFID tag reader system, such as the TI RFID system, manufactured by Texas Instruments. An RFID tag is a wireless device for identifying unique items by use of radio waves. An RFID tag is formed of a microchip that is attached to an antenna and upon which is stored a unique digital identification number, as is well known.

In one particular embodiment, capture device 106 includes processor 210, display 212, keypad, 214, storage device 216, wireless communications link 218, wired communications link 220, MMR software suite 222, capture device UI 224, document fingerprint matching module 226, third-party software module 228, and at least one of the capture mechanisms 230. In doing so, capture device 106 is a full-function device. Alternatively, capture device 106 may have lesser functionality and, thus, may include a limited set of functional components. For example, MMR software suite 222 and document fingerprint matching module 226 may reside remotely at, for example, MMR computer 112 or networked media server 114 of MMR system 100b and are accessed by capture device 106 via wireless communications link 218 or wired communications link 220.

MMR Computer

Figure 3:
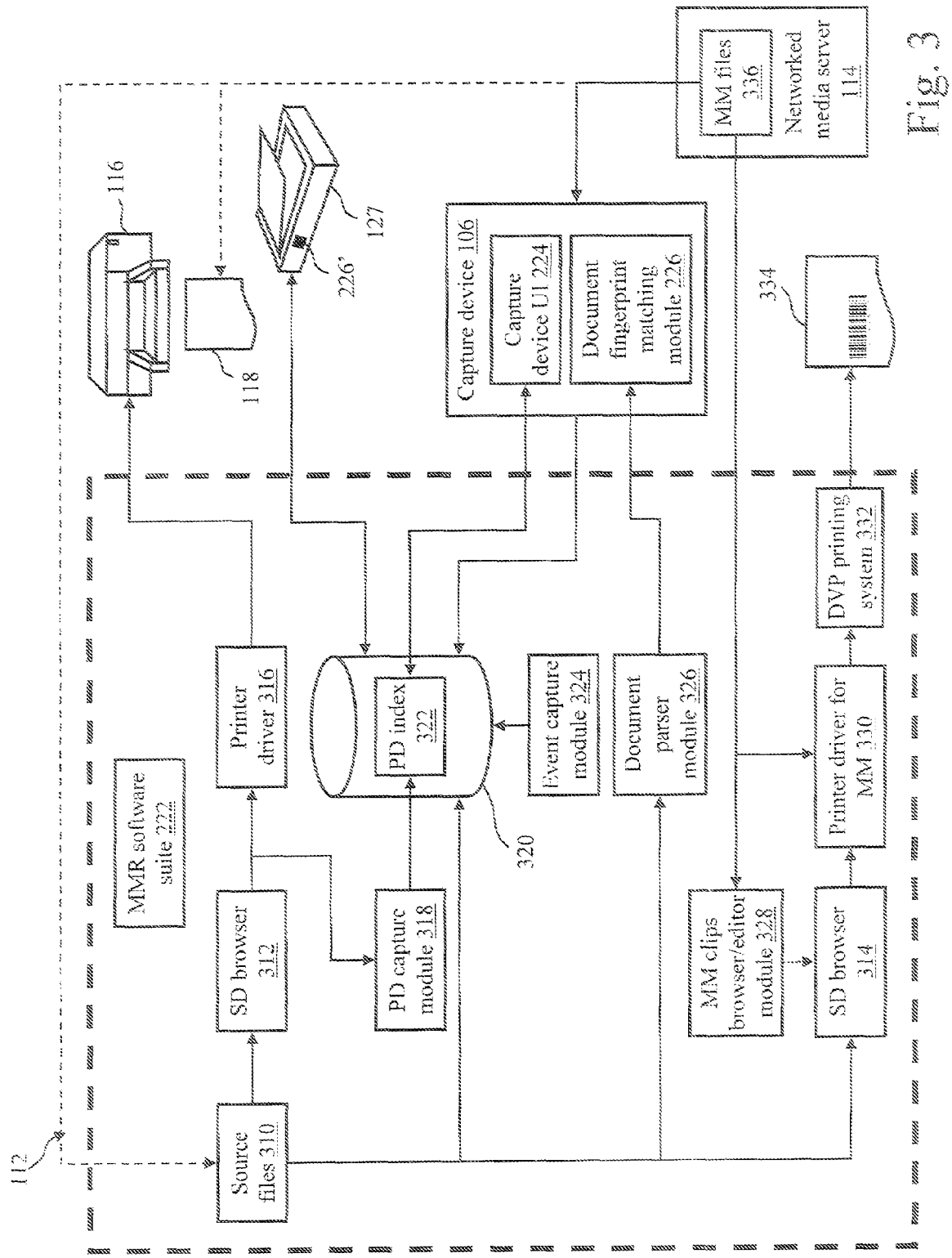
FIG. 3 illustrates a functional block diagram of a MMR computer configured in accordance with an embodiment of the present invention.

Referring now to FIG. 3, the MMR computer 112 configured in accordance with an embodiment of the present invention is shown. As can be seen, MMR computer 112 is connected to networked media server 114 that includes one or more multimedia (MM) files 336, the user printer 116 that produces printed document 118, the document scanner 127, and the capture device 106 that includes capture device UI 224 and a first instance of document fingerprint matching module 226. The communications link between these components may be a direct link or via a network. Additionally, document scanner 127 includes a second instance of document fingerprint matching module 226'.

The MMR computer 112 of this example embodiment includes one or more source files 310, a first source document (SD) browser 312, a second SD browser 314, a printer driver 316, a printed document (PD) capture module 318, a document event database 320 storing a PD index 322, an event capture module 324, a document parser module 326, a multimedia (MM) clips browser/editor module 328, a printer driver for MM 330, a document-to-video paper (DVP) printing system 332, and video paper document 334.

Source files 310 are representative of any source files that are an electronic representation of a document (or a portion thereof). Example source files 310 include hypertext markup language (HTML) files, Microsoft Word files, Microsoft PowerPoint files, simple text files, portable document format (PDF) files, and the like, that are stored on the hard drive (or other suitable storage) of MMR computer 112.

The first SD browser 312 and the second SD browser 314 are either stand-alone PC applications or plug-ins for existing PC applications that provide access to the data that has been associated with source files 310. The first and second SD browser 312, 314 may be used to retrieve an original HTML file or MM clips for display on MMR computer 112.

Printer driver 316 is printer driver software that controls the communication link between applications and the page-description language or printer control language that is used by any particular printer, as is well known. In particular, whenever a document, such as printed document 118, is printed, printer driver 316 feeds data that has the correct control commands to printer 116, such as those provided by Ricoh Corporation for their printing devices. In one embodiment, the printer driver 316 is different from conventional print drivers in that it captures automatically a representation of the x-y coordinates, font, and point size of every character on every printed page. In other words, it captures information about the content of every document printed and feeds back that data to the PD capture module 318.

The PD capture module 318 is a software application that captures the printed representation of documents, so that the layout of characters and graphics on the printed pages can be retrieved. Additionally, by use of PD capture module 318, the printed representation of a document is captured automatically, in real-time, at the time of printing. More specifically, the PD capture module 318 is the software routine that captures the two-dimensional arrangement of text on the printed page and transmits this information to PD index 322. In one embodiment, the PD capture module 318 operates by trapping the Windows text layout commands of every character on the printed page. The text layout commands indicate to the operating system (OS) the x-y location of every character on the printed page, as well as font, point size, and so on. In essence, PD capture module 318 eavesdrops on the print data that is transmitted to printer 116. In the example shown, the PD capture module 318 is coupled to the output of the first SD browser 312 for capture of data. Alternatively, the functions of PD capture module 318 may be implemented directly within printer driver 316. Various configurations will be apparent in light of this disclosure.

Document event database 320 is any standard database modified to store relationships between printed documents and events, in accordance with an embodiment of the present invention. (Document event database 320 is further described below as MMR database with reference to FIG. 34A.) For example, document event database 320 stores bi-directional links from source files 310 (e.g., Word, HTML, PDF files) to events that are associated with printed document 118. Example events include the capture of multimedia clips on capture device 106 immediately after a Word document is printed, the addition of multimedia to a document with the client application of capture device 106, or annotations for multimedia clips. Additionally, other events that are associated with source files 310, which may be stored in document event database 320, include logging when a given source file 310 is opened, closed, or removed; logging when a given source file 310 is in an active application on the desktop of MMR computer 112, logging times and destinations of document "copy" and "move" operations; and logging the edit history of a given source file 310. Such events are captured by event capture module 324 and stored in document event database 320. The document event database 320 is coupled to receive the source files 310, the outputs of the event capture module 324, PD capture module 318 and scanner 127, and is also coupled to capture devices 106 to receive queries and data, and provide output.

The document event database 320 also stores a PD index 322. The PD index 322 is a software application that maps features that are extracted from images of printed documents onto their symbolic forms (e.g., scanned image to Word). In one embodiment, the PD capture module 318 provides to the PD index 322 the x-y location of every character on the printed page, as well as font, point size, and so on. The PD index 322 is constructed at the time that a given document is printed. However, all print data is captured and saved in the PD index 322 in a manner that can be interrogated at a later time. For example, if printed document 118 contains the word "garden" positioned physically on the page one line above the word "rose," the PD index 322 supports such a query (i.e., the word "garden" above the word "rose"). The PD index 322 contains a record of which document, which pages, and which location within those pages upon which the word "garden" appears above the word "rose." Thus, PD index 322 is organized to support a feature-based or text-based query. The contents of PD index 322, which are electronic representations of printed documents, are generated by use of PD capture module 318 during a print operation and/or by use of document fingerprint matching module 226' of document scanner 127 during a scan operation. Additional architecture and functionality of database 320 and PD index 322 will be described below with reference to FIGS. 34A-C, 35, and 36.

The event capture module 324 is a software application that captures on MMR computer 112 events that are associated with a given printed document 118 and/or source file 310. These events are captured during the lifecycle of a given source file 310 and saved in document event database 320. In a specific example, by use of event capture module 324, events are captured that relate to an HTML file that is active in a browser, such as the first SD browser 312, of MMR computer 112. These events might include the time that the HTML file was displayed on MMR computer 112 or the file name of other documents that are open at the same time that the HTML file was displayed or printed. This event information is useful, for example, if MMR user 110 wants to know (at a later time) what documents he/she was viewing or working on at the time that the HTML file was displayed or printed. Example events that are captured by the event capture module 324 include a document edit history; video from office meetings that occurred near the time when a given source file 310 was on the desktop (e.g., as captured by office portal 120); and telephone calls that occurred when a given source file 310 was open (e.g., as captured by office portal 120).

Example functions of event capture module 324 include: 1) tracking—tracking active files and applications; 2) key stroke capturing—key stroke capture and association with the active application; 3) frame buffer capturing and indexing—each frame buffer image is indexed with the optical character recognition (OCR) result of the frame buffer data, so that a section of a printed document can be matched to the time it was displayed on the screen. Alternatively, text can be captured with a graphical display interface (GDI) shadow dll that traps text drawing commands for the PC desktop that are issued by the PC operating system. MMR user 110 may point the capture device 106 at a document and determine when it was active on the desktop of the MMR computer 112); and 4) reading history capture—data of the frame buffer capturing and indexing operation is linked with an analysis of the times at which the documents were active on the desktop of his/her MMR computer 112, in order to track how long, and which parts of a particular document, were visible to MMR user 110. In doing so, correlation may occur with other events, such as keystrokes or mouse movements, in order to infer whether MMR user 110 was reading the document.

The combination of document event database 320, PD index 322, and event capture module 324 is implemented locally on MMR computer 112 or, alternatively, is implemented as a shared database. If implemented locally, less security is required, as compared with implementing in a shared fashion.

The document parser module 326 is a software application that parses source files 310 that are related to respective printed documents 118, to locate useful objects therein, such as uniform resource locators (URLs), addresses, titles, authors, times, or phrases that represent locations, e.g., Hallidie Building. In doing so, the location of those objects in the printed versions of source files 310 is determined. The output of the document parser module 326 can then be used by the receiving device to augment the presentation of the document 118 with additional information, and improve the accuracy of pattern matching. Furthermore, the receiving device could also take an action using the locations, such as in the case of a URL, retrieving the web pages associated with the URL. The document parser module 326 is coupled to receive source files 310 and provides its output to the document fingerprint matching module 226. Although only shown as being coupled to the document fingerprint matching module 226 of the capture device, the output of document parser module 326 could be coupled to all or any number of document fingerprint matching modules 226 wherever they are located. Furthermore, the output of the document parser module 326 could also be stored in the document event database 320 for later use The MM clips browser/editor module 328 is a software application that provides an authoring function. The MM clips browser/editor module 328 is a standalone software application or, alternatively, a plug-in running on a document browser (represented by dashed line to second SD browser 314). The MM clips browser/editor module 328 displays multimedia files to the user and is coupled to the networked media server to receive multimedia files 336. Additionally, when MMR user 110 is authoring a document (e.g., attaching multimedia clips to a paper document), the MM clips browser/editor module 328 is a support tool for this function. The MM clips browser/editor module 328 is the application that shows the metadata, such as the information parsed from documents that are printed near the time when the multimedia was captured.

The printer driver for MM 330 provides the ability to author MMR documents. For example, MMR user 110 may highlight text in a UI generated by the printer driver for MM 330 and add actions to the text that include retrieving multimedia data or executing some other process on network 128 or on MMR computer 112. The combination of printer driver for MM 330 and DVP printing system 332 provides an alternative output format that uses barcodes. This format does not necessarily require a content-based retrieval technology. The printer driver for MM 330 is a printer driver for supporting the video paper technology, i.e., video paper 334. The printer driver for MM 330 creates a paper representation that includes barcodes as a way to access the multimedia. By contrast, printer driver 316 creates a paper representation that includes MMR technology as a way to access the multimedia. The authoring technology embodied in the combination of MM clips browser/editor 328 and SD browser 314 can create the same output format as SD browser 312 thus enabling the creation of MMR documents ready for content-based retrieval. The DVP printing system 332 performs the linking operation of any data in document event database 320 that is associated with a document to its printed representation, either with explicit or implicit bar codes. Implicit bar codes refer to the pattern of text features used like a bar code.

Video paper 334 is a technology for presenting audio-visual information on a printable medium, such as paper. In video paper, bar codes are used as indices to electronic content stored or accessible in a computer. The user scans the bar code and a video clip or other multimedia content related to the text is output by the system. There exist systems for printing audio or video paper, and these systems in essence provide a paper-based interface for multimedia information.

MM files 336 of the networked media server 114 are representative of a collection of any of a variety of file types and file formats. For example, MM files 336 are text source files, web pages, audio files, video files, audio/video files, and image files (e.g., still photos).

As described in FIG. 1B, the document scanner 127 is used in the conversion of existing printed documents into MMR-ready documents. However, with continuing reference to FIG. 3, the document scanner 127 is used to MMR-enable existing documents by applying the feature extraction operation of the document fingerprint matching module 226' to every page of a document that is scanned. Subsequently, PD index 322 is populated with the results of the scanning and feature extraction operation, and thus, an electronic representation of the scanned document is stored in the document event database 320. The information in the PD index 322 can then be used to author MMR documents.

With continuing reference to FIG. 3, note that the software functions of MMR computer 112 are not limited to MMR computer 112 only. Alternatively, the software functions shown in FIG. 3 may be distributed in any user-defined configuration between MMR computer 112, networked media server 114, service provider server 122 and capture device 106 of MMR system 100b. For example, source files 310, SD browser 312, SD browser 314, printer driver 316, PD capture module 318, document event database 320, PD index 322, event capture module 324, document parser module 326, MM clips browser/editor module 328, printer driver for MM 330, and DVP printing system 332, may reside fully within capture device 106, and thereby, provide enhanced functionality to capture device 106.

MMR Software Suite

Figure 4:
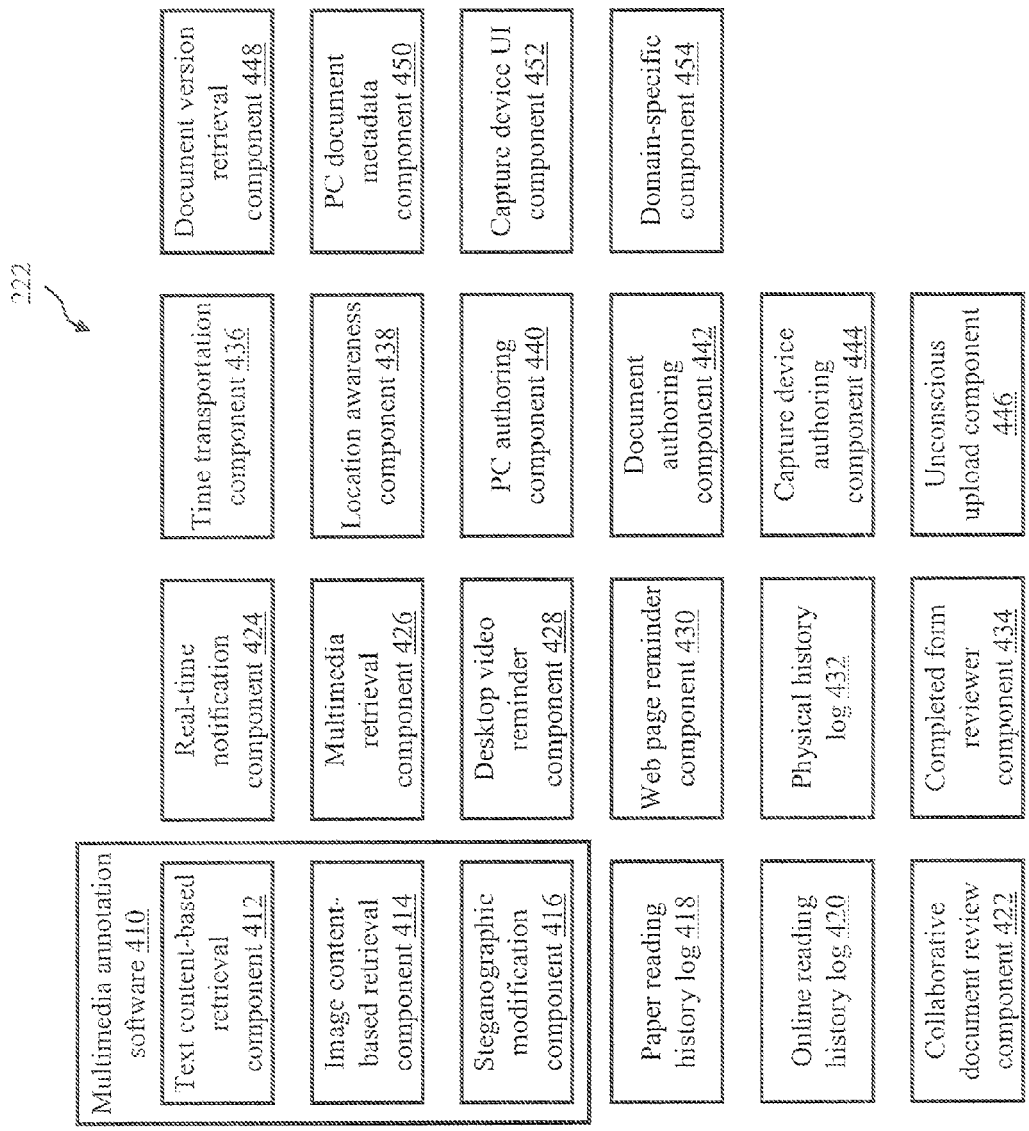
FIG. 4 illustrates a set of software components included in an MMR software suite configured in accordance with an embodiment of the present invention.

FIG. 4 illustrates a set of software components that are included in the MMR software suite 222 in accordance with one embodiment of the present invention. It should be understood that all or some of the MMR software suite 222 may be included in the MMR computer 112, the capture device 106, the networked media server 114 and other servers. In addition, other embodiments of MMR software suite 222 could have any number of the illustrated components from one to all of them. The MMR software suite 222 of this example includes: multimedia annotation software 410 that includes a text content-based retrieval component 412, an image content-based retrieval component 414, and a steganographic modification component 416; a paper reading history log 418; an online reading history log 420; a collaborative document review component 422, a real-time notification component 424, a multimedia retrieval component 426; a desktop video reminder component 428; a web page reminder component 430, a physical history log 432; a completed form reviewer component 434; a time transportation component 436, a location awareness component 438, a PC authoring component 440; a document authoring component 442; a capture device authoring component 444; an unconscious upload component 446; a document version retrieval component 448; a PC document metadata component 450; a capture device UI component 452; and a domain-specific component 454.

The multimedia annotation software 410 in combination with the organization of document event database 320 form the basic technologies of MMR system 100b, in accordance with one particular embodiment. More specifically, multimedia annotation software 410 is for managing the multimedia annotation for paper documents. For example, MMR user 110 points capture device 106 at any section of a paper document and then uses at least one capture mechanism 230 of capture device 106 to add an annotation to that section. In a specific example, a lawyer dictates notes (create an audio file) about a section of a contract. The multimedia data (the audio file) is attached automatically to the original electronic version of the document. Subsequent printouts of the document optionally include indications of the existence of those annotations.

The text content-based retrieval component 412 is a software application that retrieves content-based information from text. For example, by use of text content-based retrieval component 412, content is retrieved from a patch of text, the original document and section within document is identified, or other information linked to that patch is identified. The text content-based retrieval component 412 may utilize OCR-based techniques. Alternatively, non-OCR-based techniques for performing the content-based retrieval from text operation include the two-dimensional arrangement of word lengths in a patch of text. One example of text content-based retrieval component 412 is an algorithm that combines horizontal and vertical features that are extracted from an image of a fragment of text, to identify the document and the section within the document from which it was extracted. The horizontal and vertical features can be used serially, in parallel, or otherwise simultaneously. Such a non-OCR-based feature set is used that provides a high-speed implementation and robustness in the presence of noise.

The image content-based retrieval component 414 is a software application that retrieves content-based information from images. The image content-based retrieval component 414 performs image comparison between captured data and images in the database 320 to generate a list of possible image matches and associated levels of confidence. Additionally, each image match may have associated data or actions that are performed in response to user input. In one example, the image content-based retrieval component 414 retrieves content based on, for example, raster images (e.g., maps) by converting the image to a vector representation that can be used to query an image database for images with the same arrangement of features. Alternative embodiments use the color content of an image or the geometric arrangement of objects within an image to look up matching images in a database.

Steganographic modification component 416 is a software application that performs steganographic modifications prior to printing. In order to better enable MMR applications, digital information is added to text and images before they are printed. In an alternate embodiment, the steganographic modification component 416 generates and stores an MMR document that includes: 1) original base content such as text, audio, or video information; 2) additional content in any form such as text, audio, video, applets, hypertext links, etc. Steganographic modifications can include the embedding of a watermark in color or grayscale images, the printing of a dot pattern on the background of a document, or the subtle modification of the outline of printed characters to encode digital information.

Paper reading history log 418 is the reading history log of paper documents. Paper reading history log 418 resides, for example, in document event database 320. Paper reading history log 418 is based on a document identification-from-video technology developed by Ricoh Innovations, which is used to produce a history of the documents read by MMR user 110. Paper reading history log 418 is useful, for example, for reminding MMR user 110 of documents read and/or of any associated events.

Online reading history log 420 is the reading history log of online documents. Online reading history log 420 is based on an analysis of operating system events, and resides, for example, in document event database 320. Online reading history log 420 is a record of the online documents that were read by MMR user 110 and of which parts of the documents were read. Entries in online reading history log 420 may be printed onto any subsequent printouts in many ways, such as by providing a note at the bottom of each page or by highlighting text with different colors that are based on the amount of time spent reading each passage. Additionally, multimedia annotation software 410 may index this data in PD index 322. Optionally, online reading history log 420 may be aided by a MMR computer 112 that is instrumented with devices, such as a face detection system that monitors MMR computer 112.

The collaborative document review component 422 is a software application that allows more than one reader of different versions of the same paper document to review comments applied by other readers by pointing his/her capture device 106 at any section of the document. For example, the annotations may be displayed on capture device 106 as overlays on top of a document thumbnail. The collaborative document review component 422 may be implemented with or otherwise cooperate with any type of existing collaboration software.

The real-time notification component 424 is a software application that performs a real-time notification of a document being read. For example, while MMR user 110 reads a document, his/her reading trace is posted on a blog or on an online bulletin board. As a result, other people interested in the same topic may drop-in and chat about the document.

Multimedia retrieval component 426 is a software application that retrieves multimedia from an arbitrary paper document. For example, MMR user 110 may retrieve all the conversations that took place while an arbitrary paper document was present on the desk of MMR user 110 by pointing capture device 106 at the document. This assumes the existence of office portal 120 in the office of MMR user 110 (or other suitable mechanism) that captures multimedia data.

The desktop video reminder component 428 is a software application that reminds the MMR user 110 of events that occur on MMR computer 112. For example, by pointing capture device 106 at a section of a paper document, the MMR user 110 may see video clips that show changes in the desktop of MMR computer 112 that occurred while that section was visible. Additionally, the desktop video reminder component 428 may be used to retrieve other multimedia recorded by MMR computer 112, such as audio that is present in the vicinity of MMR computer 112.

The web page reminder component 430 is a software application that reminds the MMR user 110 of web pages viewed on his/her MMR computer 112. For example, by panning capture device 106 over a paper document, the MMR user 110 may see a trace of the web pages that were viewed while the corresponding section of the document was shown on the desktop of MMR computer 112. The web pages may be shown in a browser, such as SD browser 312, 314, or on display 212 of capture device 106. Alternatively, the web pages are presented as raw URLs on display 212 of capture device 106 or on the MMR computer 112.

The physical history log 432 resides, for example, in document event database 320. The physical history log 432 is the physical history log of paper documents. For example, MMR user 110 points his/her capture device 106 at a paper document, and by use of information stored in physical history log 432, other documents that were adjacent to the document of interest at some time in the past are determined. This operation is facilitated by, for example, an RFID-like tracking system. In this case, capture device 106 includes an RFID reader 244.

The completed form reviewer component 434 is a software application that retrieves previously acquired information used for completing a form. For example, MMR user 110 points his/her capture device 106 at a blank form (e.g., a medical claim form printed from a website) and is provided a history of previously entered information. Subsequently, the form is filled in automatically with this previously entered information by this completed form reviewer component 434.

The time transportation component 436 is a software application that retrieves source files for past and future versions of a document, and retrieves and displays a list of events that are associated with those versions. This operation compensates for the fact that the printed document in hand may have been generated from a version of the document that was created months after the most significant external events (e.g., discussions or meetings) associated therewith.

The location awareness component 438 is a software application that manages location-aware paper documents. The management of location-aware paper documents is facilitated by, for example, an RFID-like tracking system. For example, capture device 106 captures a trace of the geographic location of MMR user 110 throughout the day and scans the RFID tags attached to documents or folders that contain documents. The RFID scanning operation is performed by an RFID reader 244 of capture device 106, to detect any RFID tags within its range. The geographic location of MMR user 110 may be tracked by the identification numbers of each cell tower within cellular infrastructure 132 or, alternatively, via a GPS device 242 of capture device 106, in combination with geo location mechanism 142. Alternatively, document identification may be accomplished with "always-on video" or a video camera 232 of capture device 106. The location data provides "geo-referenced" documents, which enables a map-based interface that shows, throughout the day, where documents are located. An application would be a lawyer who carries files on visits to remote clients. In an alternate embodiment, the document 118 includes a sensing mechanism attached thereto that can sense when the document is moved and perform some rudimentary face detection operation. The sensing function is via a set of gyroscopes or similar device that is attached to paper documents. Based on position information, the MMR system 100b indicates when to "call" the owner's cellular phone to tell him/her that the document is moving. The cellular phone may add that document to its virtual brief case. Additionally, this is the concept of an "invisible" barcode, which is a machine-readable marking that is visible to a video camera 232 or still camera 234 of capture device 106, but that is invisible or very faint to humans. Various inks and steganography or, a printed-image watermarking technique that may be decoded on capture device 106, may be considered to determine position.

The PC authoring component 440 is a software application that performs an authoring operation on a PC, such as on MMR computer 112. The PC authoring component 440 is supplied as plug-ins for existing authoring applications, such as Microsoft Word, PowerPoint, and web page authoring packages. The PC authoring component 440 allows MMR user 110 to prepare paper documents that have links to events from his/her MMR computer 112 or to events in his/her environment; allows paper documents that have links to be generated automatically, such as printed document 118 being linked automatically to the Word file from which it was generated; or allows MMR user 110 to retrieve a Word file and give it to someone else. Paper documents that have links are heretofore referred to as MMR documents. More details of MMR documents are further described with reference to FIG. 5.

The document authoring component 442 is a software application that performs an authoring operation for existing documents. The document authoring component 442 can be implemented, for example, either as a personal edition or as an enterprise edition. In a personal edition, MMR user 110 scans documents and adds them to an MMR document database (e.g., the document event database 320). In an enterprise edition, a publisher (or a third party) creates MMR documents from the original electronic source (or electronic galley proofs). This functionality may be embedded in high-end publishing packages (e.g., Adobe Reader) and linked with a backend service provided by another entity.

The capture device authoring component 444 is a software application that performs an authoring operation directly on capture device 106. Using the capture device authoring component 444, the MMR user 110 extracts key phrases from the paper documents in his/her hands and stores the key phrases along with additional content captured on-the-fly to create a temporary MMR document. Additionally, by use of capture device authoring component 444, the MMR user 110 may return to his/her MMR computer 112 and download the temporary MMR document that he/she created into an existing document application, such as PowerPoint, then edit it to a final version of an MMR document or other standard type of document for another application. In doing so, images and text are inserted automatically in the pages of the existing document, such as into the pages of a PowerPoint document.

Unconscious upload component 446 is a software application that uploads unconsciously (automatically, without user intervention) printed documents to capture device 106. Because capture device 106 is in the possession of the MMR user 110 at most times, including when the MMR user 110 is at his/her MMR computer 112, the printer driver 316 in addition to sending documents to the printer 116, may also push those same documents to a storage device 216 of capture device 106 via a wireless communications link 218 of capture device 106, in combination with Wi-Fi technology 134 or Bluetooth technology 136, or by wired connection if the capture device 106 is coupled to/docked with the MMR computer 112. In this way, the MMR user 110 never forgets to pick up a document after it is printed because it is automatically uploaded to the capture device 106.

The document version retrieval component 448 is a software application that retrieves past and future versions of a given source file 310. For example, the MMR user 110 points capture device 106 at a printed document and then the document version retrieval component 448 locates the current source file 310 (e.g., a Word file) and other past and future versions of source file 310. In one particular embodiment, this operation uses Windows file tracking software that keeps track of the locations to which source files 310 are copied and moved. Other such file tracking software can be used here as well. For example, Google Desktop Search or the Microsoft Windows Search Companion can find the current version of a file with queries composed from words chosen from source file 310.

The PC document metadata component 450 is a software application that retrieves metadata of a document. For example, the MMR user 110 points capture device 106 at a printed document, and the PC document metadata component 450 determines who printed the document, when the document was printed, where the document was printed, and the file path for a given source file 310 at the time of printing.

The capture device UI component 452 is a software application that manages the operation of UI of capture device 106, which allows the MMR user 110 to interact with paper documents. A combination of capture device UI component 452 and capture device UI 224 allow the MMR user 110 to read data from existing documents and write data into existing documents, view and interact with the augmented reality associated with those documents (i.e., via capture device 106, the MMR user 110 is able to view what happened when the document was created or while it was edited), and view and interact with the augmented reality that is associated with documents displayed on his/her capture device 106.

Domain-specific component 454 is a software application that manages domain-specific functions. For example, in a music application, domain-specific component 454 is a software application that matches the music that is detected via, for example, a voice recorder 236 of capture device 106, to a title, an artist, or a composer. In this way, items of interest, such as sheet music or music CDs related to the detected music, may be presented to the MMR user 110. Similarly, the domain-specific component 454 is adapted to operate in a similar manner for video content, video games, and any entertainment information. The device specific component 454 may also be adapted for electronic versions of any mass media content.

With continuing reference to FIGS. 3 and 4, note that the software components of MMR software suite 222 may reside fully or in part on one or more MMR computers 112, networked servers 114, service provider servers 122, and capture devices 106 of MMR system 100b. In other words, the operations of MMR system 100b, such as any performed by MMR software suite 222, may be distributed in any user-defined configuration between MMR computer 112, networked server 114, service provider server 122, and capture device 106 (or other such processing environments included in the system 100b).

In will be apparent in light of this disclosure that the base functionality of the MMR system 100a/100b can be performed with certain combinations of software components of the MMR software suite 222. For example, the base functionality of one embodiment of the MMR system 100a/100b includes:

- creating or adding to an MMR document that includes a first media portion and a second media portion;
- use of the first media portion (e.g., a paper document) of the MMR document to access information in the second media portion;
- use of the first media portion (e.g., a paper document) of the MMR document to trigger or initiate a process in the electronic domain;
- use of the first media portion (e.g., a paper document) of the MMR document to create or add to the second media portion;
- use of the second media portion of the MMR document to create or add to the first media portion;
- use of the second media portion of the MMR document to trigger or initiate a process in the electronic domain or related to the first media portion.

MMR Document

Figure 5:
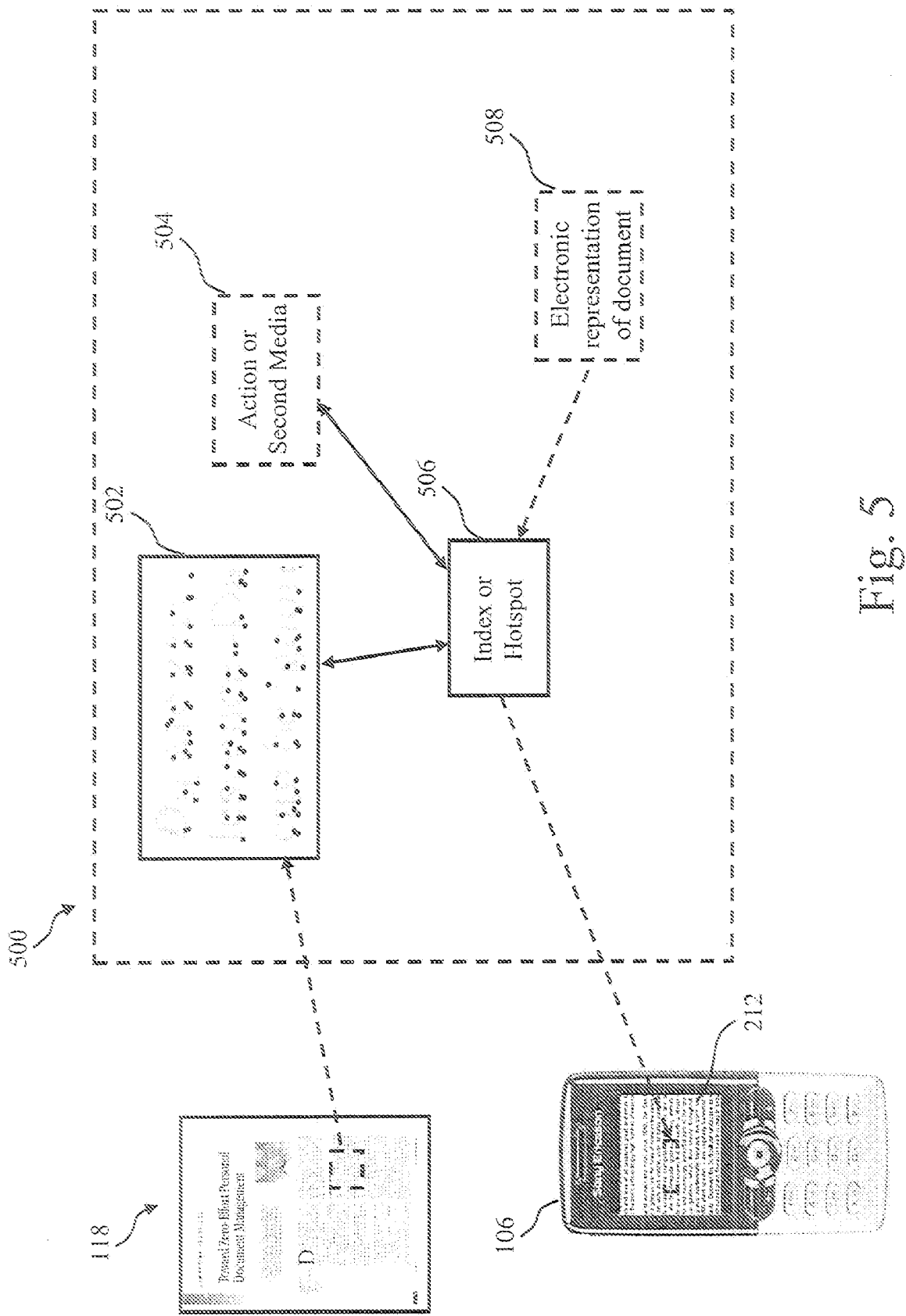
FIG. 5 illustrates a diagram representing an embodiment of an MMR document configured in accordance with an embodiment of the present invention.

FIG. 5 illustrates a diagram of an MMR document 500 in accordance with one embodiment of the present invention. More specifically, FIG. 5 shows an MMR document 500 including a representation 502 of a portion of the printed document 118, an action or second media 504, an index or hotspot 506, and an electronic representation 508 of the entire document 118. While the MMR document 500 typically is stored at the document event database 320, it could also be stored in the capture device or any other devices coupled to the network 128. In one embodiment, multiple MMR documents may correspond to a printed document. In another embodiment, the structure shown in FIG. 5 is replicated to create multiple hotspots 506 in a single printed document. In one particular embodiment, the MMR document 500 includes the representation 502 and hotspot 506 with page and location within a page; the second media 504 and the electronic representation 508 are optional and delineated as such by dashed lines. Note that the second media 504 and the electronic representation 508 could be added later after the MMR document has been created, if so desired. This basic embodiment can be used to locate a document or particular location in a document that correspond to the representation.

The representation 502 of a portion of the printed document 118 can be in any form (images, vectors, pixels, text, codes, etc.) usable for pattern matching and that identifies at least one location in the document. It is preferable that the representation 502 uniquely identify a location in the printed document. In one embodiment, the representation 502 is a text fingerprint as shown in FIG. 5. The text fingerprint 502 is captured automatically via PD capture module 318 and stored in PD index 322 during a print operation. Alternatively, the text fingerprint 502 is captured automatically via document fingerprint matching module 226' of document scanner 127 and stored in PD index 322 during a scan operation. The representation 502 could alternatively be the entire document, a patch of text, a single word if it is a unique instance in the document, a section of an image, a unique attribute or any other representation of a matchable portion of a document.

The action or second media 504 is preferably a digital file or data structure of any type. The second media 504 in the most basic embodiment may be text to be presented or one or more commands to be executed. The second media type 504 more typically is a text file, audio file, or video file related to the portion of the document identified by the representation 502. The second media type 504 could be a data structure or file referencing or including multiple different media types, and multiple files of the same type. For example, the second media 504 can be text, a command, an image, a PDF file, a video file, an audio file, an application file (e.g. spreadsheet or word processing document), etc.

The index or hotspot 506 is a link between the representation 502 and the action or second media 504. The hotspot 506 associates the representation 502 and the second media 504. In one embodiment, the index or hotspot 506 includes position information such as x and y coordinates within the document. The hotspot 506 maybe a point, an area or even the entire document. In one embodiment, the hotspot is a data structure with a pointer to the representation 502, a pointer to the second media 504, and a location within the document. It should be understood that the MMR document 500 could have multiple hotspots 506, and in such a case the data structure creates links between multiple representations, multiple second media files, and multiple locations within the printed document 118.

In an alternate embodiment, the MMR document 500 includes an electronic representation 508 of the entire document 118. This electronic representation can be used in determining position of the hotspot 506 and also by the user interface for displaying the document on capture device 106 or the MMR computer 112.

Example use of the MMR document 500 is as follows. By analyzing text fingerprint or representation 502, a captured text fragment is identified via document fingerprint matching module 226 of capture device 106. For example, MMR user 110 points a video camera 232 or still camera 234 of his/her capture device 106 at printed document 118 and captures an image. Subsequently, document fingerprint matching module 226 performs its analysis upon the captured image, to determine whether an associated entry exists within the PD index 322. If a match is found, the existence of a hot spot 506 is highlighted to MMR user 110 on the display 212 of his/her capture device 106. For example, a word or phrase is highlighted, as shown in FIG. 5. Each hot spot 506 within printed document 118 serves as a link to other user-defined or predetermined data, such as one of MM files 336 that reside upon networked media server 114. Access to text fingerprints or representations 502 that are stored in PD index 322 allows electronic data to be added to any MMR document 500 or any hotspot 506 within a document. As described with reference to FIG. 4, a paper document that includes at least one hot spot 506 (e.g., link) is referred to as an MMR document 500.

With continuing reference to FIGS. 1B, 2A through 2D, 3, 4, and 5, example operation of MMR system 100b is as follows. MMR user 110 or any other entity, such as a publishing company, opens a given source file 310 and initiates a printing operation to produce a paper document, such as printed document 118. During the printing operation, certain actions are performed automatically, such as: (1) capturing automatically the printed format, via PD capture module 318, at the time of printing and transferring it to capture device 106. The electronic representation 508 of a document is captured automatically at the time of printing, by use of PD capture module 318 at the output of, for example, SD browser 312. For example, MMR user 110 prints content from SD browser 312 and the content is filtered through PD capture module 318. As previously discussed, the two-dimensional arrangement of text on a page can be determined when the document is laid out for printing; (2) capturing automatically, via PD capture module 318, the given source file 310 at the time of printing; and (3) parsing, via document parser module 326, the printed format and/or source file 310, in order to locate "named entities" or other interesting information that may populate a multimedia annotation interface on capture device 106. The named entities are, for example, "anchors"

for adding multimedia later, i.e., automatically generated hot spots 506. Document parser module 326 receives as input source files 310 that are related to a given printed document 118. Document parser module 326 is the application that identifies representations 502 for use with hot spots 506, such as titles, authors, times, or locations, in a paper document 118 and, thus, prompts information to be received on capture device 106; (4) indexing automatically the printed format and/or source file 310 for content-based retrieval, i.e., building PD index 322; (5) making entries in document event database 320 for documents and events associated with source file 310, e.g., edit history and current location; and (6) performing an interactive dialog within printer driver 316, which allows MMR user 110 to add hot spots 506 to documents before they are printed and, thus, an MMR document 500 is formed. The associated data is stored on MMR computer 112 or uploaded to networked media server 114.

Exemplary Alternate Embodiments

The MMR system 100 (100*a* or 100*b*) is not limited to the configurations shown in FIGS. 1A-1B, 2A-2D, and 3-5. The MMR Software may be distributed in whole or in part between the capture device 106 and the MMR computer 112, and significantly fewer than all the modules described above with reference to FIGS. 3 and 4 are required. Multiple configurations are possible including the following:

A first alternate embodiment of the MMR system 100 includes the capture device 106 and capture device software. The capture device software is the capture device UI 224 and the document fingerprint matching module 226 (e.g., shown in FIG. 3). The capture device software is executed on capture device 106, or alternatively, on an external server, such as networked media server 114 or service provider server 122, that is accessible to capture device 106. In this embodiment, a networked service is available that supplies the data that is linked to the publications. A hierarchical recognition scheme may be used, in which a publication is first identified and then the page and section within the publication are identified.

A second alternate embodiment of the MMR system 100 includes capture device 106, capture device software and document use software. The second alternate embodiment includes software, such as is shown and described with reference to FIG. 4, that captures and indexes printed documents and links basic document events, such as the edit history of a document. This allows MMR user 110 to point his/her capture device 106 at any printed document and determine the name and location of the source file 310 that generated the document, as well as determine the time and place of printing.

A third alternate embodiment of the MMR system 100 includes capture device 106, capture device software, document use software, and event capture module 324. The event capture module 324 is added to MMR computer 112 that captures events that are associated with documents, such as the times when they were visible on the desktop of MMR computer 112 (determined by monitoring the GDI character generator), URLs that were accessed while the documents were open, or characters typed on the keyboard while the documents were open.

A fourth alternate embodiment of the MMR system 100 includes capture device 106, capture device software, and the printer 116. In this fourth alternate embodiment the printer 116 is equipped with a Bluetooth transceiver or similar communication link that communicates with capture device 106 of any MMR user 110 that is in close proximity. Whenever any MMR user 110 picks up a document from the printer 116, the printer 116 pushes the MMR data (document layout and multimedia clips) to that user's capture device 106. User printer 116 includes a keypad, by which a user logs in and enters a code, in order to obtain the multimedia data that is associated with a specific document. The document may include a printed representation of a code in its footer, which may be inserted by printer driver 316.

A fifth alternate embodiment of the MMR system 100 includes capture device 106, capture device software, and office portal 120. The office portal device is preferably a personalized version of office portal 120. The office portal 120 captures events in the office, such as conversations, conference/telephone calls, and meetings. The office portal 120 identifies and tracks specific paper documents on the physical desktop. The office portal 120 additionally executes the document identification software (i.e., document fingerprint matching module 226 and hosts document event database 320). This fifth alternate embodiment serves to off-load the computing workload from MMR computer 112 and provides a convenient way to package MMR system 100*b* as a consumer device (e.g., MMR system 100*b* is sold as a hardware and software product that is executing on a Mac Mini computer, by Apple Computer, Inc.).

A sixth alternate embodiment of the MMR system 100 includes capture device 106, capture device software, and the networked media server 114. In this embodiment, the multimedia data is resident on the networked media server 114, such as the Comcast Video-on-Demand server. When MMR user 110 scans a patch of document text by use of his/her capture device 106, the resultant lookup command is transmitted either to the set-top box 126 that is associated with cable TV of MMR user 110 (wirelessly, over the Internet, or by calling set-top box 126 on the phone) or to the Comcast server. In both cases, the multimedia is streamed from the Comcast server to set-top box 126. The system 100 knows where to send the data, because MMR user 110 registered previously his/her phone. Thus, the capture device 106 can be used for access and control of the set-top box 126.

A seventh alternate embodiment of the MMR system 100 includes capture device 106, capture device software, the networked media server 114 and a location service. In this embodiment, the location-aware service discriminates between multiple destinations for the output from the Comcast system (or other suitable communication system). This function is performed either by discriminating automatically between cellular phone tower IDs or by a keypad interface that lets MMR user 110 choose the location where the data is to be displayed. Thus, the user can access programming and other cable TV features provided by their cable operator while visiting another location so long as that other location has cable access.

Document Fingerprint Matching ("Image-Based Patch Recognition")

Figure 6:
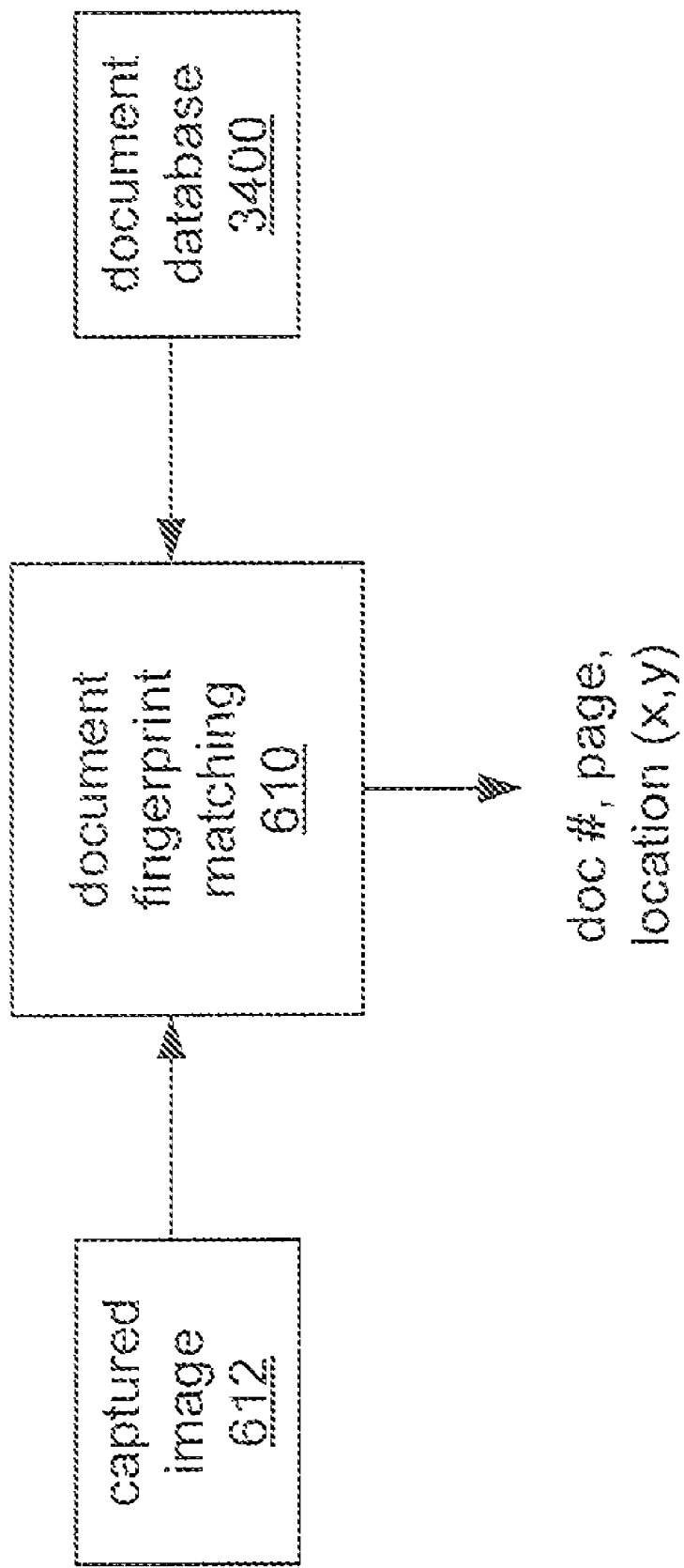
FIG. 6 illustrates a document fingerprint matching methodology in accordance with an embodiment of the present invention.

As previously described, document fingerprint matching involves uniquely identifying a portion, or "patch", of an MMR document. Referring to FIG. 6, a document fingerprint matching module/system 610 receives a captured image 612. The document fingerprint matching system 610 then queries a collection of pages in a document database 3400 (further described below with reference to, for example, FIG. 34A) and returns a list of the pages and documents that contain them within which the captured image 612 is contained. Each result is an x-y location where the captured input image 612 occurs. Those skilled in the art will note that the database 3400 can be external to the document fingerprint matching module 610 (e.g., as shown in FIG. 6), but can also be internal to the document fingerprint matching module 610 (e.g., as shown in FIGS. 7, 11, 12, 14, 20, 24, 26, 28, and 30-32, where the document fingerprint matching module 610 includes database 3400).

Figure 7:
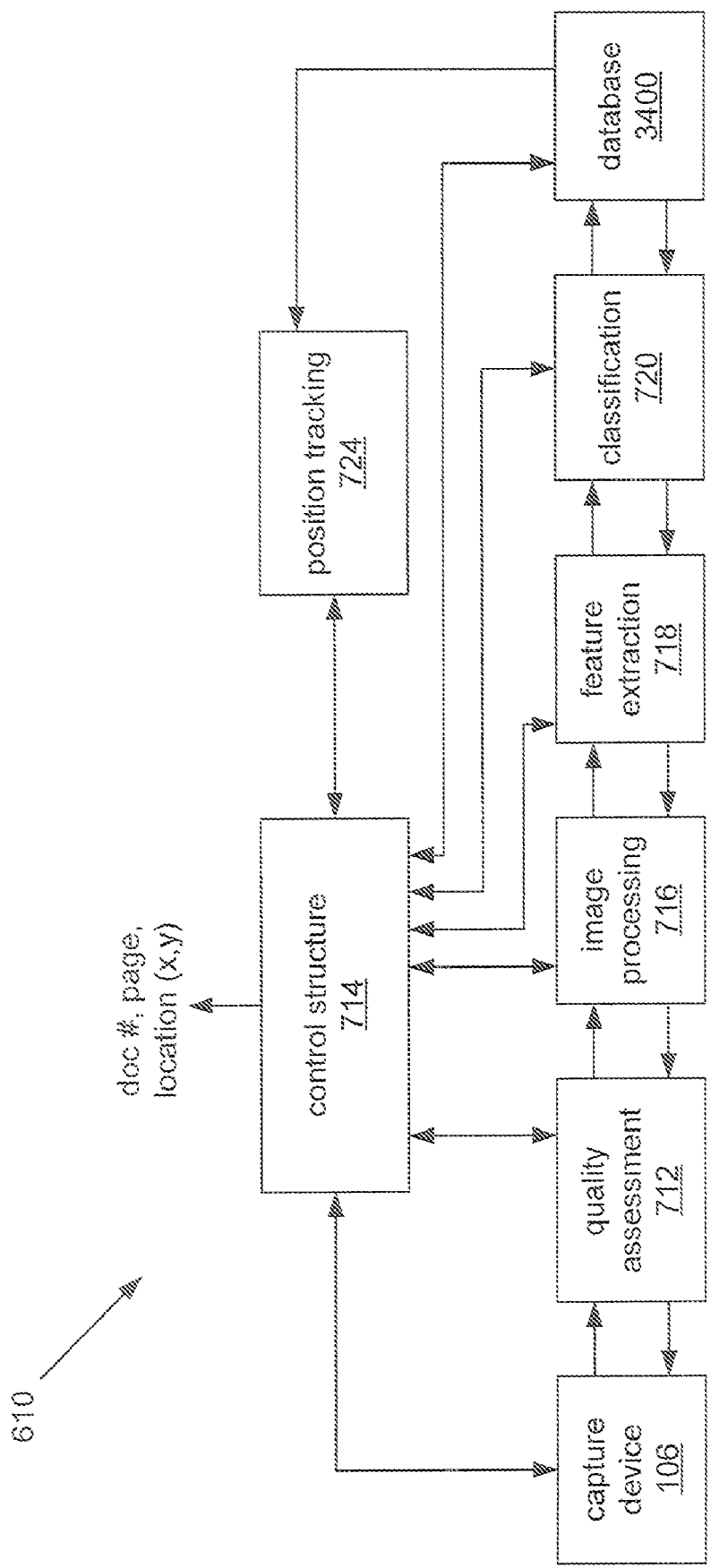
FIG. 7 illustrates a document fingerprint matching system configured in accordance with an embodiment of the present invention.

FIG. 7 shows a block diagram of a document fingerprint matching system 610 in accordance with an embodiment of the present invention. A capture device 106 captures an image. The captured image is sent to a quality assessment module 712, which effectively makes a preliminary judgment about the content of the captured image based on the needs and capabilities of downstream processing. For example, if the captured image is of such quality that it cannot be processed downstream in the document fingerprint matching system 610, the quality assessment module 712 causes the capture device 106 to recapture the image at a higher resolution. Further, the quality assessment module 712 may detect many other relevant characteristics of the captured image such as, for example, the sharpness of the text contained in the captured image, which is an indication of whether the captured image is "in focus." Further, the quality assessment module 712 may determine whether the captured image contains something that could be part of a document. For example, an image patch that contains a non-document image (e.g., a desk, an outdoor scene) indicates that the user is transitioning the view of the capture device 106 to a new document.

Figure 8:
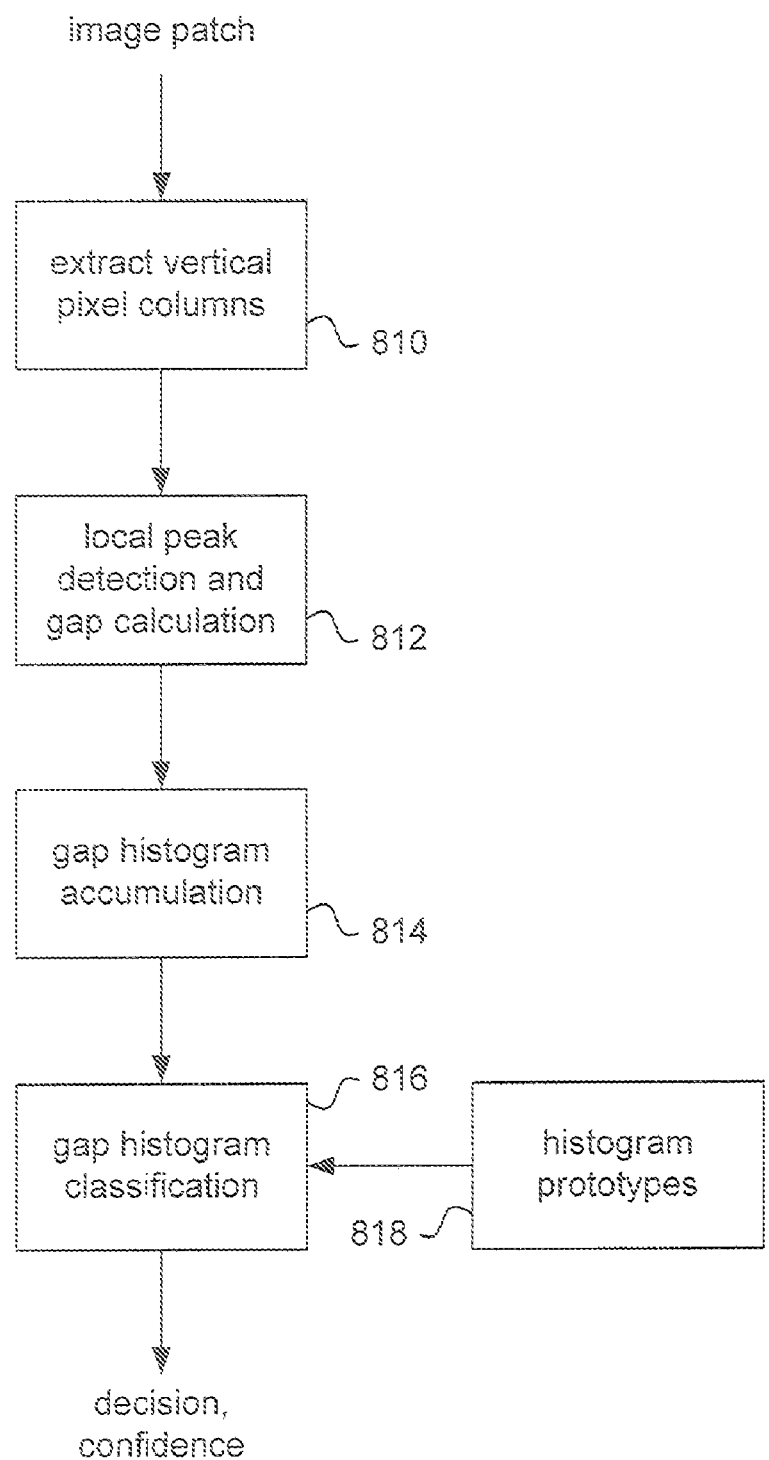
FIG. 8 illustrates a flow process for text/non-text discrimination in accordance with an embodiment of the present invention.

Further, in one or more embodiments, the quality assessment module 712 may perform text/non-text discrimination so as to pass through only images that are likely to contain recognizable text. FIG. 8 shows a flow process for text/non-text discrimination in accordance with one or more embodiments. A number of columns of pixels are extracted from an input image patch at step 810. Typically, an input image is gray-scale, and each value in the column is an integer from zero to 255 (for 8 bit pixels). At step 812, the local peaks in each column are detected. This can be done with the commonly understood "sliding window" method in which a window of fixed length (e.g., N pixels) is slid over the column, M pixels at a time, where M<N. At each step, the presence of a peak is determined by looking for a significant difference in gray level values (e.g., greater than 40). If a peak is located at one position of the window, the detection of other peaks is suppressed whenever the sliding window overlaps this position. The gaps between successive peaks may also be detected at step 812. Step 812 is applied to a number C of columns in the image patch, and the gap values are accumulated in a histogram at step 814.

The gap histogram is compared to other histograms derived from training data with known classifications (at step 816) stored in database 818, and a decision about the category of the patch (either text or non-text) is output together with a measure of the confidence in that decision. The histogram classification at step 816 takes into account the typical appearance of a histogram derived from an image of text and that it contains two tight peaks, one centered on the distance between lines with possibly one or two other much smaller peaks at integer multiples higher in the histogram away from those peaks. The classification may determine the shape of the histogram with a measure of statistical variance, or it may compare the histogram one-by-one to stored prototypes with a distance measure, such as, for example, a Hamming or Euclidean distance.

Figure 9:
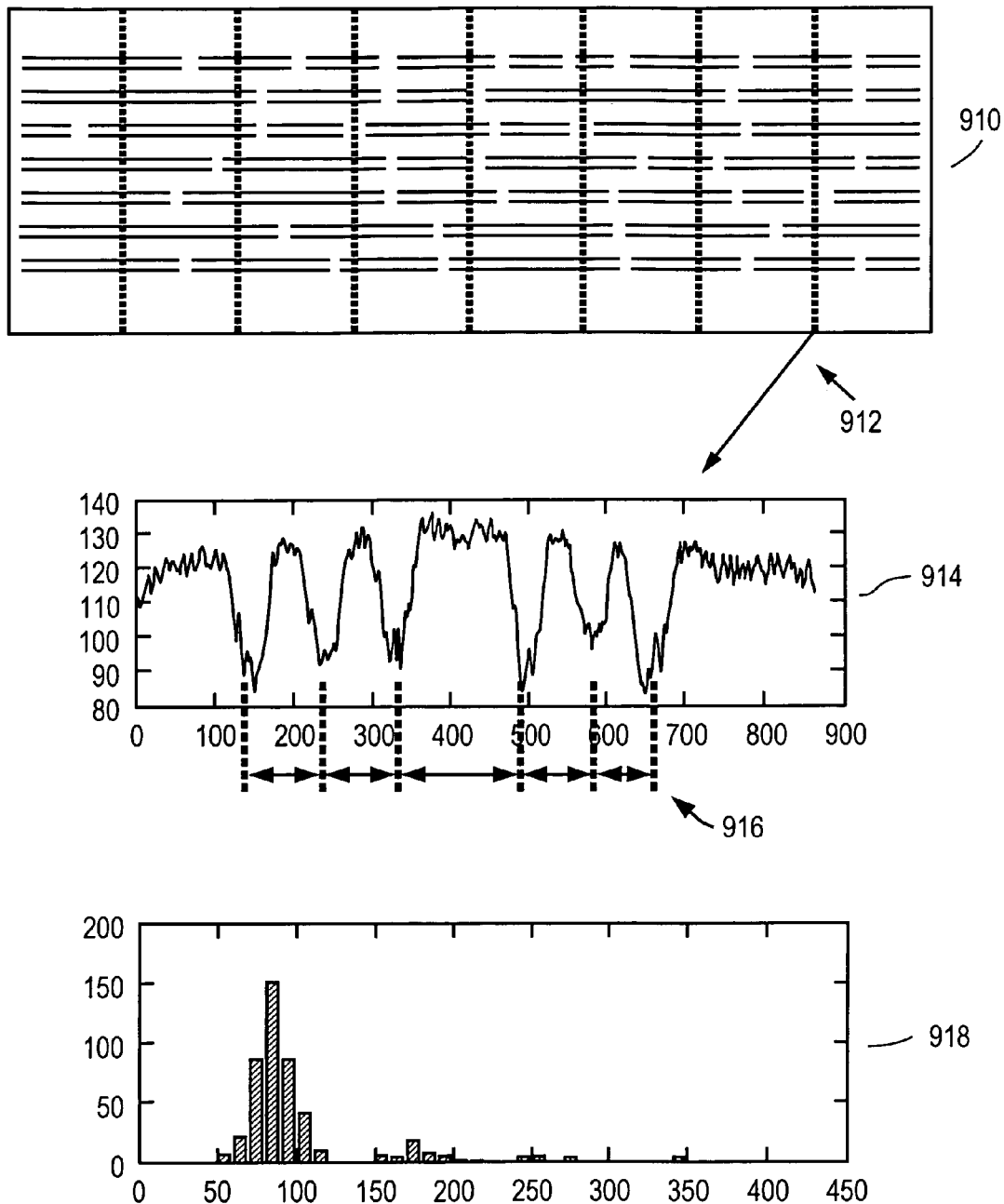
FIG. 9 illustrates an example of text/non-text discrimination in accordance with an embodiment of the present invention.

Now referring also to FIG. 9, it shows an example of text/non-text discrimination. An input image 910 is processed to sample a number of columns, a subset of which is indicated with dotted lines. The gray level histogram for a typical column 912 is shown in 914. Y values are gray levels in 910 and the X values are rows in 910. The gaps that are detected between peaks in the histogram are shown in 916. The histogram of gap values from all sampled columns is shown in 918. This example illustrates the shape of a histogram derived from a patch that contains text.

Figure 10:
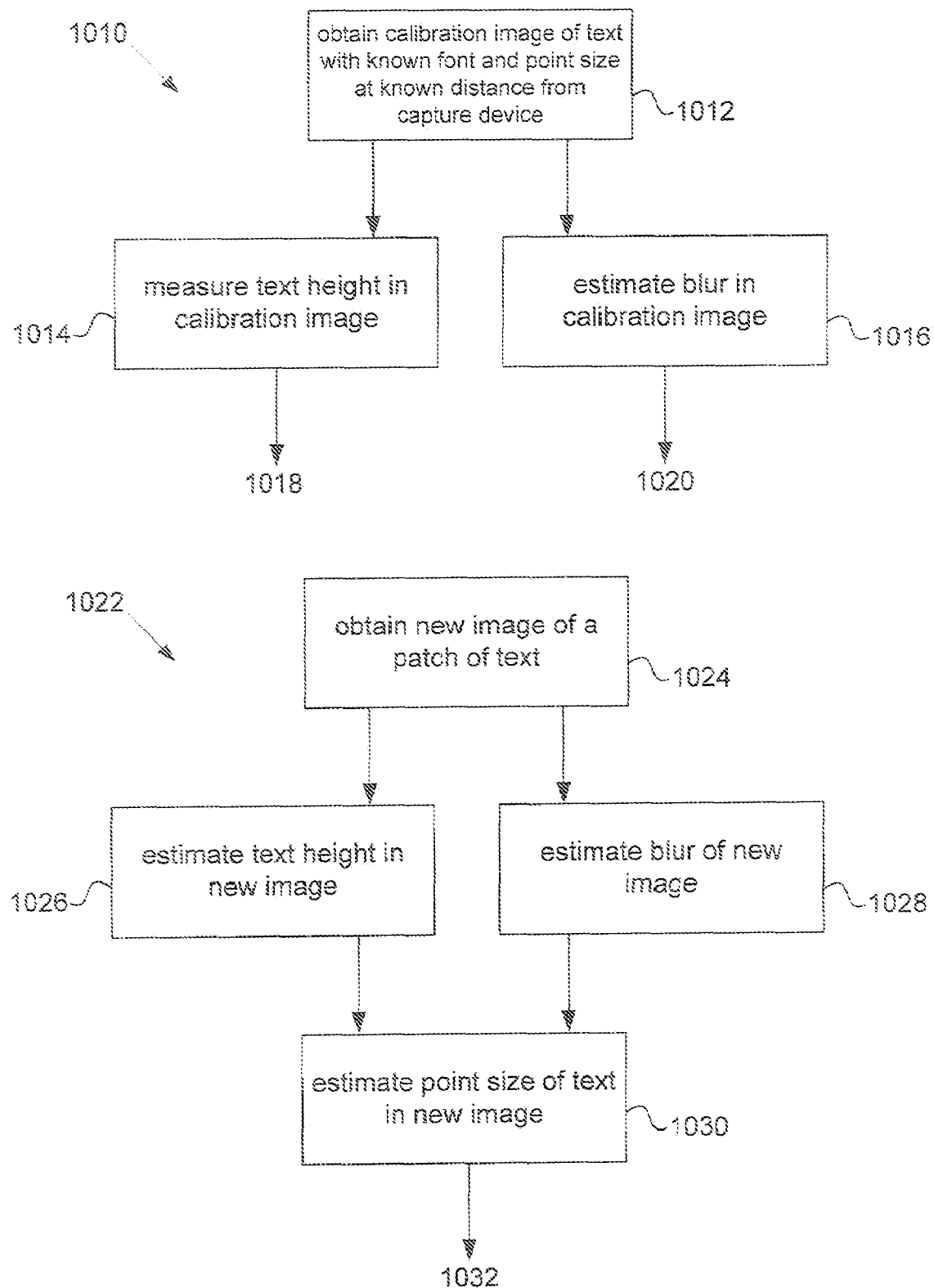
FIG. 10 illustrates a flow process for estimating the point size of text in an image patch in accordance with an embodiment of the present invention.

A flow process for estimating the point size of text in an image patch is shown in FIG. 10. This flow process takes advantage of the fact that the blur in an image is inversely proportional to the capture device's distance from the page. By estimating the amount of blur, the distance may be estimated, and that distance may be used to scale the size of objects in the image to known "normalized" heights. This behavior may be used to estimate the point size of text in a new image.

In a training phase 1010, an image of a patch of text (referred to as a "calibration" image) in a known font and point size is obtained with an image capture device at a known distance at step 1012. The height of text characters in that image as expressed in a number of pixels is measured at step 1014. This may be done, for example, manually with an image annotation tool such as Microsoft Photo Editor. The blur in the calibration image is estimated at step 1016. This may be done, for example, with known measurements of the spectral cutoff of the two-dimensional fast Fourier transform. This may also be expressed in units as a number of pixels 1020.

When presented a "new" image at step 1024, as in an MMR recognition system at run-time, the image is processed at step 1026 to locate text with commonly understood method of line segmentation and character segmentation that produces bounding boxes around each character. The heights of those boxes may be expressed in pixels. The blur of the new image is estimated at step 1028 in a similar manner as at step 1016. These measures are combined at step 1030 to generate a first estimate 1032 of the point size of each character (or equivalently, each line). This may be done by calculating the following equation: (calibration image blur size/new image blur size)*(new image text height/calibration image text height)*(calibration image font size in points). This scales the point size of the text in the calibration image to produce an estimated point size of the text in the input image patch. The same scaling function may be applied to the height of every character's bounding box. This produces a decision for every character in a patch. For example, if the patch contains 50 characters, this procedure would produce 50 votes for the point size of the font in the patch. A single estimate for the point size may then be derived with the median of the votes.

Further, more specifically referring back to FIG. 7, in one or more embodiments, feedback of the quality assessment module 712 to the capture device 106 may be directed to a user interface (UI) of the capture device 106. For example, the feedback may include an indication in the form of a sound or vibration that indicates that the captured image contains something that looks like text but is blurry and that the user should steady the capture device 106. The feedback may also include commands that change parameters of the optics of the capture device 106 to improve the quality of the captured image. For example, the focus, F-stop, and/or exposure time may be adjusted so at to improve the quality of the captured image.

Further, the feedback of the quality assessment module 712 to the capture device 106 may be specialized by the needs of the particular feature extraction algorithm being used. As further described below, feature extraction converts an image into a symbolic representation. In a recognition system that computes the length of words, it may desirable for the optics of the capture device 106 to blur the captured image. Those skilled in the art will note that such adjustment may produce an image that, although perhaps not recognizable by a human or an optical character recognition (OCR) process, is well suited for the feature extraction technique. The quality assessment module 712 may implement this by feeding back instructions to the capture device 106 causing the capture device 106 to defocus the lens and thereby produce blurry images.

The feedback process is modified by a control structure 714. In general, the control structure 714 receives data and symbolic information from the other components in the document fingerprint matching system 610. The control structure 714 decides the order of execution of the various steps in the document fingerprint matching system 610 and can optimize the computational load. The control structure 714 identifies the x-y position of received image patches. More particularly, the control structure 714 receives information about the needs of the feature extraction process, the results of the quality assessment module 712, and the capture device 106 parameters, and can change them as appropriate. This can be done dynamically on a frame-by-frame basis. In a system configuration that uses multiple feature extraction methodologies, one might require blurry images of large patches of text and another might need high resolution sharply focused images of paper grain. In such a case, the control structure 714 may send commands to the quality assessment module 712 that instruct it to produce the appropriate image quality when it has text in view. The quality assessment module 712 would interact with the capture device 106 to produce the correct images (e.g., N blurry images of a large patch followed by M images of sharply focused paper grain (high resolution)). The control structure 714 would track the progress of those images through the processing pipeline to ensure that the corresponding feature extraction and classification is applied.

An image processing module 716 modifies the quality of the input images based on the needs of the recognition system. Examples of types of image modification include sharpening, deskewing, and binarization. Such algorithms include many tunable parameters such as mask sizes, expected rotations, and thresholds.

As shown in FIG. 7, the document fingerprint matching system 610 uses feedback from feature extraction and classification modules 718, 720 (described below) to dynamically modify the parameters of the image processing module 716. This works because the user will typically point their capture device 106 at the same location in a document for several seconds continuously. Given that, for example, the capture device 106 processes 30 frames per second, the results of processing the first few frames in any sequence can affect how the frames captured later are processed.

A feature extraction module 718 converts a captured image into a symbolic representation. In one example, the feature extraction module 718 locates words and computes their bounding boxes. In another example, the feature extraction module 718 locates connected components and calculates descriptors for their shape. Further, in one or more embodiments, the document fingerprint matching system 610 shares metadata about the results of feature extraction with the control structure 714 and uses that metadata to adjust the parameters of other system components. Those skilled in the art will note that this may significantly reduce computational requirements and improve accuracy by inhibiting the recognition of poor quality data. For example, a feature extraction module 718 that identifies word bounding boxes could tell the control structure 714 the number of lines and "words" it found. If the number of words is too high (indicating, for example, that the input image is fragmented), the control structure 714 could instruct the quality assessment module 712 to produce blurrier images. The quality assessment module 712 would then send the appropriate signal to the capture device 106. Alternatively, the control structure 714 could instruct the image processing module 716 to apply a smoothing filter.

A classification module 720 converts a feature description from the feature extraction module 718 into an identification of one or more pages within a document and the x,y positions within those pages where an input image patch occurs. The identification is made dependent on feedback from a database 3400 as described in turn. Further, in one or more embodiments, a confidence value may be associated with each decision. The document fingerprint matching system 610 may use such decisions to determine parameters of the other components in the system. For example, the control structure 714 may determine that if the confidences of the top two decisions are close to one another, the parameters of the image processing algorithms should be changed. This could result in increasing the range of sizes for a median filter and the carry-through of its results downstream to the rest of the components.

Further, as shown in FIG. 7, there may be feedback between the classification module 720 and a database 3400. Further, those skilled in the art will recall that database 3400 can be external to the module 610 as shown in FIG. 6. A decision about the identity of a patch can be used to query the database 3400 for other patches that have a similar appearance. This would compare the perfect image data of the patch stored in the database 3400 to other images in the database 3400 rather than comparing the input image patch to the database 3400. This may provide an additional level of confirmation for the classification module's 720 decision and may allow some preprocessing of matching data.

The database comparison could also be done on the symbolic representation for the patch rather than only the image data. For example, the best decision might indicate the image patch contains a 12-point Arial font double-spaced. The database comparison could locate patches in other documents with a similar font, spacing, and word layout using only textual metadata rather than image comparisons.

The database 3400 may support several types of content-based queries. The classification module 720 can pass the database 3400 a feature arrangement and receive a list of documents and x-y locations where that arrangement occurs. For example, features might be trigrams (described below) of word lengths either horizontally or vertically. The database 3400 could be organized to return a list of results in response to either type of query. The classification module 720 or the control structure 714 could combine those rankings to generate a single sorted list of decisions.

Further, there may be feedback between the database 3400, the classification module 720, and the control structure 714. In addition to storing information sufficient to identify a location from a feature vector, the database 3400 may store related information including a pristine image of the document as well as a symbolic representation for its graphical components. This allows the control structure 714 to modify the behavior of other system components on-the-fly. For example, if there are two plausible decisions for a given image patch, the database 3400 could indicate that they could be disambiguated by zooming out and inspecting the area to the right for the presence of an image. The control structure 714 could send the appropriate message to the capture device 106 instructing it to zoom out. The feature extraction module 718 and the classification module 720 could inspect the right side of the image for an image printed on the document.

Further, it is noted that the database 3400 stores detailed information about the data surrounding an image patch, given that the patch is correctly located in a document. This may be used to trigger further hardware and software image analysis steps that are not anticipated in the prior art. That detailed information is provided in one case by a print capture system that saves a detailed symbolic description of a document. In one or more other embodiments, similar information may be obtained by scanning a document.

Still referring to FIG. 7, a position tracking module 724 receives information about the identity of an image patch from the control structure 714. The position tracking module 724 uses that to retrieve a copy of the entire document page or a data structure describing the document from the database 3400. The initial position is an anchor for the beginning of the position tracking process. The position tracking module 724 receives image data from the capture device 106 when the quality assessment module 712 decides the captured image is suitable for tracking. The position tracking module 724 also has information about the time that has elapsed since the last frame was successfully recognized. The position tracking module 724 applies an optical flow technique which allows it to estimate the distance over the document the capture device 106 has been moved between successive frames. Given the sampling rate of the capture device 106, its target can be estimated even though data it sees may not be recognizable. The estimated position of the capture device 106 may be confirmed by comparison of its image data with the corresponding image data derived from the database document. A simple example computes a cross correlation of the captured image with the expected image in the database 3400.

Thus, the position tracking module 724 provides for the interactive use of database images to guide the progress of the position tracking algorithm. This allows for the attachment of electronic interactions to non-text objects such as graphics and images. Further, in one or more other embodiments, such attachment may be implemented without the image comparison/confirmation step described above. In other words, by estimating the instant motion of the capture device 106 over the page, the electronic link that should be in view independent of the captured image may be estimated.

Figure 11:
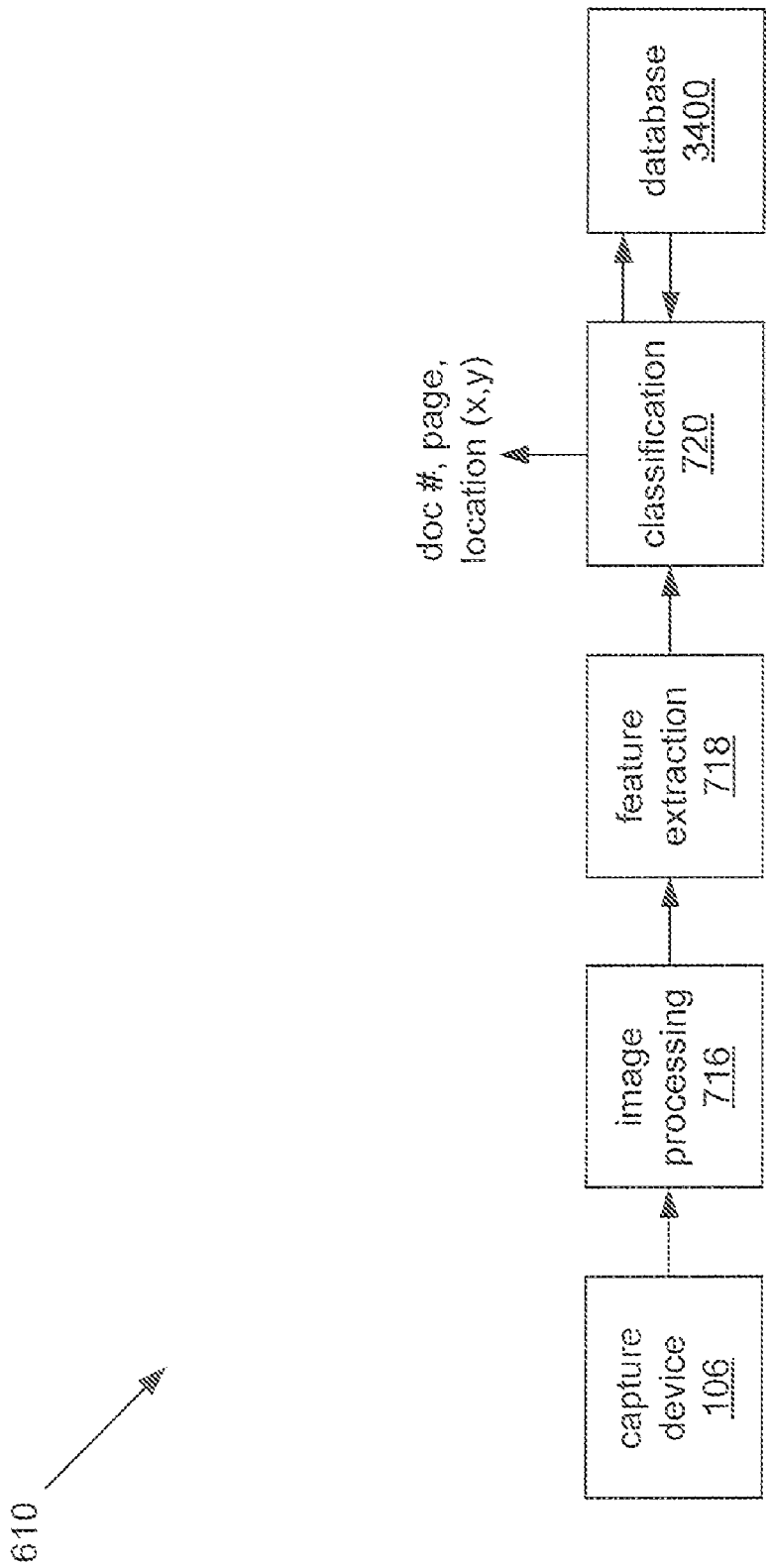
FIG. 11 illustrates a document fingerprint matching technique in accordance with another embodiment of the present invention.

FIG. 11 shows a document fingerprint matching technique in accordance with an embodiment of the present invention. The "feed-forward" technique shown in FIG. 11 processes each patch independently. It extracts features from an image patch that are used to locate one or more pages and the x-y locations on those pages where the patch occurs. For example, in one or more embodiments, feature extraction for document fingerprint matching may depend on the horizontal and vertical grouping of features (e.g., words, characters, blocks) of a captured image. These groups of extracted features may then be used to look up the documents (and the patches within those documents) that contain the extracted features. OCR functionality may be used to identify horizontal word pairs in a captured image. Each identified horizontal word pair is then used to form a search query to database 3400 for determining all the documents that contain the identified horizontal word pair and the x-y locations of the word pair in those documents. For example, for the horizontal word pair "the, cat", the database 3400 may return (15, x, y), (20, x, y), indicating that the horizontal word pair "the, cat" occurs in document 15 and 20 at the indicated x-y locations. Similarly, for each vertically adjacent word pair, the database 3400 is queried for all documents containing instances of the word pair and the x-y locations of the word pair in those documents. For example, for the vertically adjacent word pair "in, hat", the database 3400 may return (15, x, y), (7, x, y), indicating that the vertically adjacent word pair "in, hat" occurs in documents 15 and 7 at the indicated x-y locations. Then, using the document and location information returned by the database 3400, a determination can be made as to which document the most location overlap occurs between the various horizontal word pairs and vertically adjacent word pairs extracted from the captured image. This may result in identifying the document which contains the captured image, in response to which presence of a hot spot and linked media may be determined.

Figure 12:
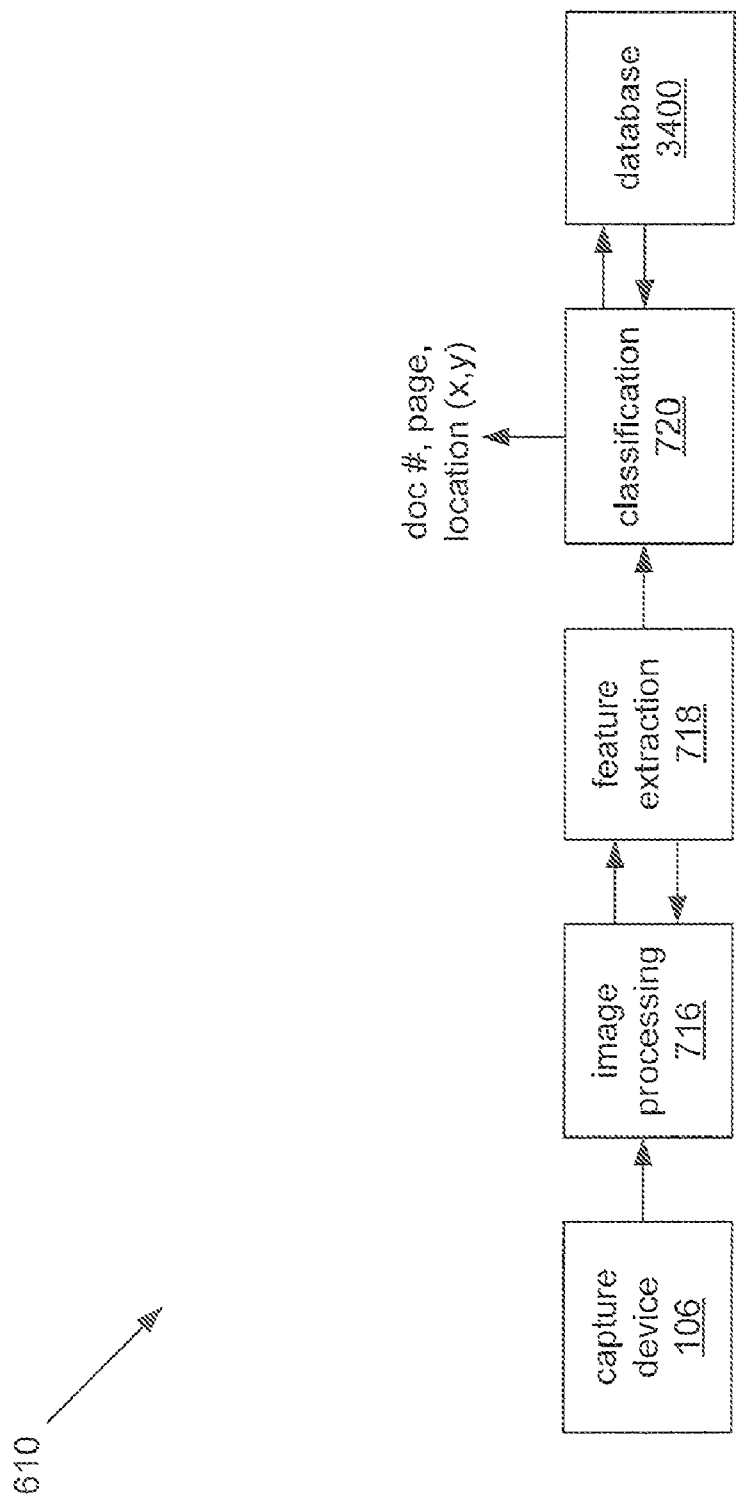
FIG. 12 illustrates a document fingerprint matching technique in accordance with another embodiment of the present invention.

FIG. 12 shows another document fingerprint matching technique in accordance with an embodiment of the present invention. The "interactive image analysis" technique shown in FIG. 12 involves the interaction between image processing and feature extraction that may occur before an image patch is recognized. For example, the image processing module 716 may first estimate the blur in an input image. Then, the feature extraction module 718 calculates the distance from the page and point size of the image text. Then, the image processing module 716 may perform a template matching step on the image using characteristics of fonts of that point size. Subsequently, the feature extraction module 718 may then extract character or word features from the result. Further, those skilled in the art will recognize that the fonts, point sizes, and features may be constrained by the fonts in the database 3400 documents.

Figure 13:
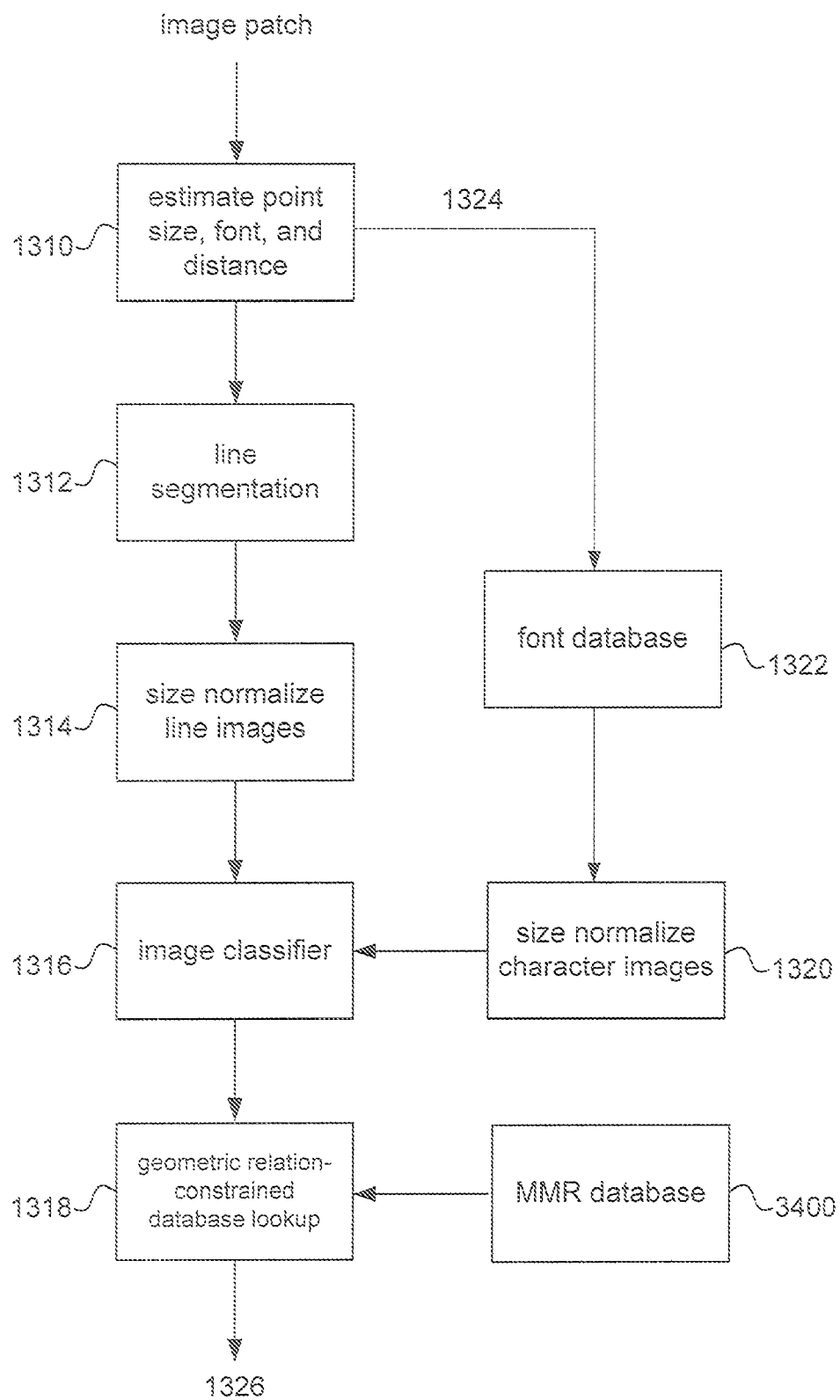
FIG. 13 illustrates an example of interactive image analysis in accordance with an embodiment of the present invention.

An example of interactive image analysis as described above with reference to FIG. 12 is shown in FIG. 13. An input image patch is processed at step 1310 to estimate the font and point size of text in the image patch as well as its distance from the camera. Those skilled in the art will note that font estimation (i.e., identification of candidates for the font of the text in the patch) may be done with known techniques. Point size and distance estimation may be performed, for example, using the flow process described with reference to FIG. 10. Further, other techniques may be used such as known methods of distance from focus that could be readily adapted to the capture device.

Still referring to FIG. 13, a line segmentation algorithm is applied at step 1312 that constructs a bounding box around the lines of text in the patch. The height of each line image is normalized to a fixed size at step 1314 using known techniques such as proportional scaling. The identity for the font detected in the image as well as its point size are passed 1324 to a collection of font prototypes 1322, where they are used to retrieve image prototypes for the characters in each named font.

The font database 1322 may be constructed from the font collection on a user's system that is used by the operating system and other software applications to print documents (e.g., .TrueType, OpenType, or raster fonts in Microsoft Windows). In one or more other embodiments, the font collection may be generated from pristine images of documents in database 3400. The database 3400 xml files provide x-y bounding box coordinates that may be used to extract prototype images of characters from the pristine images. The xml file identifies the name of the font and the point size of the character exactly.

The character prototypes in the selected fonts are size normalized at step 1320 based on a function of the parameters that were used at step 1314. Image classification at step 1316 may compare the size normalized characters outputted at step 1320 to the output at step 1314 to produce a decision at each x-y location in the image patch. Known methods of image template matching may be used to produce output such as (ci, xi, yi, wi, hi), where ci is identity of a character, (xi yi) is the upper left corner of its bounding box, and hi, wi is its width and height, for every character i, i=1 . . . n detected in the image patch.

At step 1318, the geometric relation-constrained database lookup can be performed as described above, but may be specialized in a case for pairs of characters instead of pairs of words. In such cases: "a–b" may indicate that the characters a and b are horizontally adjacent; "a+b" may indicate that they are vertically adjacent; "a/b" may indicate that a is southwest of b; and "a\b" may indicate a is southeast of b. The geometric relations may be derived from the xi yi values of each pair of characters. The MMR database 3400 may be organized so that it returns a list of document pages that contain character pairs instead of word pairs. The output at step 1326 is a list of candidates that match the input image expressed as n-tuples ranked by score (documenti, pagei, xi, yi, actioni, scorei).

Figure 14:
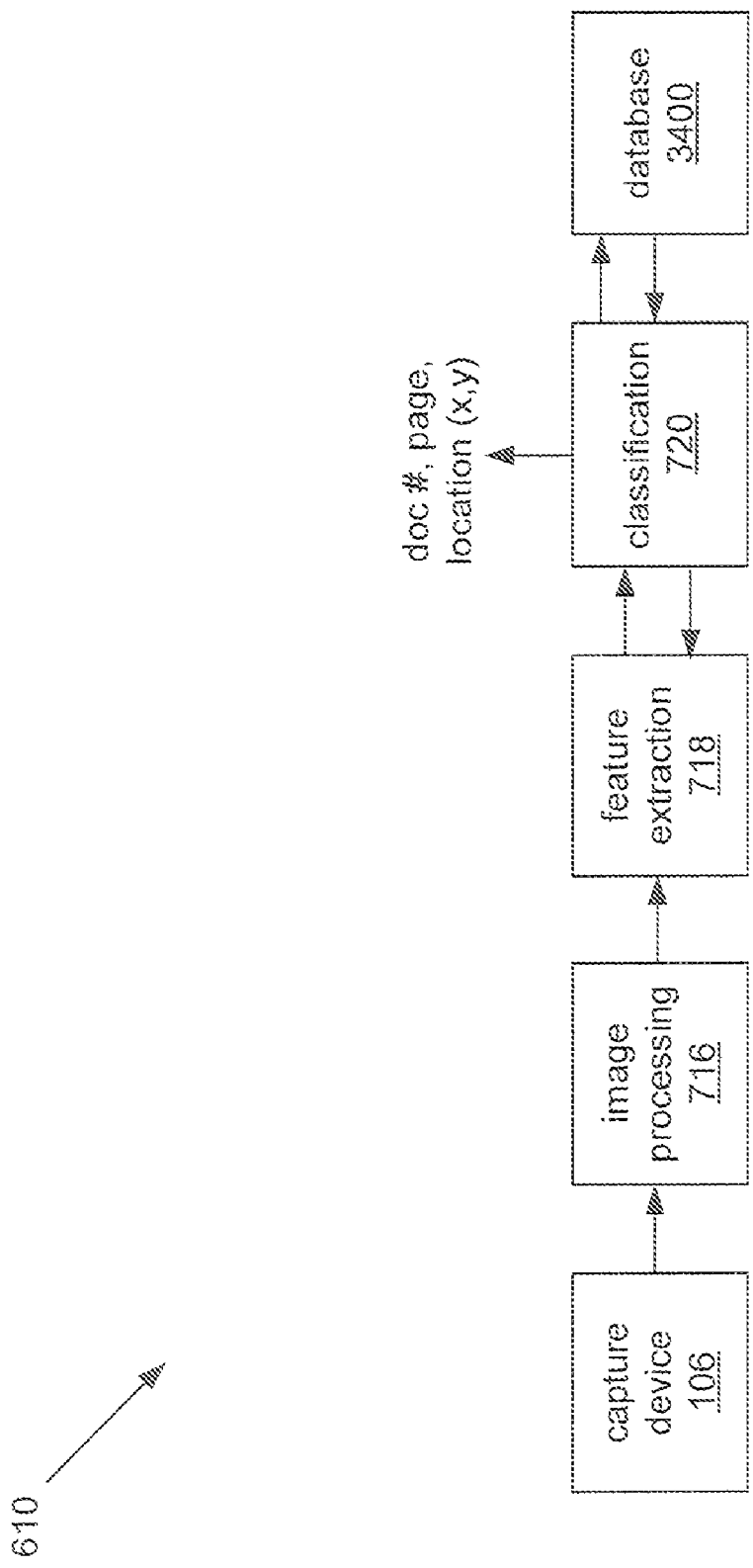
FIG. 14 illustrates a document fingerprint matching technique in accordance with another embodiment of the present invention.

FIG. 14 shows another document fingerprint matching technique in accordance with an embodiment of the present invention. The "generate and test" technique shown in FIG. 14 processes each patch independently. It extracts features from an image patch that are used to locate a number of page images that could contain the given image patch. Further, in one or more embodiments, an additional extraction-classification step may be performed to rank pages by the likelihood that they contain the image patch.

Still referring to the "generate and test" technique described above with reference to FIG. 14, features of a captured image may be extracted and the document patches in the database 3400 that contain the most number of these extracted features may be identified. The first X document patches ("candidates") with the most matching features are then further processed. In this processing, the relative locations of features in the matching document patch candidate are compared with the relative locations of features in the query image. A score is computed based on this comparison. Then, the highest score corresponding to the best matching document patch P is identified. If the highest score is larger than an adaptive threshold, then document patch P is found as matching to the query image. The threshold is adaptive to many parameters, including, for example, the number of features extracted. In the database 3400, it is known where the document patch P comes from, and thus, the query image is determined as coming from the same location.

Figure 15:
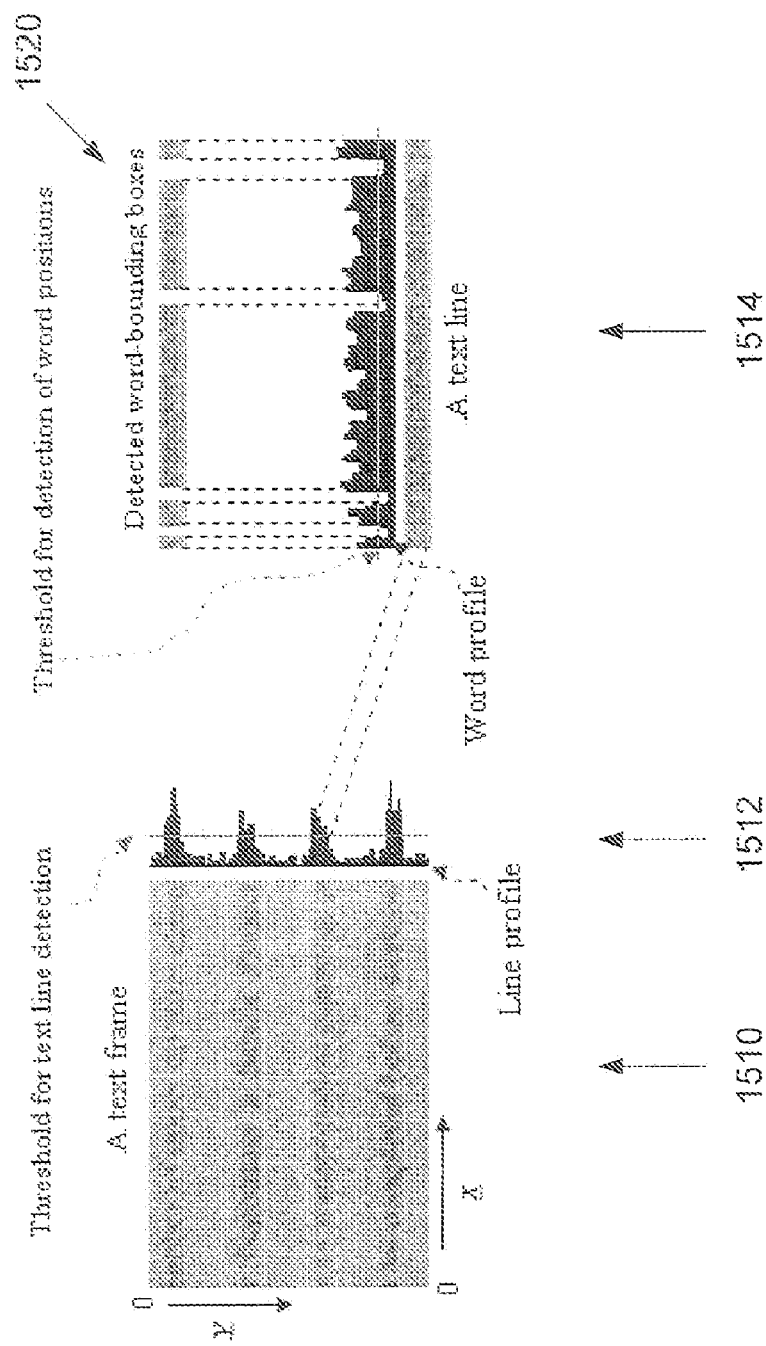
FIG. 15 illustrates an example of word bounding box detection in accordance with an embodiment of the present invention.

FIG. 15 shows an example of a word bounding box detection algorithm. An input image patch 1510 is shown after image processing that corrects for rotation. Commonly known as a skew correction algorithm, this class of technique rotates a text image so that it aligns with the horizontal axis. The next step in the bounding box detection algorithm is the computation of the horizontal projection profile 1512. A threshold for line detection is chosen 1516 by known adaptive thresholding or sliding window algorithms in such a way that the areas "above threshold" correspond to lines of text. The areas within each line are extracted and processed in a similar fashion 1514 and 1518 to locate areas above threshold that are indicative of words within lines. An example of the bounding boxes detected in one line of text is shown in 1520.

Figure 16:
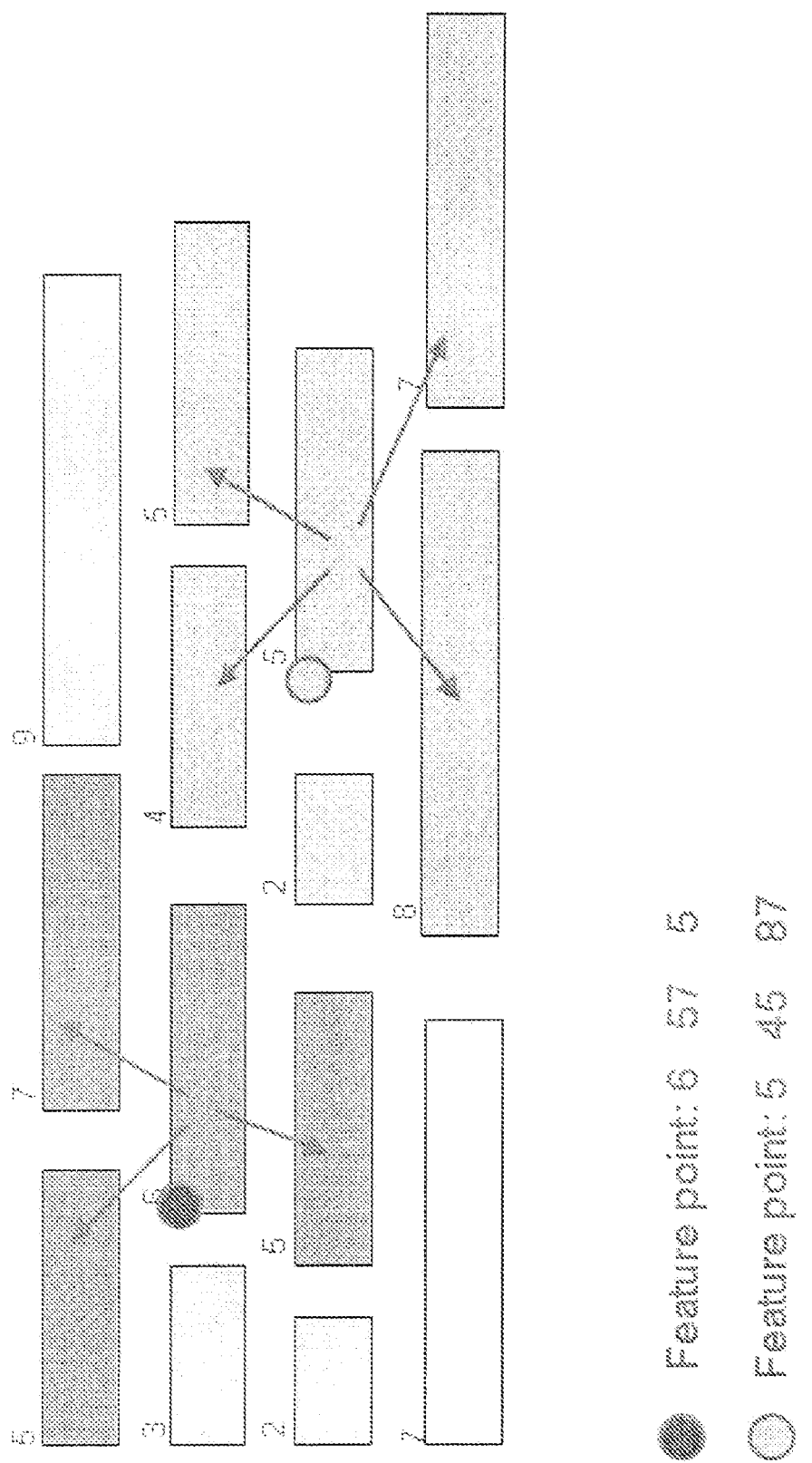
FIG. 16 illustrates a feature extraction technique in accordance with an embodiment of the present invention.

Various features may be extracted for comparison with document patch candidates. For example, Scale Invariant Feature Transform (SIFT) features, corner features, salient points, ascenders, and descenders, word boundaries, and spaces may be extracted for matching. One of the features that can be reliably extracted from document images is word boundaries. Once word boundaries are extracted, they may be formed into groups as shown in FIG. 16. In FIG. 16, for example, vertical groups are formed in such a way that a word boundary has both above and below overlapping word boundaries, and the total number of overlapping word boundaries is at least 3 (noting that the minimum number of overlapping word boundaries may differ in one or more other embodiments). For example, a first feature point (second word box in the second line, length of 6) has two word boundaries above (lengths of 5 and 7) and one word boundary below (length of 5). A second feature point (fourth word box in the third line, length of 5) has two word boundaries above (lengths of 4 and 5) and two word boundaries below (lengths of 8 and 7). Thus, as shown in FIG. 16, the indicated features are represented with the length of the middle word boundary, followed by the lengths of the above word boundaries and then by lengths of the below word boundaries. Further, it is noted that the lengths of the word boxes may be based on any metric. Thus, it is possible to have alternate lengths for some word boxes. In such cases, features may be extracted containing all or some of their alternates.

Figure 17:
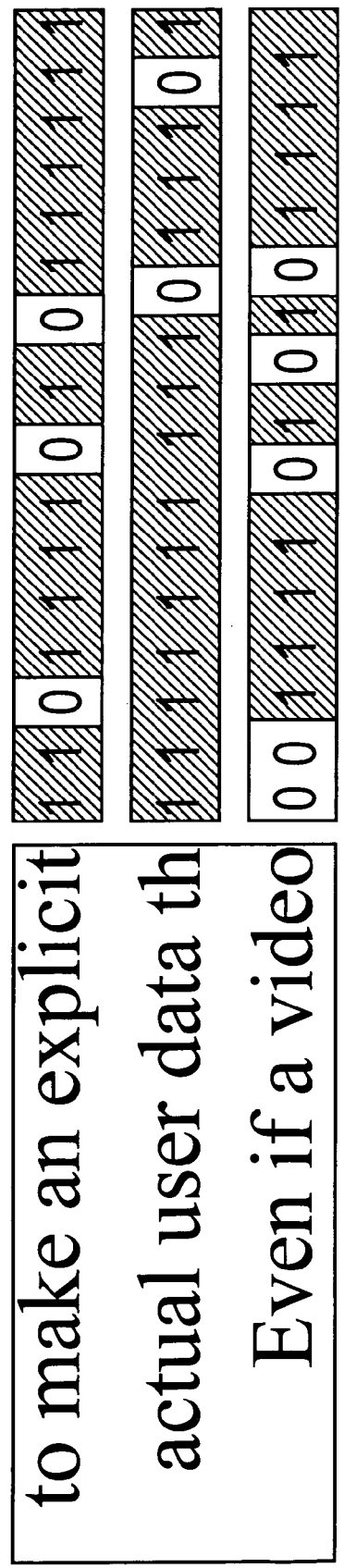
FIG. 17 illustrates a feature extraction technique in accordance with another embodiment of the present invention.

Further, in one or more embodiments, features may be extracted such that spaces are represented with 0s and word regions are represented with 1s. An example is shown in FIG. 17. The block representations on the right side correspond to word/space regions of the document patch on the left side.

Figure 18:
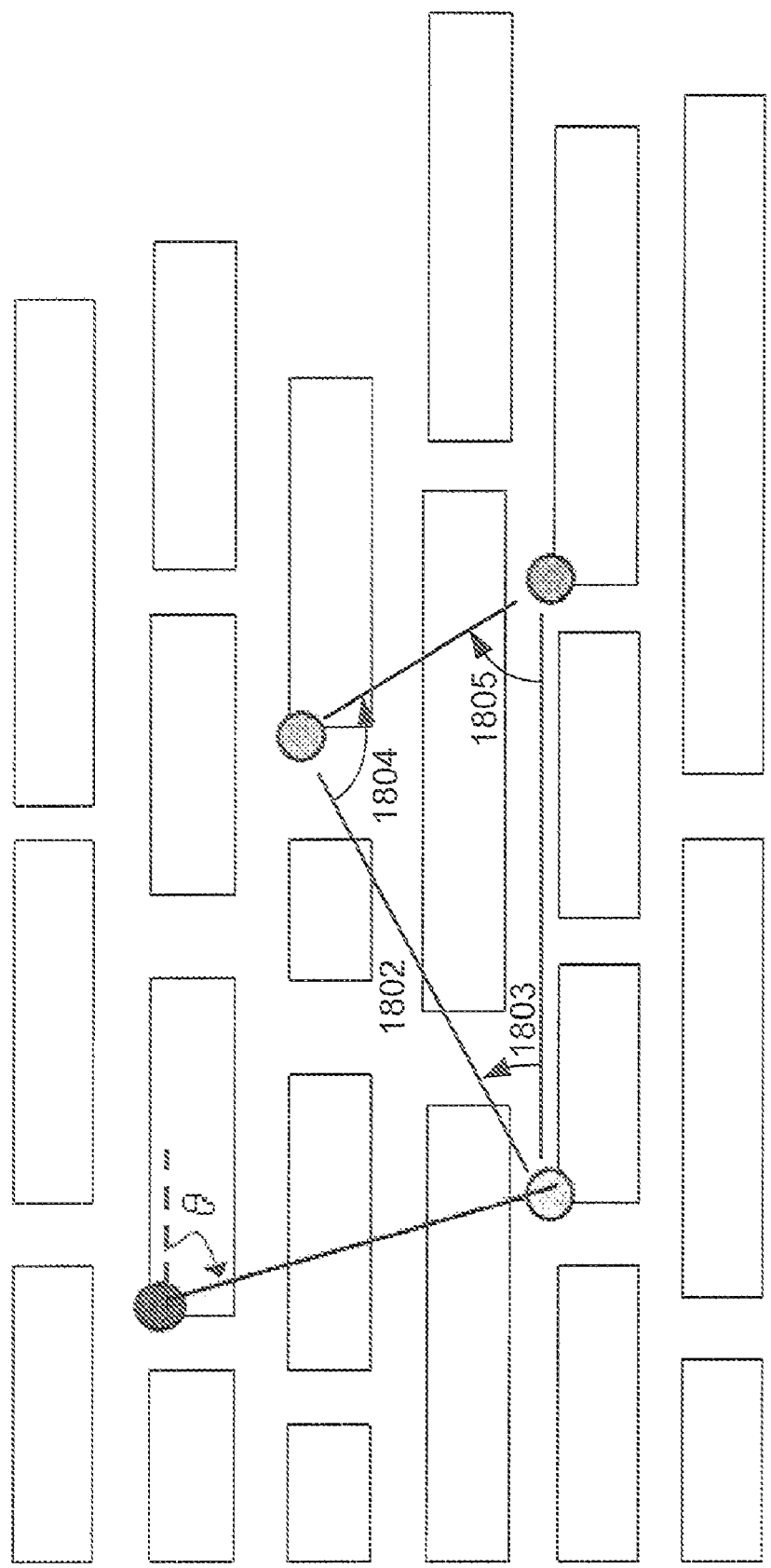
FIG. 18 illustrates a feature extraction technique in accordance with another embodiment of the present invention.

Extracted features may be compared with various distance measures, including, for example, norms and Hamming distance. Alternatively, in one or more embodiments, hash tables may be used to identify document patches that have the same features as the query image. Once such patches are identified, angles from each feature point to other feature points may be computed as shown in FIG. 18. Alternatively, angles between groups of feature points may be calculated. 1802 shows the angles 1803, 1804, and 1805 calculated from a triple of feature points. The computed angles may then be compared to the angles from each feature point to other feature points in the query image. If any angles for matching points are similar, then a similarity score may be increased. Alternatively, if groups of angles are used, and if groups of angles between similar groups of feature points in two images are numerically similar, then a similarity score is increased. Once the scores are computed between the query image to each retrieved document patch, the document patch resulting in the highest score is selected and compared to an adaptive threshold to determine whether the match meets some predetermined criteria. If the criteria is met, then a matching document path is indicated as being found.

Figure 19:
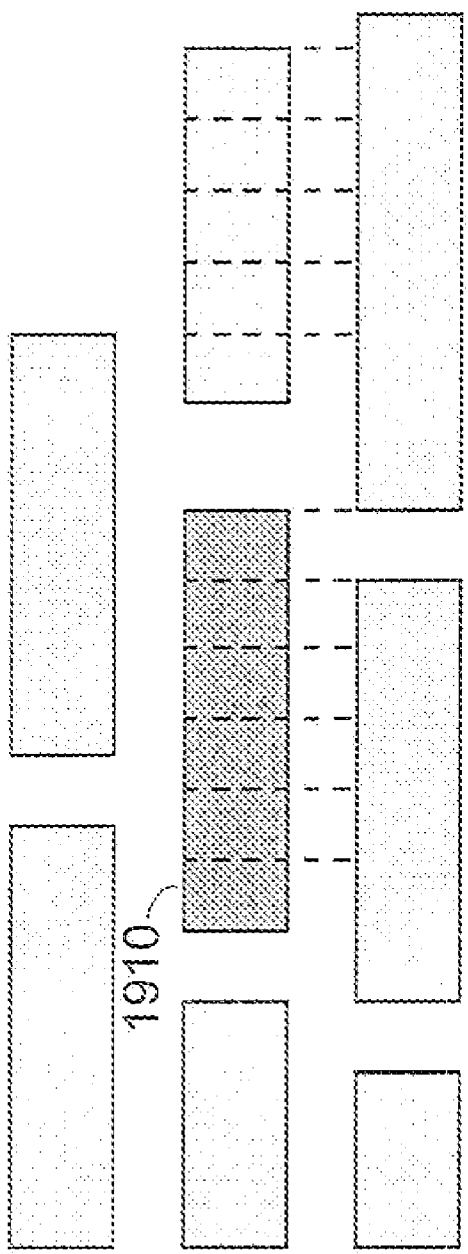
FIG. 19 illustrates a feature extraction technique in accordance with another embodiment of the present invention.

Further, in one or more embodiments, extracted features may be based on the length of words. Each word is divided into estimated letters based on the word height and width. As the word line above and below a given word are scanned, a binary value is assigned to each of the estimated letters according the space information in the lines above and below. The binary code is then represented with an integer number. For example, referring to FIG. 19, it shows an arrangement of word boxes each representing a word detected in a captured image. The word 1910 is divided into estimated letters. This feature is described with (i) the length of the word 1910, (ii) the text arrangement of the line above the word 1910, and (iii) the text arrangement of the line below the word 1910. The length of the word 1910 is measured in numbers of estimated letters. The text arrangement information is extracted from binary coding of the space information above or below the current estimated letter. In word 1910, only the last estimated letter is above a space; the second and third estimated letters are below a space. Accordingly, the feature of word 1910 is coded as (6, 100111, 111110), where 0 means space, and 1 means no space. Rewritten in integer form, word 1910 is coded (6, 39, 62).

Figure 20:
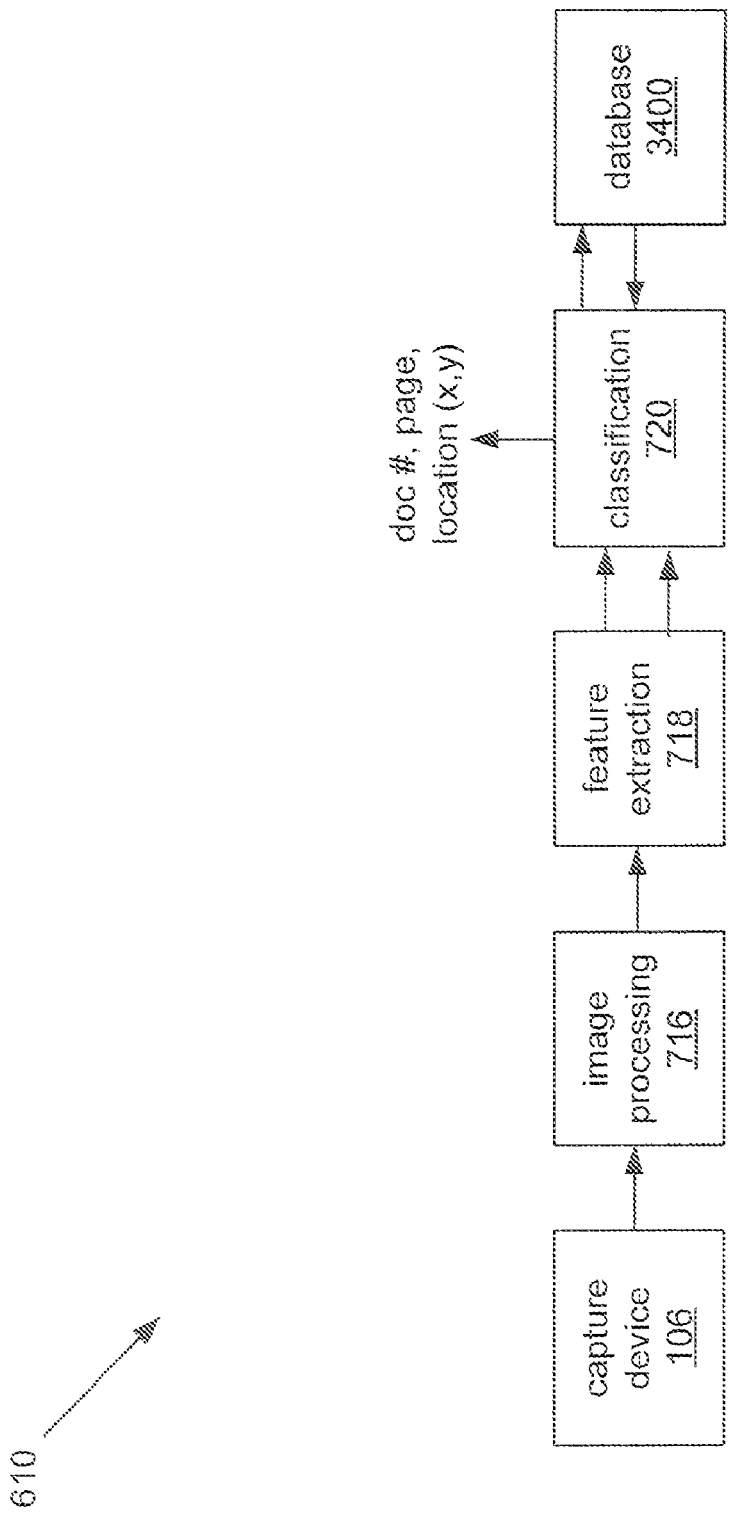
FIG. 20 illustrates a document fingerprint matching technique in accordance with another embodiment of the present invention.
Figure 21:
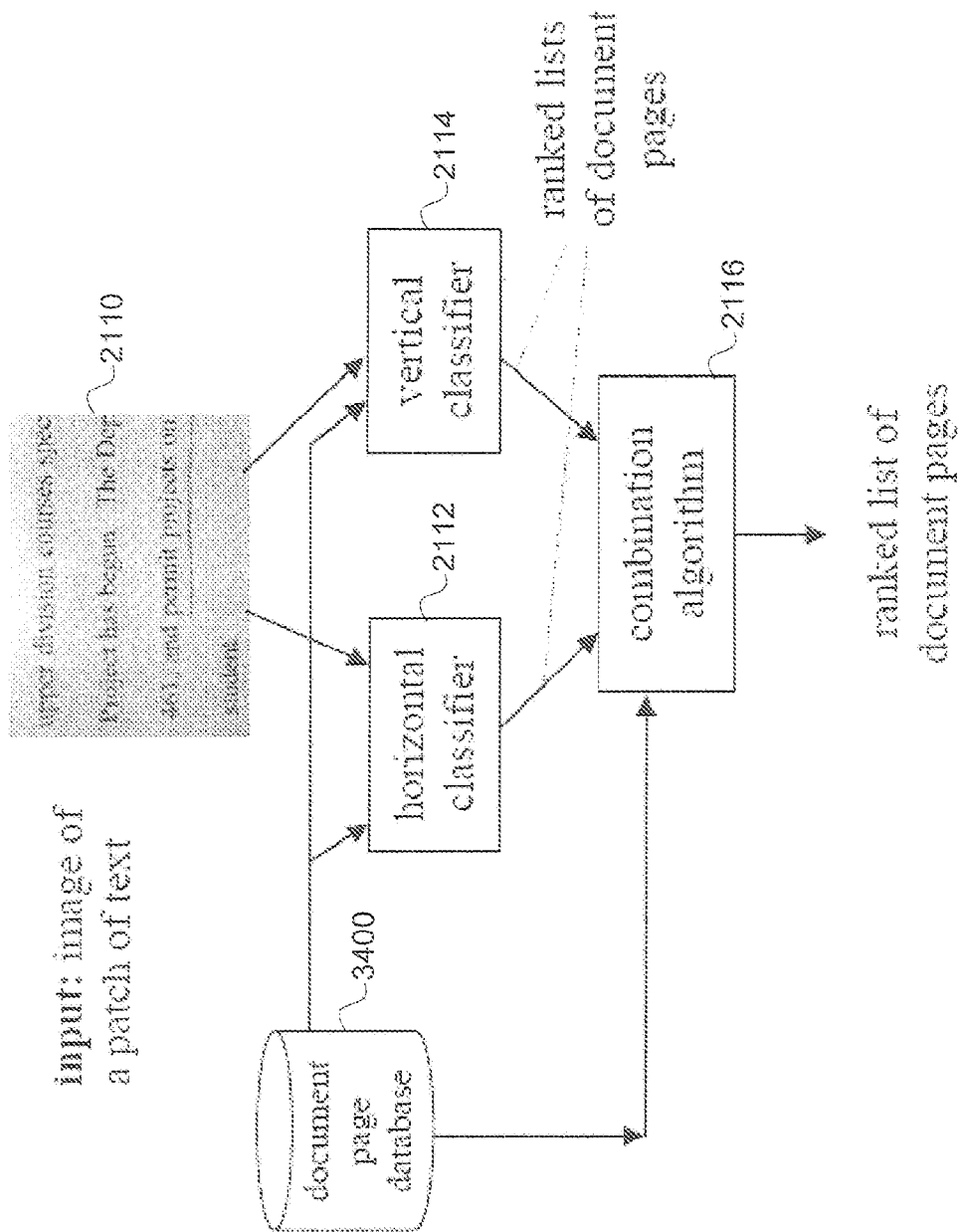
FIG. 21 illustrates multi-classifier feature extraction for document fingerprint matching in accordance with an embodiment of the present invention.

FIG. 20 shows another document fingerprint matching technique in accordance with an embodiment of the present invention. The "multiple classifiers" technique shown in FIG. 20 leverages the complementary information of different feature descriptions by classifying them independently and combining the results. An example of this paradigm applied to text patch matching is extracting the lengths of horizontally and vertically adjacent pairs of words and computing a ranking of the patches in the database separately. More particularly, for example, in one or more embodiments, the locations of features are determined by "classifiers" attendant with the classification module 720. A captured image is fingerprinted using a combination of classifiers for determining horizontal and vertical features of the captured image. This is performed in view of the observation that an image of text contains two independent sources of information as to its identity—in addition to the horizontal sequence of words, the vertical layout of the words can also be used to identity the document from which the image was extracted. For example, as shown in FIG. 21, a captured image 2110 is classified by a horizontal classifier 2112 and a vertical classifier 2114. Each of the classifiers 2112, 2114, in addition to inputting the captured image, takes information from a database 3400 to in turn output a ranking of those document pages to which the respective classifications may apply. In other words, the multi-classifier technique shown in FIG. 21 independently classifies a captured image using horizontal and vertical features. The ranked lists of document pages are then combined according to a combination algorithm 2118 (examples further described below), which in turn outputs a ranked list of document pages, the list being based on both the horizontal and vertical features of the captured image 2110. Particularly, in one or more embodiments, the separate rankings from the horizontal classifier 2112 and the vertical classifier 2114 are combined using information about how the detected features co-occur in the database 3400.

Figure 22:
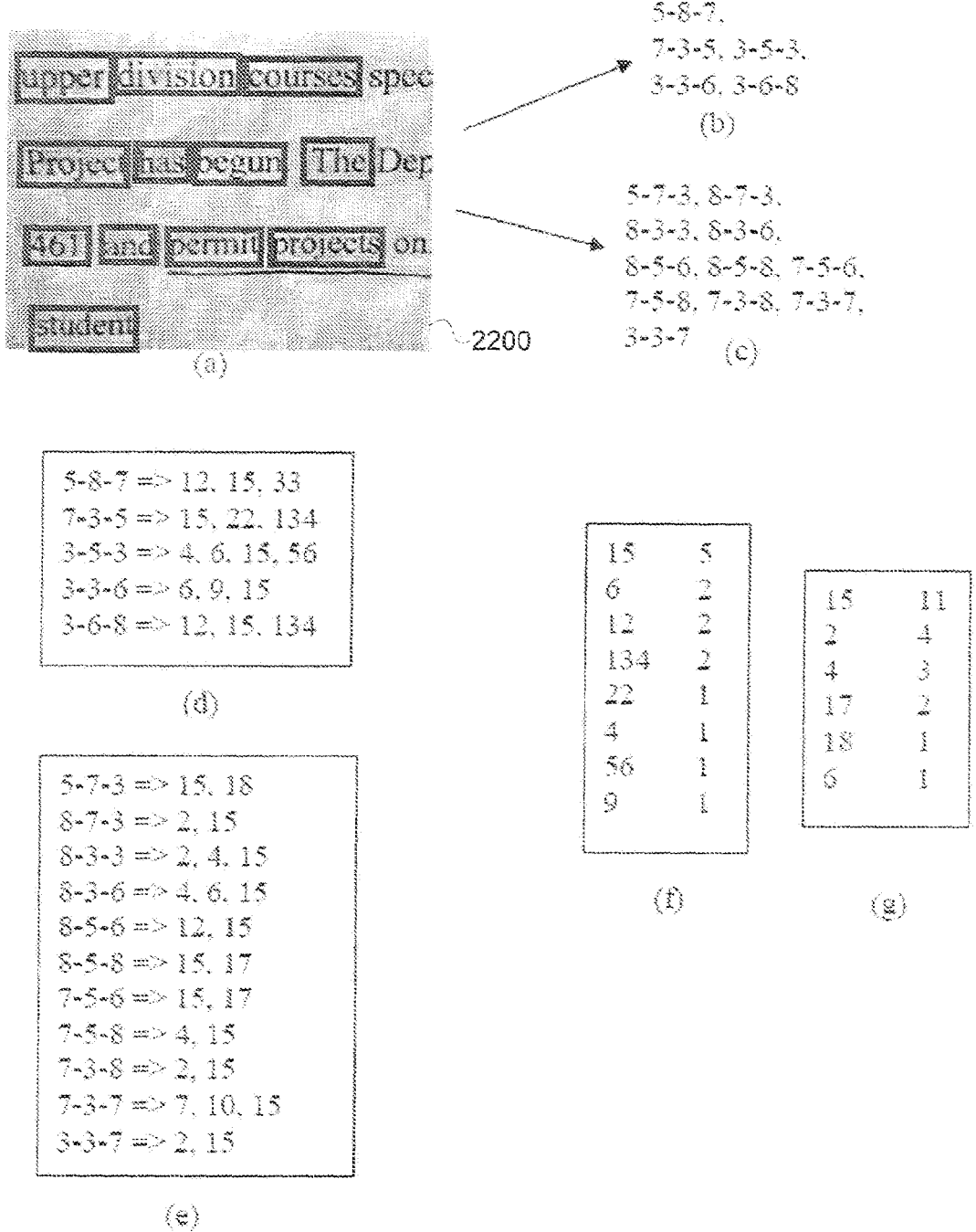
FIGS. 22 and 23 illustrate an example of a document fingerprint matching technique in accordance with an embodiment of the present invention.

Now also referring to FIG. 22, it shows an example of how vertical layout is integrated with horizontal layout for feature extraction. In (a), a captured image 2200 with word divisions is shown. From the captured image 2200, horizontal and vertical "n-grams" are determined. An "n-gram" is a sequence of n numbers each describing a quantity of some characteristic. For example, a horizontal trigram specifies the number of characters in each word of a horizontal sequence of three words. For example, for the captured image 2200, (b) shows horizontal trigrams: 5-8-7 (for the number of characters in each of the horizontally sequenced words "upper", "division", and "courses" in the first line of the captured image 2200); 7-3-5 (for the number of characters in each of the horizontally sequenced words "Project", "has", and "begun" in the second line of the captured image 2200); 3-5-3 (for the number of characters in each of the horizontally sequenced words "has", "begun", and "The" in the second line of the captured image 2200); 3-3-6 (for the number of characters in each of the horizontally sequenced words "461", "and", and "permit" in the third line of the captured image 2200); and 3-6-8 (for the number of characters in each of the horizontally sequenced words "and", "permit", and "projects" in the third line of the captured image 2200).

A vertical trigram specifies the number of characters in each word of a vertical sequence of words above and below a given word. For example, for the captured image 2200, (c) shows vertical trigrams: 5-7-3 (for the number of characters in each of the vertically sequenced words "upper", "Project", and "461"); 8-7-3 (for the number of characters in each of the vertically sequenced words "division", "Project", and "461"); 8-3-3 (for the number of characters in each of the vertically sequenced words "division", "has", and "and"); 8-3-6 (for the number of characters in each of the vertically sequenced words "division", "has", and "permit"); 8-5-6 (for the number of characters in each of the vertically sequenced words "division", "begun", and "permit"); 8-5-8 (for the number of characters in each of the vertically sequenced words "division", "begun", and "projects"); 7-5-6 (for the number of characters in each of the vertically sequenced words "courses", "begun", and "permit"); 7-5-8 (for the number of characters in each of the vertically sequenced words "courses", "begun", and "projects"); 7-3-8 (for the number of characters in each of the vertically sequenced words "courses", "The", and "projects"); 7-3-7 (for the number of characters in each of the vertically sequenced words "Project", "461", and "student"); and 3-3-7 (for the number of characters in each of the vertically sequenced words "has", "and", and "student").

Based on the determined horizontal and vertical trigrams from the captured image 2200 shown in FIG. 22, lists of documents (d) and (e) are generated indicating the documents the contain each of the horizontal and vertical trigrams. For example, in (d), the horizontal trigram 7-3-5 occurs in documents 15, 22, and 134. Further, for example, in (e), the vertical trigram 7-5-6 occurs in documents 15 and 17. Using the documents lists of (d) and (e), a ranked list of all the referenced documents are respectively shown in (f) and (g). For example, in (f), document 15 is referenced by five horizontal trigrams in (d), whereas document 9 is only referenced by one horizontal trigram in (d). Further, for example, in (g), document 15 is referenced by eleven vertical trigrams in (e), whereas document 18 is only referenced by one vertical trigram in (e).

Figure 23:
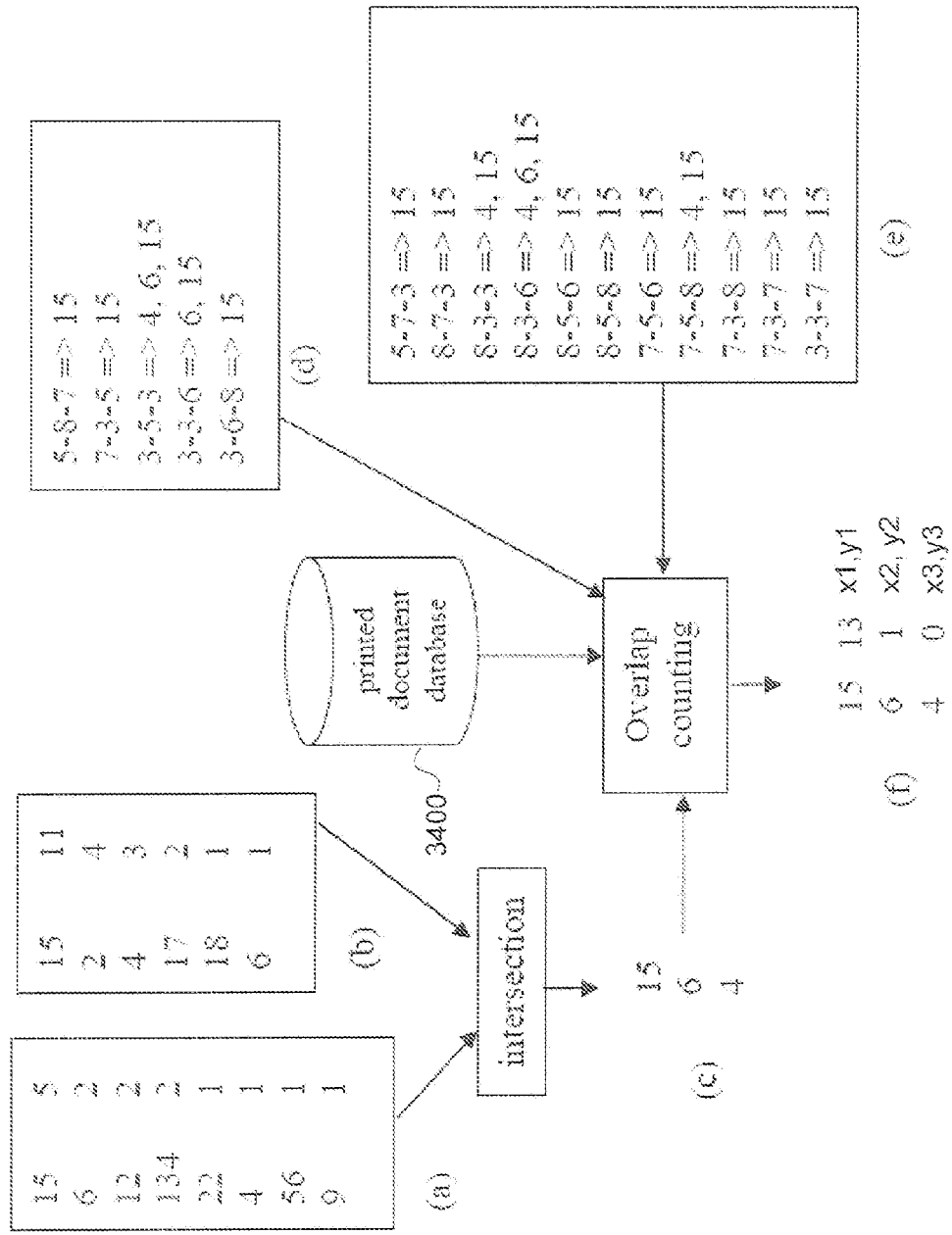

Now also referring to FIG. 23, it shows a technique for combining the horizontal and vertical trigram information described with reference to FIG. 22. The technique combines the lists of votes from the horizontal and vertical feature extraction using information about the known physical location of trigrams on the original printed pages. For every document in common among the top M choices outputted by each of the horizontal and vertical classifiers, the location of every horizontal trigram that voted for the document is compared to the location of every vertical trigram that voted for that document. A document receives a number of votes equal to the number of horizontal trigrams that overlap any vertical trigram, where "overlap" occurs when the bounding boxes of two trigrams overlap. In addition, the x-y positions of the centers of overlaps are counted with a suitably modified version of the evidence accumulation algorithm described below with reference to 3406 of FIG. 34A. For example, as shown in FIG. 23, the lists in (a) and (b) (respectively (f) and (g) in FIG. 22) are intersected to determine a list of pages (c) that are both referenced by horizontal and vertical trigrams. Using the intersected list (c), lists (d) and (e) (showing only the intersected documents as referenced to by the identified trigrams), and a printed document database 3400, an overlap of documents is determined. For example, document 6 is referenced by horizontal trigram 3-5-3 and by vertical trigram 8-3-6, and those two trigrams themselves overlap over the word "has" in the captured image 2200; thus document 6 receives one vote for the one overlap. As shown in (f), for the particular captured image 2200, document 15 receives the most number of votes and is thus identified as the document containing the captured image 2200. (x1, y1) is identified as the location of the input image within document 15. Thus, in summary of the document fingerprint matching technique described above with reference to FIGS. 22 and 23, a horizontal classifier uses features derived from the horizontal arrangement of words of text, and a vertical classifier uses features derived from the vertical arrangement of those words, where the results are combined based on the overlap of those features in the original documents. Such feature extraction provides a mechanism for uniquely identifying documents in that while the horizontal aspects of this feature extraction are subject to the constraints of proper grammar and language, the vertical aspects are not subject to such constraints.

Further, although the description with reference to FIGS. 22 and 23 is particular to the use of trigrams, any n-gram may be used for one or both of horizontal and vertical feature extraction/classification. For example, in one or more embodiments, vertical and horizontal n-grams, where n=4, may be used for multi-classifier feature extraction. In one or more other embodiments, the horizontal classifier may extract features based on n-grams, where n=3, whereas the vertical classifier may extract features based on n-grams, where n=5.

Further, in one or more embodiments, classification may be based on adjacency relationships that are not strictly vertical or horizontal. For example, NW, SW, NW, and SE adjacency relationships may be used for extraction/classification.

Figure 24:
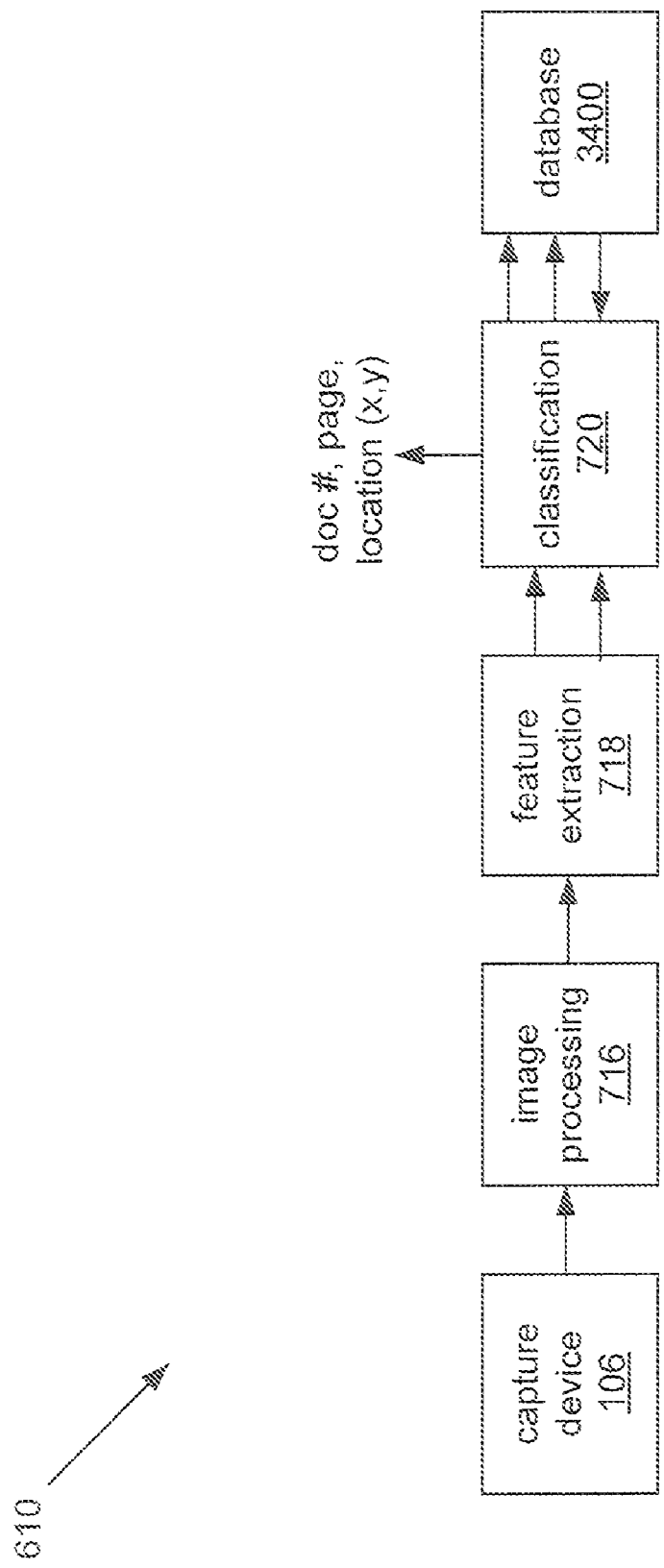
FIG. 24 illustrates a document fingerprint matching technique in accordance with another embodiment of the present invention.

FIG. 24 shows another document fingerprint matching technique in accordance with an embodiment of the present invention. The "database-driven feedback" technique shown in FIG. 24 takes into consideration that the accuracy of a document image matching system may be improved by utilizing the images of the documents that could match the input to determine a subsequent step of image analysis in which sub-images from the pristine documents are matched to the input image. The technique includes a transformation that duplicates the noise present in the input image. This may be followed by a template matching analysis.

Figure 25:
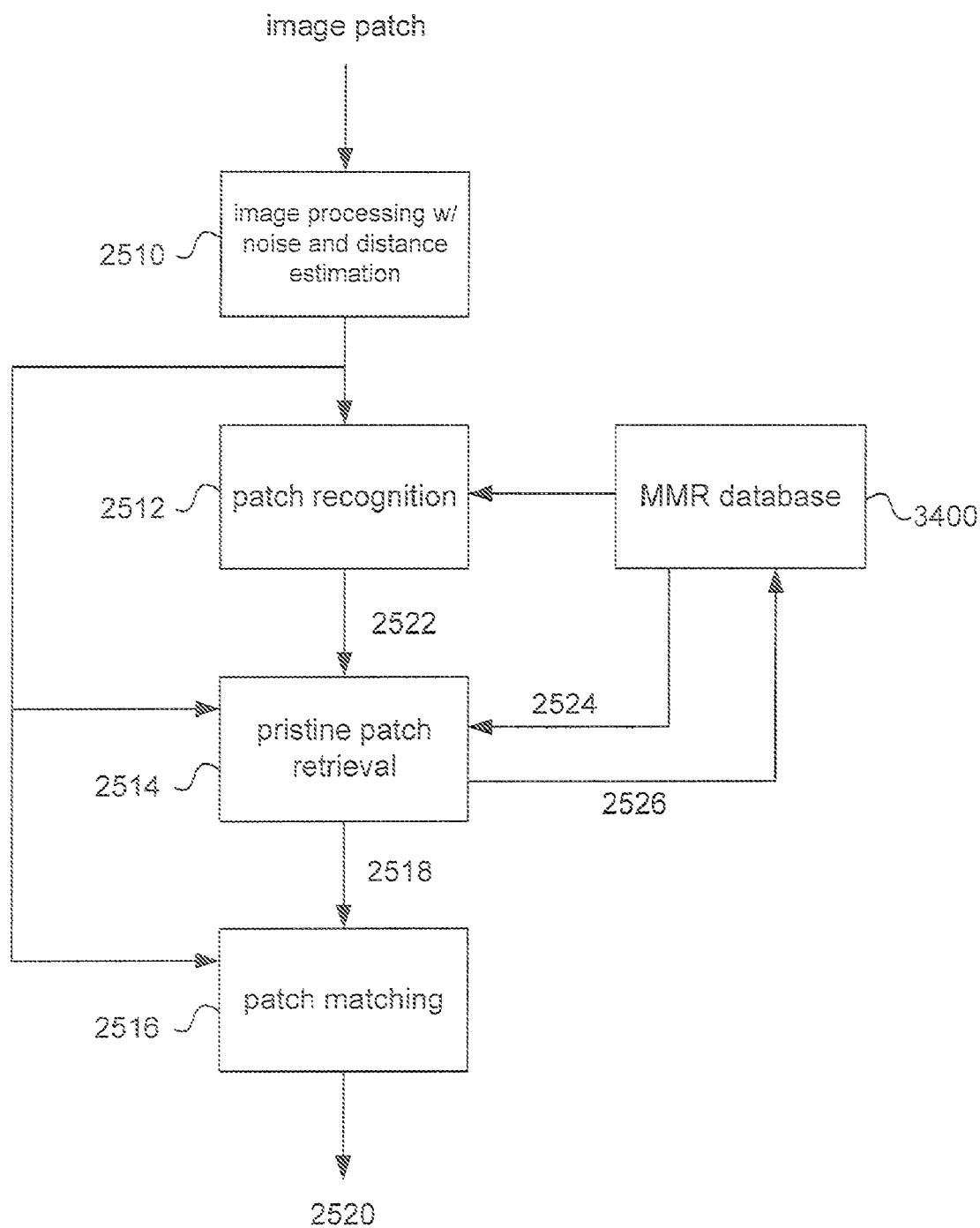
FIG. 25 illustrates a flow process for database-driven feedback in accordance with an embodiment of the present invention.

FIG. 25 shows a flow process for database-driven feedback in accordance with an embodiment of the present invention. An input image patch is first preprocessed and recognized at steps 2510, 2512 as described above (e.g., using word OCR and word-pair lookup, character OCR and character pair lookup, word bounding box configuration) to produce a number of candidates for the identification of an image patch 2522. Each candidate in this list may contain the following items (doci, pagei, xi, yi), where doci is an identifier for a document, pagei a page within the document, and (xi, yi) is the x-y coordinates of the center of the image patch within that page.

A pristine patch retrieval algorithm at step 2514 normalizes the size of the entire input image patch to a fixed size optionally using knowledge of the distance from the page to ensure that it is transformed to a known spatial resolution, e.g., 100 dpi. The font size estimation algorithm described above may be adapted to this task. Similarly, known distance from focus or depth from focus techniques may be used. Also, size normalization can proportionally scale the image patches based on the heights of their word bounding boxes.

The pristine patch retrieval algorithm queries the MMR database 3400 with the identifier for each document and page it receives together with the center of the bounding box for a patch that the MMR database will generate. The extent of the generated patch depends on the size of the normalized input patch. In such a manner, patches of the same spatial resolution and dimensions may be obtained. For example, when normalized to 100 dpi, the input patch can extend 50 pixels on each side of its center. In this case, the MMR database would be instructed to generate a 100 dpi pristine patch that is 100 pixels high and wide centered at the specified x-y value.

Each pristine image patch returned from the MMR database 2524 may be associated with the following items (doci, pagei, xi, yi, widthi, heighti, actioni), where (doci, pagei, xi, yi) are as described above, widthi and heighti are the width and height of the pristine patch in pixels, and actioni is an optional action that might be associated with the corresponding area in doci's entry in the database. The pristine patch retrieval algorithm outputs 2518 this list of image patches and data 2518 together with the size normalized input patch it constructed.

Further, in one or more embodiments, the patch matching algorithm 2516 compares the size normalized input patch to each pristine patch and assigns a score 2520 that measures how well they match one another. Those skilled in the art will appreciate that a simple cross correlation to a Hamming distance suffices in many cases because of the mechanisms used to ensure that sizes of the patches are comparable. Further, this process may include the introduction of noise into the pristine patch that mimics the image noise detected in the input. The comparison could also be arbitrarily complex and could include a comparison of any feature set including the OCR results of the two patches and a ranking based on the number of characters, character pairs, or word pairs where the pairs could be constrained by geometric relations as before. However, in this case, the number of geometric pairs in common between the input patch and the pristine patch may be estimated and used as a ranking metric.

Further, the output 2520 may be in the form of n-tuples (doci, pagei, xi, yi, actioni, scorei), where the score is provided by the patch matching algorithm and measures how well the input patch matches the corresponding region of doci, pagei.

Figure 26:
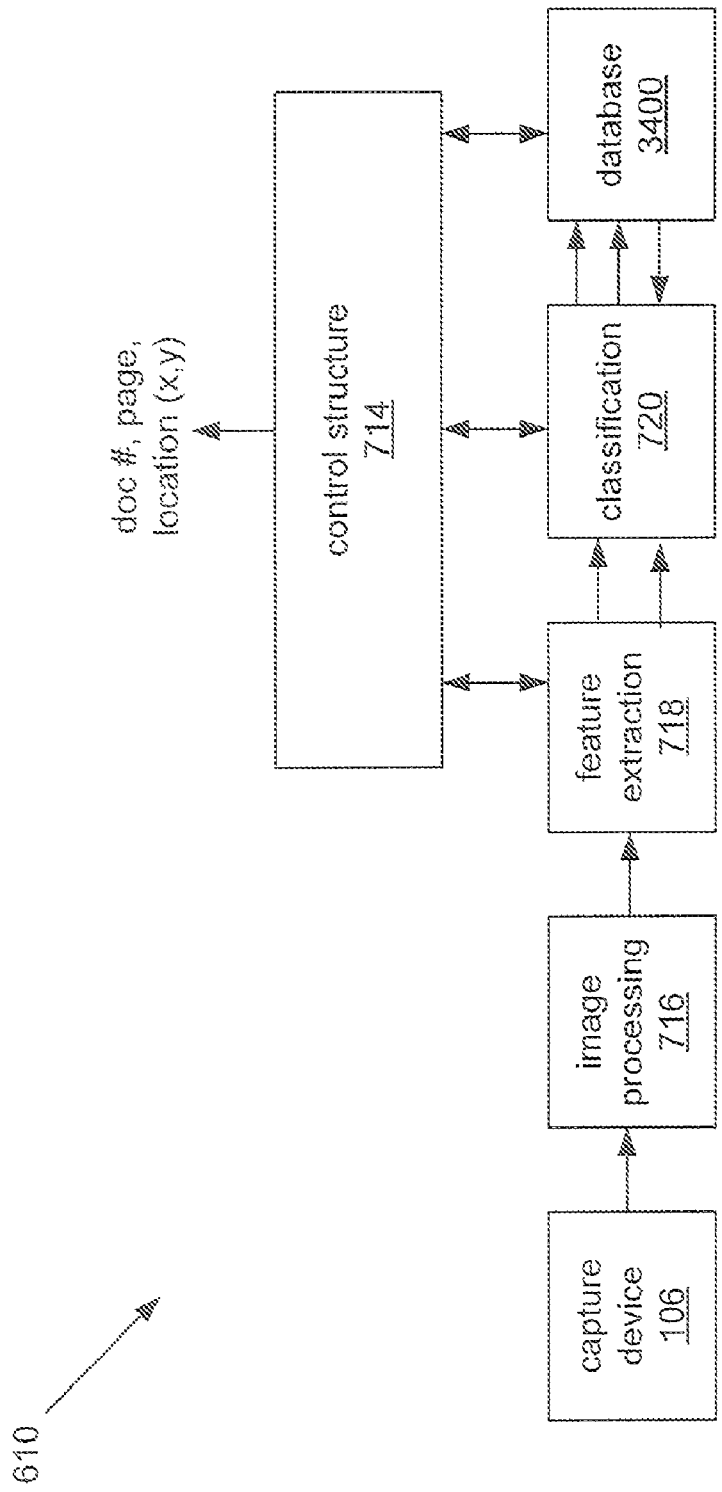
FIG. 26 illustrates a document fingerprint matching technique in accordance with another embodiment of the present invention.

FIG. 26 shows another document fingerprint matching technique in accordance with an embodiment of the present invention. The "database-driven classifier" technique shown in FIG. 26 uses an initial classification to generate a set of hypotheses that could contain the input image. Those hypotheses are looked up in the database 3400 and a feature extraction plus classification strategy is automatically designed for those hypotheses. An example is identifying an input patch as containing either a Times or Arial font. In this case, the control structure 714 invokes a feature extractor and classifier specialized for serif/san serif discrimination.

Figure 27:
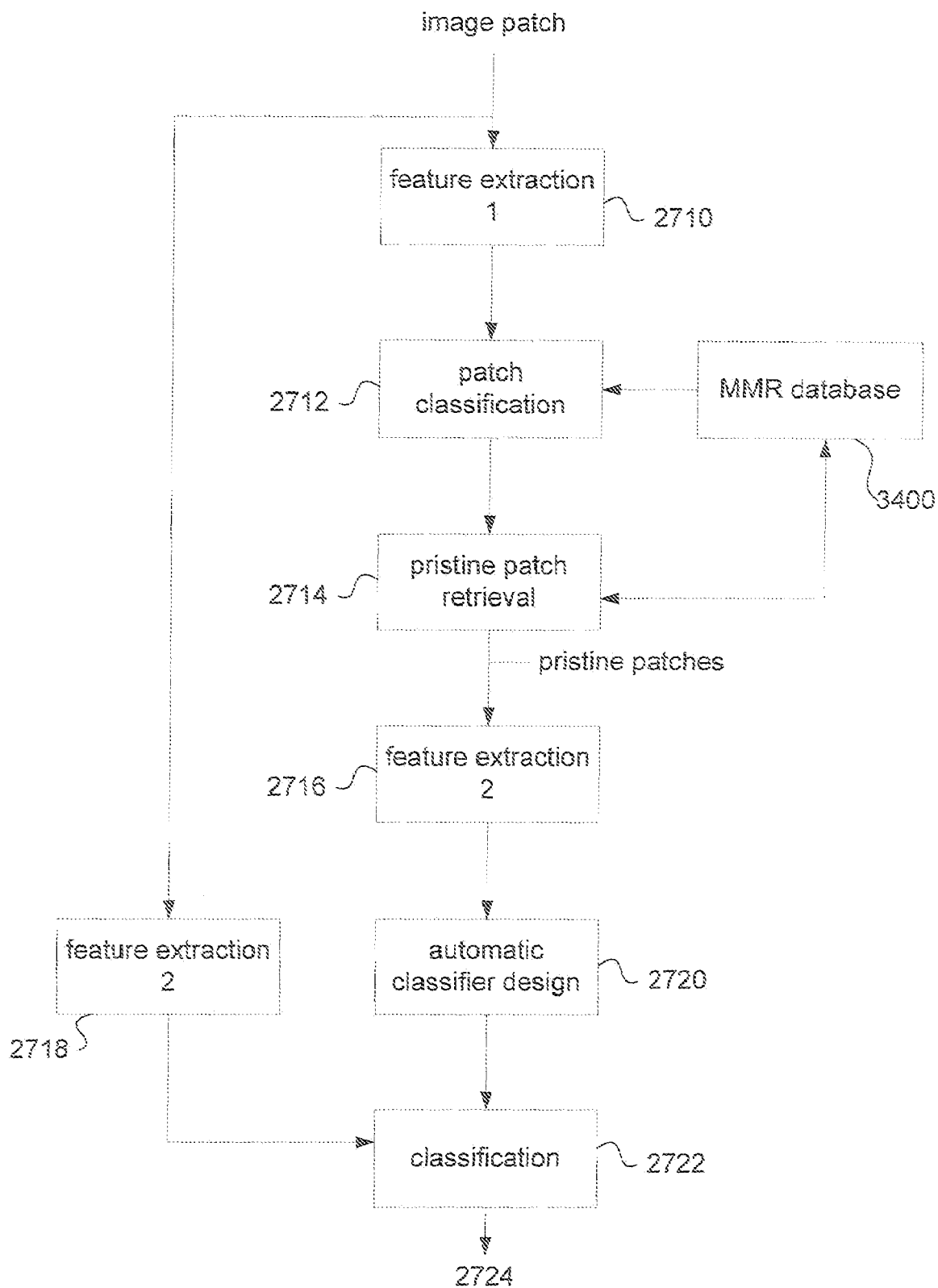
FIG. 27 illustrates a flow process for database-driven classification in accordance with an embodiment of the present invention.

FIG. 27 shows a flow process for database-driven classification in accordance with an embodiment of the present invention. Following a first feature extraction 2710, the input image patch is classified 2712 by any one or more of the recognition methods described above to produce a ranking of documents, pages, and x-y locations within those pages. Each candidate in this list may contain, for example, the following items (doci, pagei, xi, yi), where doci is an identifier for a document, pagei a page within the document, and (xi, yi) are the x-y coordinates of the center of the image patch within that page. The pristine patch retrieval algorithm 2714 described with reference to FIG. 25 may be used to generate a patch image for each candidate.

Still referring to FIG. 27, a second feature extraction is applied to the pristine patches 2716. This may differ from the first feature extraction and may include, for example, one or more of a font detection algorithm, a character recognition technique, bounding boxes, and SIFT features. The features detected in each pristine patch are inputted to an automatic classifier design method 2720 that includes, for example, a neural network, support vector machine, and/or nearest neighbor classifier that are designed to classify an unknown sample as one of the pristine patches. The same second feature extraction may be applied 2718 to the input image patch, and the features it detects are inputted to this newly designed classifier that may be specialized for the pristine patches.

The output 2724 may be in the form of n-tuples (doci, pagei, xi, yi, actioni, scorei), where the score is provided by the classification technique 2722 that was automatically designed by 2720. Those skilled in the art will appreciate that the score measures how well the input patch matches the corresponding region of doci, pagei.

Figure 28:
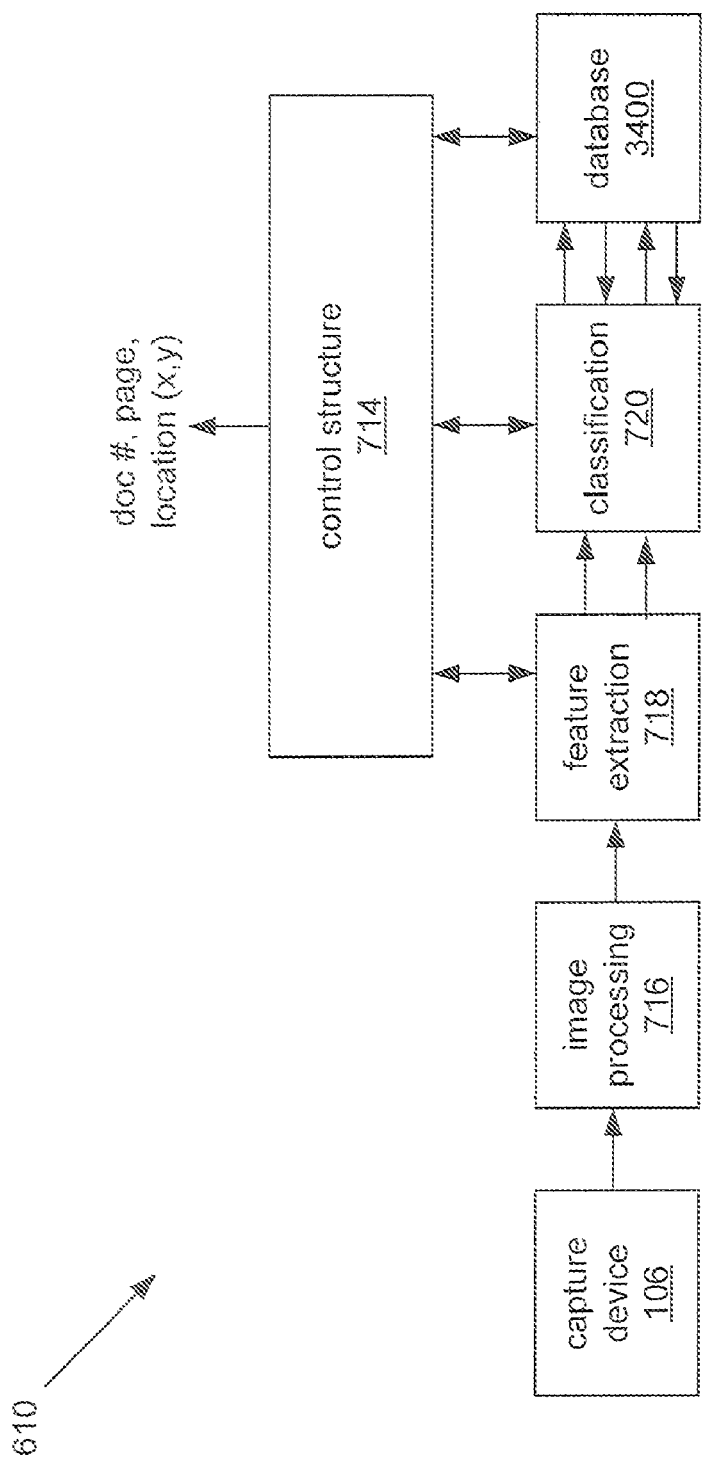
FIG. 28 illustrates a document fingerprint matching technique in accordance with another embodiment of the present invention.

FIG. 28 shows another document fingerprint matching technique in accordance with an embodiment of the present invention. The "database-driven multiple classifier" technique shown in FIG. 28 reduces the chance of a non-recoverable error early in the recognition process by carrying multiple candidates throughout the decision process. Several initial classifications are performed. Each generates a different ranking of the input patch that could be discriminated by different feature extraction and classification. For example, one of those sets might be generated by horizontal n-grams and uniquely recognized by discriminating serif from sanserif. Another example might be generated by vertical n-grams and uniquely recognized by accurate calculation of line separation.

Figure 29:
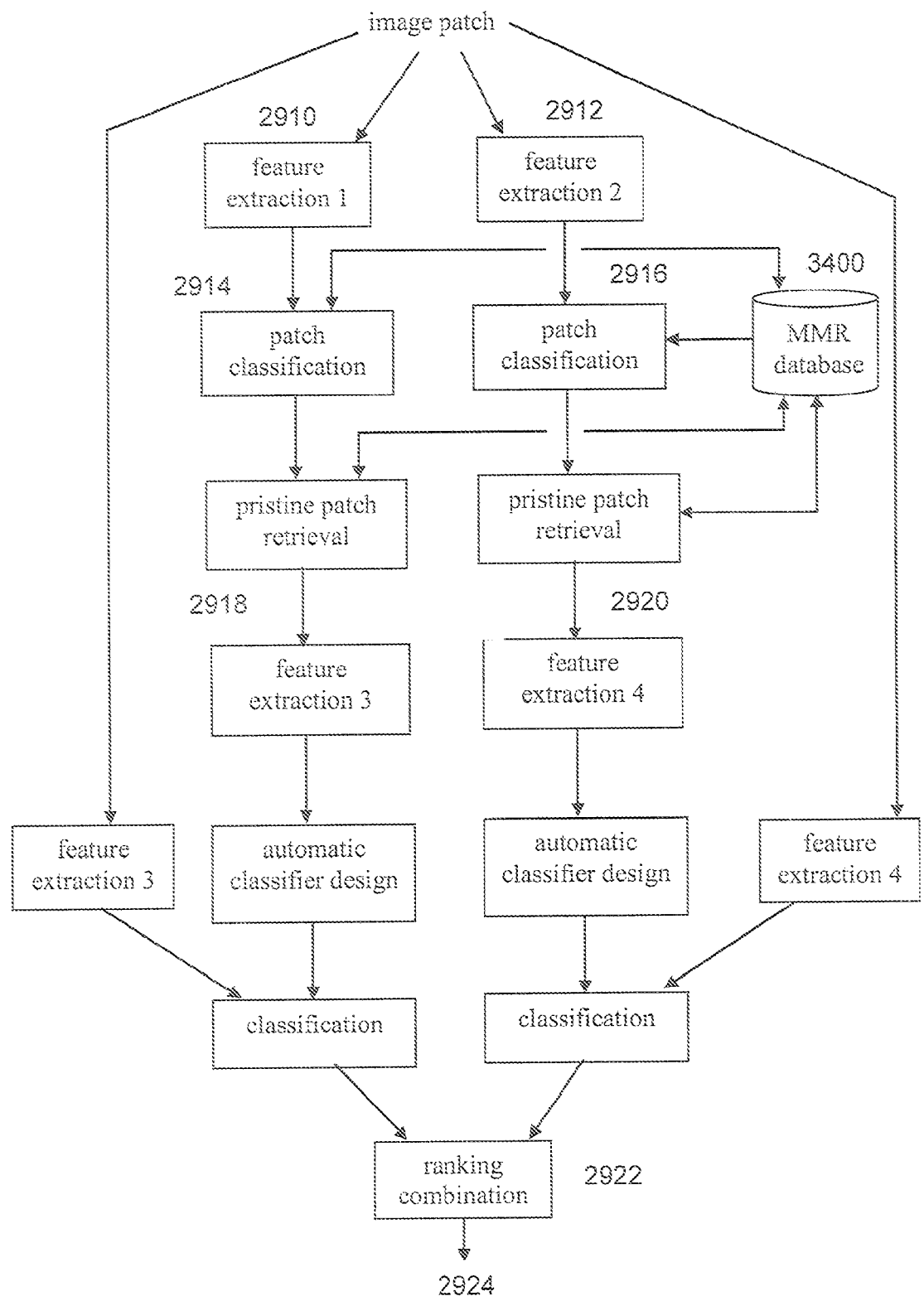
FIG. 29 illustrates a flow process for database-driven multiple classification in accordance with an embodiment of the present invention.

FIG. 29 shows a flow process for database-driven multiple classification in accordance with an embodiment of the present invention. The flow process is similar to that shown in FIG. 27, but it uses multiple different feature extraction algorithms 2910 and 2912 to produce independent rankings of the input image patch with the classifiers 2914 and 2916. Examples of features and classification techniques include horizontal and vertical word-length n-grams described above. Each classifier may produce a ranked list of patch identifications that contains at least the following items (doci, pagei, xi, yi, scorei) for each candidate, where doci is an identifier for a document, pagei a page within the document, (xi, yi) are the x-y coordinates of the center of the image patch within that page, and scorei measures how well the input patch matches the corresponding location in the database document.

The pristine patch retrieval algorithm described above with reference to FIG. 25 may be used to produce a set of pristine image patches that correspond to the entries in the list of patch identifications in the output of 2914 and 2916. A third and fourth feature extraction 2918 and 2920 may be applied as before to the pristine patches and classifiers automatically designed and applied as described above in FIG. 27.

Still referring to FIG. 29, the rankings produced by those classifiers are combined to produce a single ranking 2924 with entries (doci, pagei, xi, yi, actioni, scorei) for i=1 . . . number of candidates, and where the values in each entry are as described above. The ranking combination 2922 may be performed by, for example, a known Borda count measure that assigns an item a score based on its common position in the two rankings. This may be combined with the score assigned by the individual classifiers to generate a composite score. Further, those skilled in the art will note that other methods of ranking combination may be used.

Figure 30:
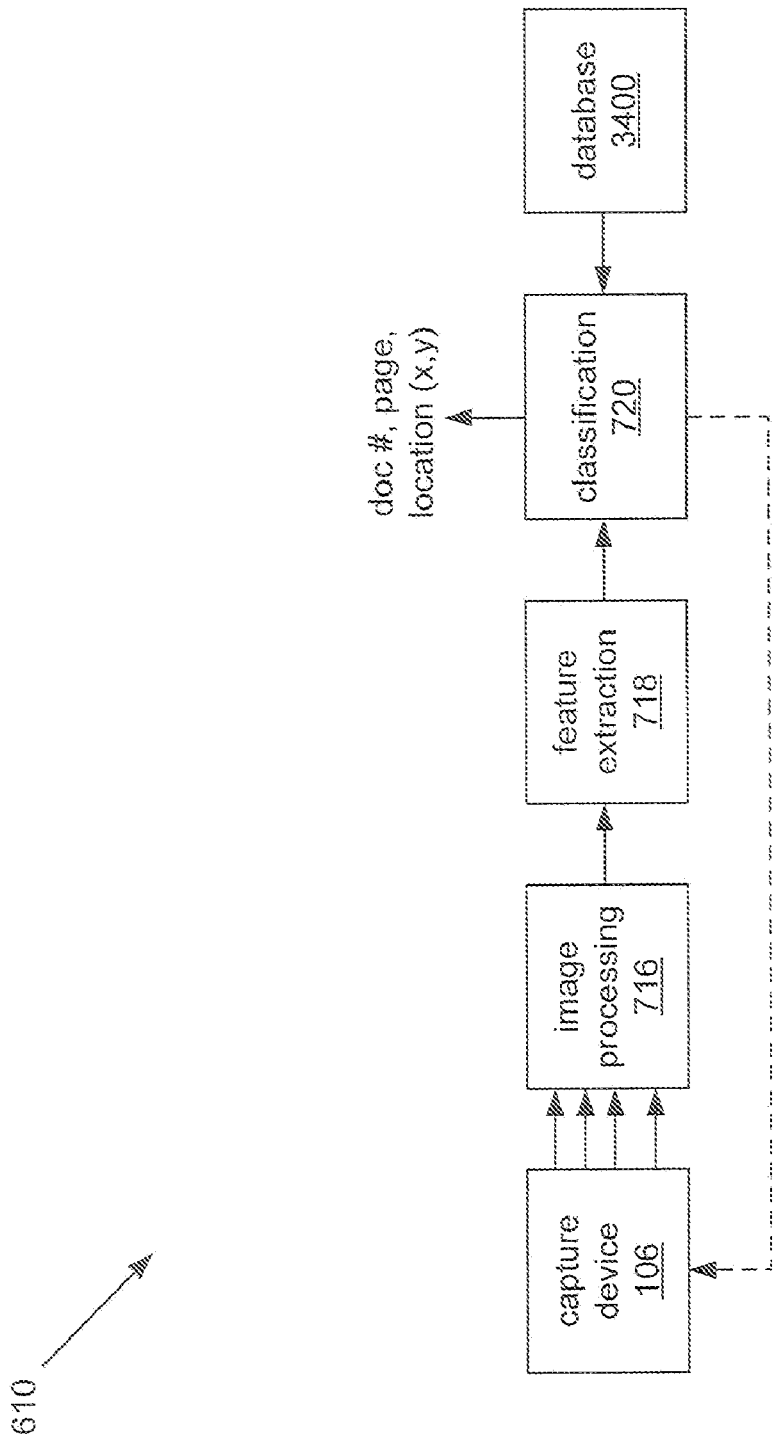
FIG. 30 illustrates a document fingerprint matching technique in accordance with another embodiment of the present invention.

FIG. 30 shows another document fingerprint matching technique in accordance with an embodiment of the present invention. The "video sequence image accumulation" technique shown in FIG. 30 constructs an image by integrating data from nearby or adjacent frames. One example involves "super-resolution." It registers N temporally adjacent frames and uses knowledge of the point spread function of the lens to perform what is essentially a sub-pixel edge enhancement. The effect is to increase the spatial resolution of the image. Further, in one or more embodiments, the super-resolution method may be specialized to emphasize text-specific features such as holes, corners, and dots. A further extension would use the characteristics of the candidate image patches, as determined from the database 3400, to specialize the super-resolution integration function.

Figure 31:
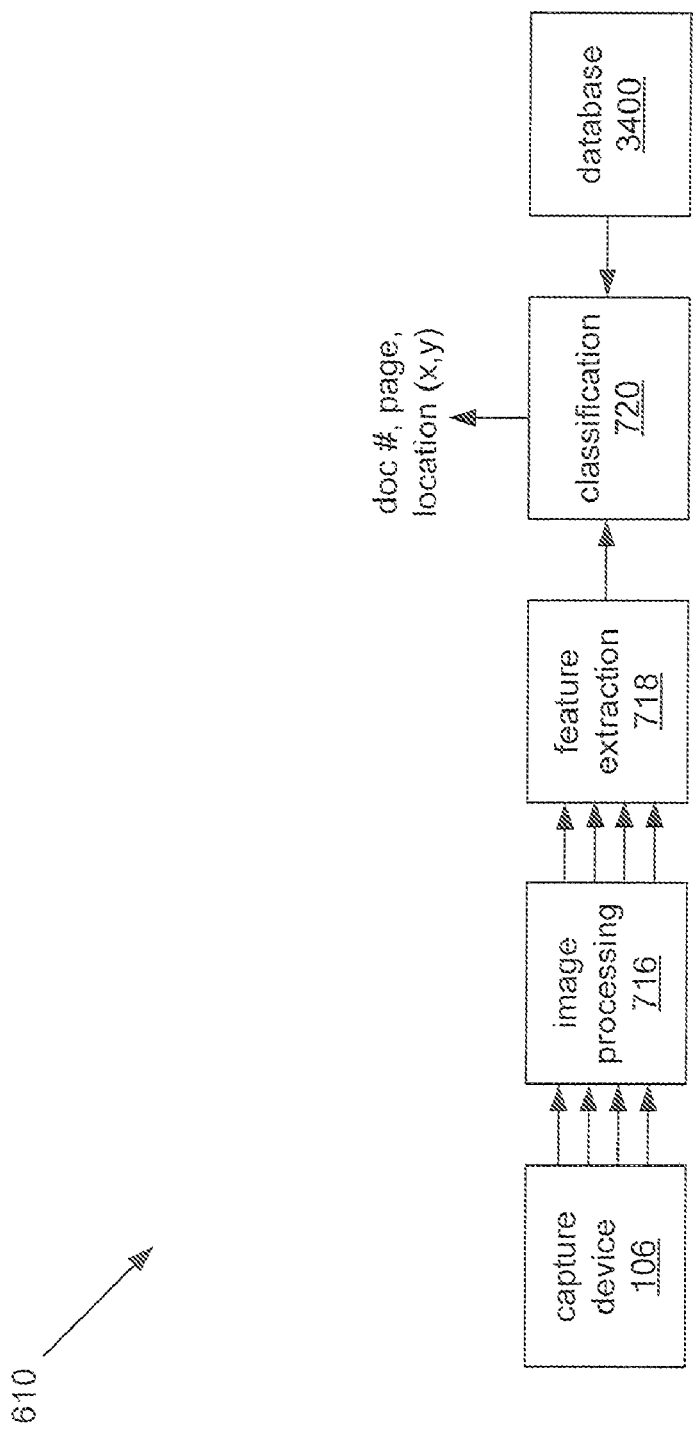
FIG. 31 illustrates a document fingerprint matching technique in accordance with another embodiment of the present invention.

FIG. 31 shows another document fingerprint matching technique in accordance with an embodiment of the present invention. The "video sequence feature accumulation" technique shown in FIG. 31 accumulates features over a number of temporally adjacent frames prior to making a decision. This takes advantage of the high sampling rate of a capture device (e.g., 30 frames per second) and the user's intention, which keeps the capture device pointed at the same point on a document at least for several seconds. Feature extraction is performed independently on each frame and the results are combined to generate a single unified feature map. The combination process includes an implicit registration step. The need for this technique is immediately apparent on inspection of video clips of text patches. The auto-focus and contrast adjustment in the typical capture device can produce significantly different results in adjacent video frames.

Figure 32:
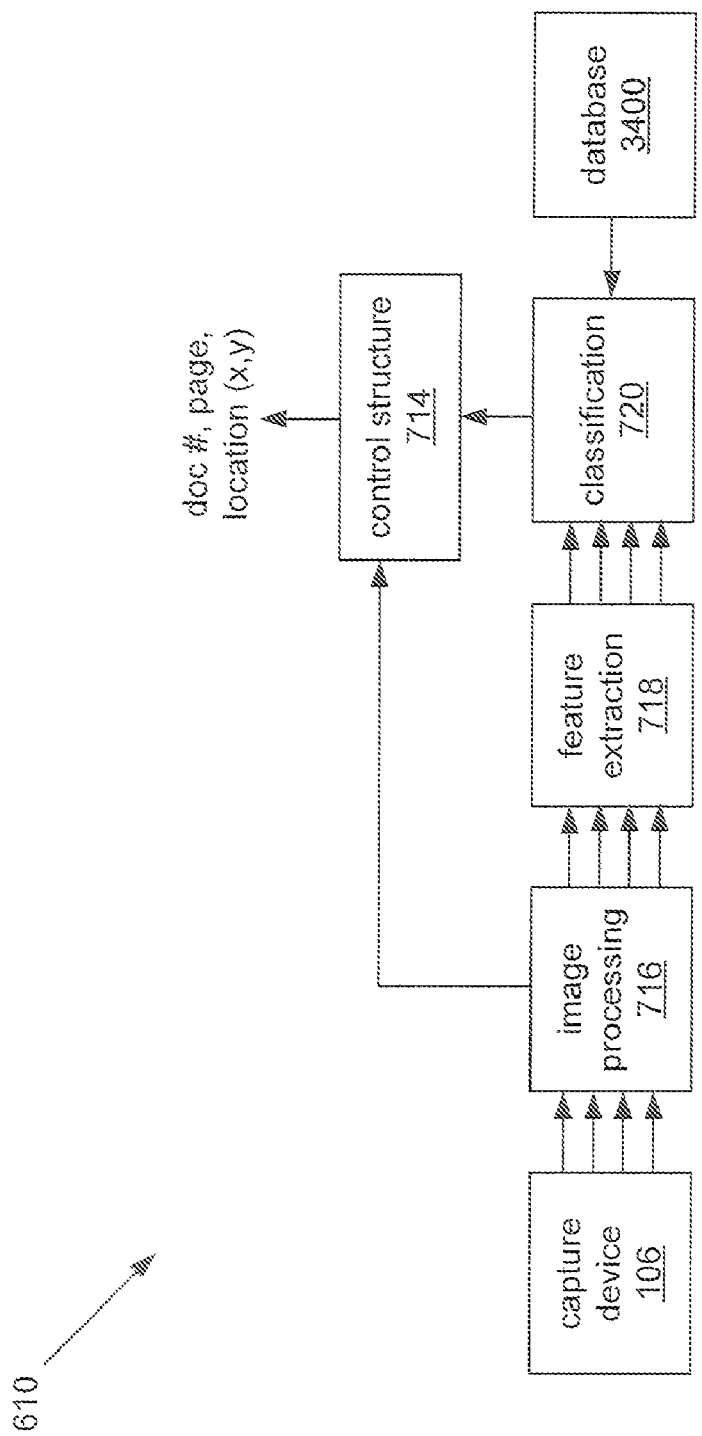
FIG. 32 illustrates a document fingerprint matching technique in accordance with another embodiment of the present invention.

FIG. 32 shows another document fingerprint matching technique in accordance with an embodiment of the present invention. The "video sequence decision combination" technique shown in FIG. 32 combines decisions from a number of temporally adjacent frames. This takes advantage of the high sampling rate of a typical capture device and the user's intention, which keeps the capture device pointed at the same point on a document at least for several seconds. Each frame is processed independently and generates its own ranked list of decisions. Those decisions are combined to generate a single unified ranking of the input image set. This technique includes an implicit registration method that controls the decision combination process.

In one or more embodiments, one or more of the various document fingerprint matching techniques described above with reference to FIGS. 6-32 may be used in combination with one or more known matching techniques, such combination being referred to herein as "multi-tier (or multi-factor) recognition." In general, in multi-tier recognition, a first matching technique is used to locate in a document database a set of pages having specific criteria, and then a second matching technique is used to uniquely identify a patch from among the pages in the set.

Figure 33:
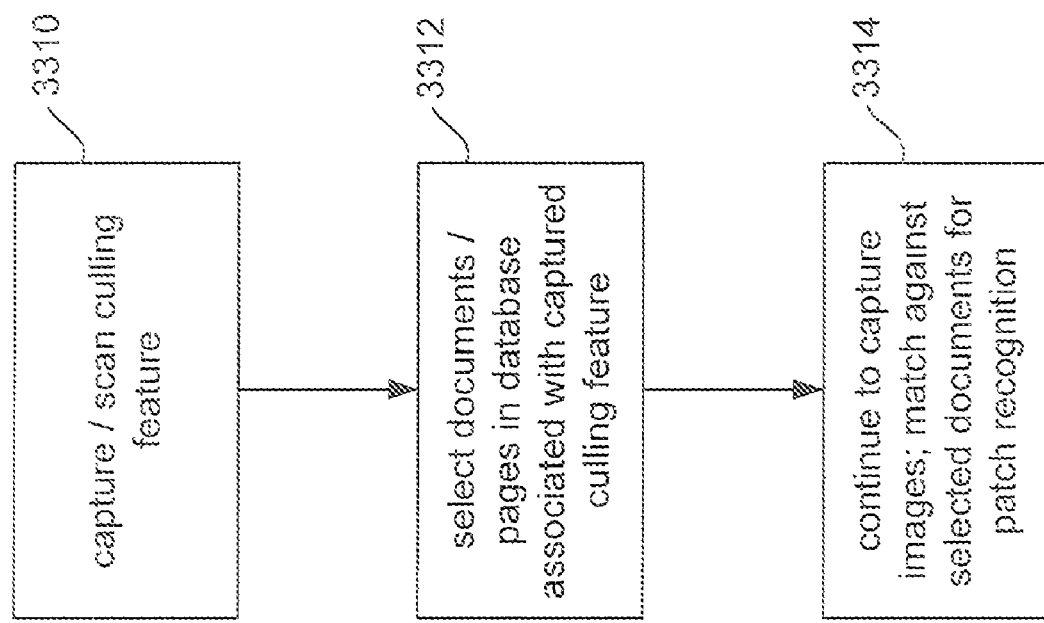
FIG. 33 shows a flow process for multi-tier recognition in accordance with an embodiment of the present invention.

FIG. 33 shows an example of a flow process for multi-tier recognition in accordance with an embodiment of the present invention. Initially, at step 3310, a capture device 106 is used to capture/scan a "culling" feature on a document of interest. The culling feature may be any feature, the capture of which effectively results in a selection of a set of documents within a document database. For example, the culling feature may be a numeric-only bar code (e.g., universal product code (UPC)), an alphanumeric bar code (e.g., code 39, code 93, code 128), or a 2-dimensional bar code (e.g., a QR code, PDF417, DataMatrix, Maxicode). Moreover, the culling feature may be, for example, a graphic, an image, a trademark, a logo, a particular color or combination of colors, a keyword, or a phrase. Further, in one or more embodiments, a culling feature may be limited to features suitable for recognition by the capture device 106.

At step 3312, once the culling feature has been captured at step 3310, a set of documents and/or pages of documents in a document database are selected based on an association with the captured culling feature. For example, if the captured culling feature is a company's logo, all documents in the database indexed as containing that logo are selected. In another example, the database may contain a library of trademarks against which captured culling images are compared. When there is a "hit" in the library, all documents associated with the hit trademark are selected for subsequent matching as described below. Further, in one or more embodiments, the selection of documents/pages at step 3312 may depend on the captured culling feature and the location of that culling feature on the scanned document. For example, information associated with the captured culling feature may specify whether that culling image is located at the upper right corner of the document as opposed to the lower left corner of the document.

Further, those skilled in the art will note that the determination that a particular captured image contains an image of a culling feature may be made by the capture device 106 or some other component that receives raw image data from the capture device 106. For example, the database itself may determine that a particular captured image sent from the capture device 106 contains a culling feature, in response to which the database selects a set of documents associated with the captured culling feature.

At step 3314, after a particular set of documents has been selected at step 3312, the capture device 106 continues to scan and accordingly capture images of the document of interest. The captured images of the document are then matched against the documents selected at step 3312 using one or more of the various document fingerprint matching techniques described with reference to FIGS. 6-32. For example, after a set of documents indexed as containing the culling feature of a shoe graphic is selected at step 3312 based on capture of a shoe graphic image on a document of interest at step 3310, subsequent captured images of the document of interest may be matched against the set of selected documents using the multiple classifiers technique as previously described.

Thus, using an implementation of the multi-tier recognition flow process described above with reference to FIG. 33, patch recognition times may be decreased by initially reducing the amount of pages/documents against which subsequent captured images are matched. Further, a user may take advantage of such improved recognition times by first scanning a document over locations where there is an image, a bar code, a graphic, or other type of culling feature. By taking such action, the user may quickly reduce the amount of documents against which subsequent captured images are matched.

MMR Database System

Figure 34A:
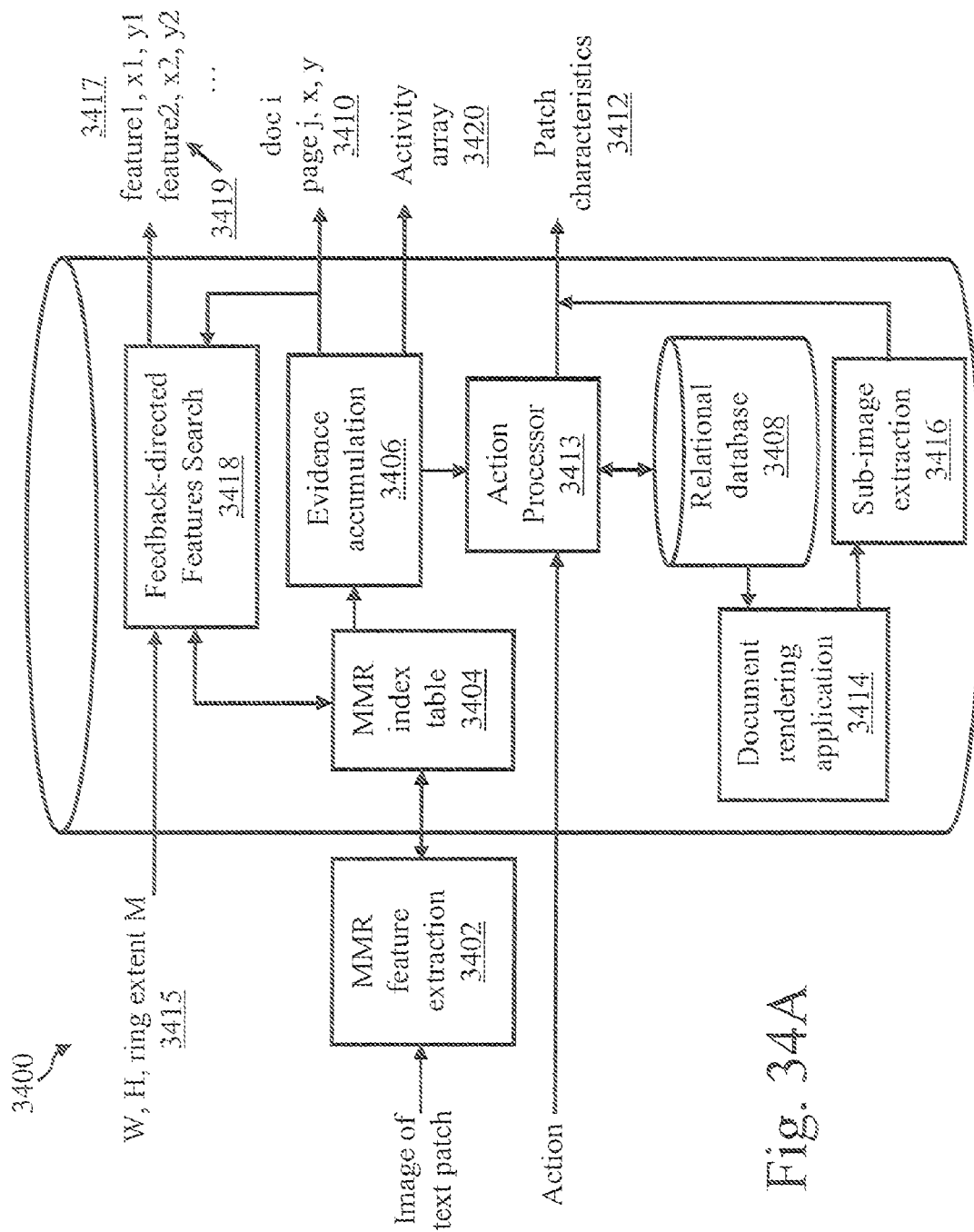
FIG. 34A illustrates a functional block diagram of an MMR database system configured in accordance with an embodiment of the present invention.

FIG. 34A illustrates a functional block diagram of an MMR database system 3400 configured in accordance with one embodiment of the invention. The system 3400 is configured for content-based retrieval, where two-dimensional geometric relationships between objects are represented in a way that enables look-up in a text-based index (or any other searchable indexes). The system 3400 employs evidence accumulation to enhance look-up efficiency by, for example, combining the frequency of occurrence of a feature with the likelihood of its location in a two-dimensional zone. In one particular embodiment, the database system 3400 is a detailed implementation of the document event database 320 (including PD index 322), the contents of which include electronic representations of printed documents generated by a capture module 318 and/or a document fingerprint matching module 226 as discussed above with reference to FIG. 3. Other applications and configurations for system 3400 will be apparent in light of this disclosure.

As can be seen, the database system 3400 includes an MMR index table module 3404 that receives a description computed by the MMR feature extraction module 3402, an evidence accumulation module 3406, and a relational database 3408 (or any other suitable storage facility). The index table module 3404 interrogates an index table that identifies the documents, pages, and x-y locations within those pages where each feature occurs. The index table can be generated, for example, by the MMR index table module 3404 or some other dedicated module. The evidence accumulation module 3406 is programmed or otherwise configured to compute a ranked set of document, page and location hypotheses 3410 given the data from the index table module 3404. The relational database 3408 can be used to store additional characteristics 3412 about each patch. Those include, but are not limited to, 504 and 508 in FIG. 5. By using a two-dimensional arrangement of text within a patch in deriving a signature or fingerprint (i.e., unique search term) for the patch, the uniqueness of even a small fragment of text is significantly increased. Other embodiments can similarly utilize any two-dimensional arrangement of objects/features within a patch in deriving a signature or fingerprint for the patch, and embodiments of the invention are not intended to be limited to two-dimensional arrangements of text for uniquely identifying patches. Other components and functionality of the database system 3400 illustrated in FIG. 34A include a feedback-directed features search module 3418, a document rendering application module 3414, and a sub-image extraction module 3416. These components interact with other system 3400 components to provide a feedback-directed feature search as well as dynamic pristine image generation. In addition, the system 3400 includes an action processor 3413 that receives actions. The actions determine the action performed by the database system 3400 and the output it provides. Each of these other components will be explained in turn.

Figure 34B:
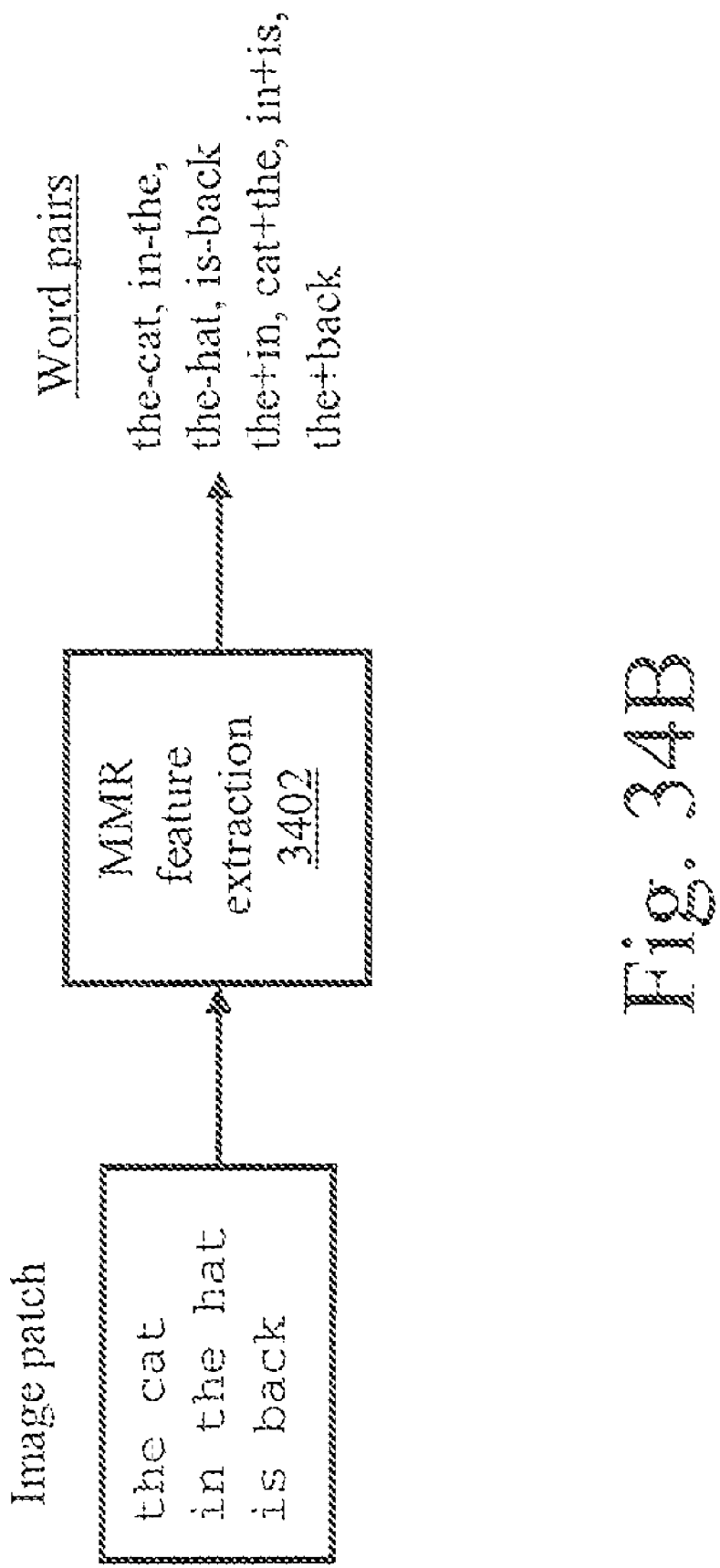
FIG. 34B illustrates an example of MMR feature extraction for an OCR-based technique in accordance with an embodiment of the present invention.

An example of the MMR feature extraction module 3402 that utilizes this two-dimensional arrangement of text within a patch is shown in FIG. 34B. In one such embodiment, the MMR feature extraction module 3402 is programmed or otherwise configured to employ an OCR-based technique to extract features (text or other target features) from an image patch. In this particular embodiment, the feature extraction module 3402 extracts the x-y locations of words in an image of a patch of text and represents those locations as the set of horizontally and vertically adjacent word-pairs it contains. The image patch is effectively converted to word-pairs that are joined by a "−" if they are horizontally adjacent (e.g., the−cat, in−the, the−hat, and is−back) and a "+" if they overlap vertically (e.g., the+in, cat+the, in +is, and the+back). The x-y locations can be, for example, based on pixel counts in the x and y plane directions from some fixed point in document image (from the uppermost left corner or center of the document). Note that the horizontally adjacent pairs in the example may occur frequently in many other text passages, while the vertically overlapping pairs will likely occur infrequently in other text passages. Other geometric relationships between image features could be similarly encoded, such as SW-NE adjacency with a "/" between words, NW-SE adjacency with "\", etc. Also, "features" could be generalized to word bounding boxes (or other feature bounding boxes) that could be encoded with arbitrary but consistent strings. For example, a bounding box that is four times as long as it is high with a ragged upper contour but smooth lower contour could be represented by the string "4rusl". In addition, geometric relationships could be generalized to arbitrary angles and distance between features. For example, two words with the "4rusl" description that are NW-SE adjacent but separated by two word-heights could be represented "4rusl\\4rusl." Numerous encoding schemes will be apparent in light of this disclosure. Furthermore, note that numbers, Boolean values, geometric shapes, and other such document features could be used instead of word-pairs to ID a patch.

Figure 34C:
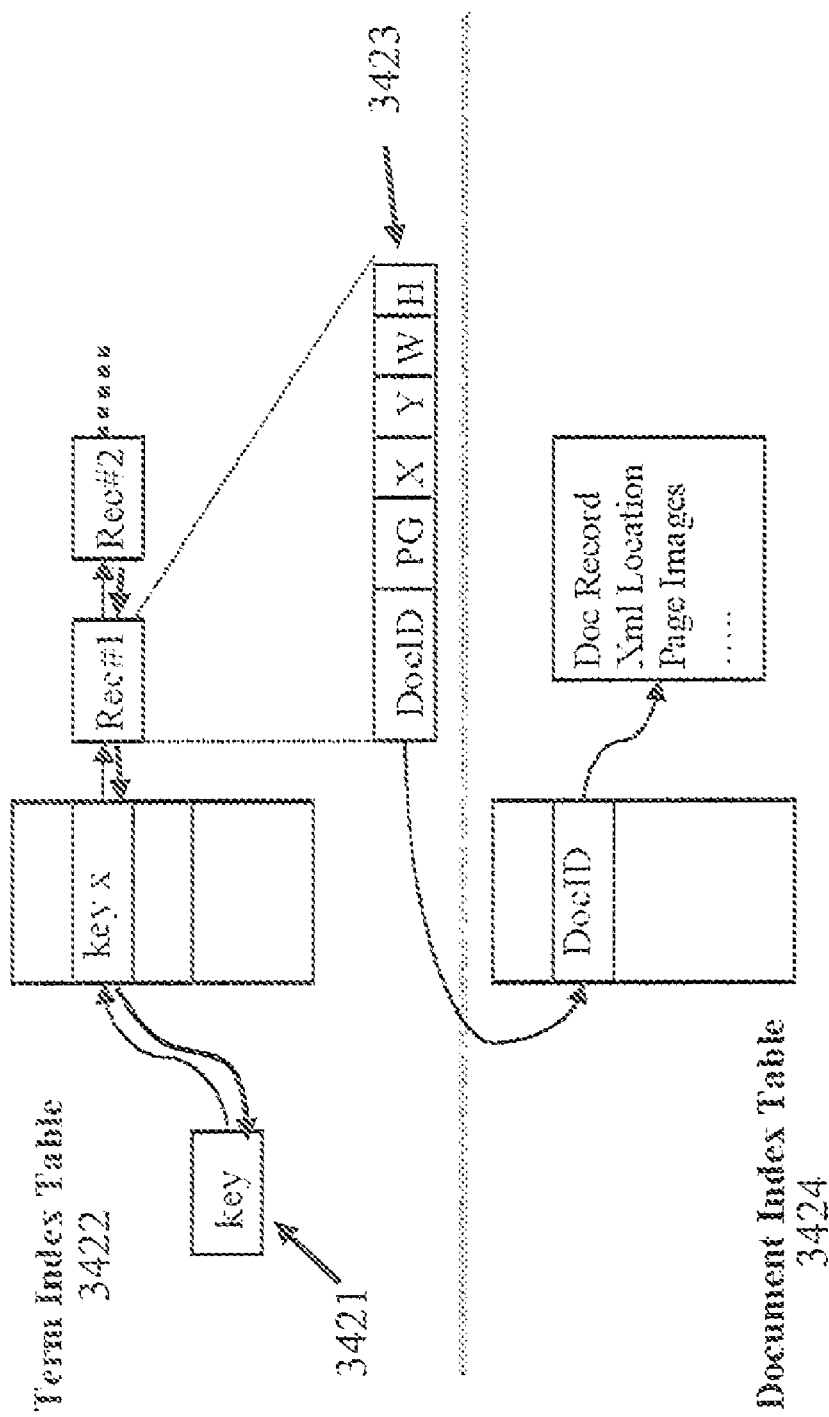
FIG. 34C illustrates an example index table organization in accordance with an embodiment of the present invention.

FIG. 34C illustrates an example index table organization in accordance with one embodiment of the invention. As can be seen, the MMR index table includes an inverted term index table 3422 and a document index table 3424. Each unique term or feature (e.g., key 3421) points to a location in the term index table 3422 that holds a functional value of the feature (e.g., key x) that points to a list of records 3423 (e.g., Rec#1, Rec#2, etc), and each record identifies a candidate region on a page within a document, as will be discussed in turn. In one example, key and the functional value of the key (key x) are the same. In another example a hash function is applied to key and the output of the function is key x.

Given a list of query terms, every record indexed by the key is examined, and the region most consistent with all query terms is identified. If the region contains a sufficiently high matching score (e.g., based on a pre-defined matching threshold), the hypothesis is confirmed. Otherwise, matching is declared to fail and no region is returned. In this example embodiment, the keys are word-pairs separated by either a "−" or a "+" as previously described (e.g., "the−cat" or "cat+ the"). This technique of incorporating the geometric relationship in the key itself allows use of conventional text search technology for a two-dimensional geometric query.

Thus, the index table organization transforms the features detected in an image patch into textual terms that represent both the features themselves and the geometric relationship between them. This allows utilization of conventional text indexing and search methods. For example, the vertically adjacent terms "cat" and "the" are represented by the symbol "cat+the" which can be referred to as a "query term" as will be apparent in light of this disclosure. The utilization of conventional text search data structures and methodologies facilitate grafting of MMR techniques described herein on top of Internet text search systems (e.g., Google, Yahoo, Microsoft, etc.).

In the inverted term index table 3422 of this example embodiment, each record identifies a candidate region on a page within a document using six parameters: document identification (DocID), page number (PG), x/y offset (X and Y, respectively), and width and height of rectangular zone (W and H, respectively). The DocID is a unique string generated based on the timestamp (or other metadata) when a document is printed. But it can be any string combining device ID and person ID. In any case, documents are identified by unique DocIDs, and have records that are stored in the document index table. Page number is the pagination corresponding to the paper output, and starts at 1. A rectangular region is parameterized by the X-Y coordinates of the upper-left corner, as well as the width and height of the bounding box in normalized coordinate system. Numerous inner-document location/coordinate schemes will be apparent in light of this disclosure, and the present invention is not intended to be limited any particular one.

An example record structure configured in accordance with one embodiment of the present invention uses a 24-bit DocID and an 8-bit page number, allowing up to 16 million documents and 4 billion pages. One unsigned byte for each X and Y offset of the bounding box provide a spatial resolution of 30 dpi horizontal and 23 dpi vertical (assuming an 8.5" by 11" page, although other page sizes and/or spatial resolutions can be used). Similar treatment for the width and height of the bounding box (e.g., one unsigned byte for each W and H) allows representation of a region as small as a period or the dot on an "i", or as large as an entire page (e.g., 8.5" by 11" or other). Therefore, eight bytes per record (3 bytes for DocID, 1 byte for PG, 1 byte for X, 1 byte for Y, 1 byte for W, and 1 byte for H is a total of 8 bytes) can accommodate a large number of regions.

The document index table 3424 includes relevant information about each document. In one particular embodiment, this information includes the document-related fields in the XML file, including print resolution, print date, paper size, shadow file name, page image location, etc. Since print coordinates are converted to a normalized coordinate system when indexing a document, computing search hypotheses does not involve this table. Thus, document index table 3424 is only consulted for matched candidate regions. However, this decision does imply some loss of information in the index because the normalized coordinate is usually at a lower resolution than the print resolution. Alternative embodiments may use the document index table 3424 (or a higher resolution for the normalized coordinate) when computing search hypotheses, if so desired.

Thus, the index table module 3404 operates to effectively provide an image index that enables content-based retrieval of objects (e.g., document pages) and x-y locations within those objects where a given image query occurs. The combination of such an image index and relational database 3408 allows for the location of objects that match an image patch and characteristics of the patch (e.g., such as the "actions" attached to the patch, or bar codes that can be scanned to cause retrieval of other content related to the patch). The relational database 3408 also provides a means for "reverse links" from a patch to the features in the index table for other patches in the document. Reverse links provide a way to find the features a recognition algorithm would expect to see as it moves from one part of a document image to another, which may significantly improve the performance of the front-end image analysis algorithms in an MMR system as discussed herein.

Feedback-Directed Feature Search

The x-y coordinates of the image patch (e.g., x-y coordinates for the center of the image patch) as well as the identification of the document and page can also be input to the feedback-directed feature search module 3418. The feedback-directed feature search module 3418 searches the term index table 3422 for records 3423 that occur within a given distance from the center of the image patch. This search can be facilitated, for example, by storing the records 3423 for each DocID-PG combination in contiguous blocks of memory sorted in order of X or Y value. A lookup is performed by binary search for a given value (X or Y depending on how the data was sorted when stored) and serially searching from that location for all the records with a given X and Y value. Typically, this would include x-y coordinates in an M-inch ring around the outside of a patch that measures W inches wide and H inches high in the given document and page. Records that occur in this ring are located and their keys or features 3421 are located by tracing back pointers. The list of features and their x-y locations in the ring are reported as shown at 3417 of FIG. 34A. The values of W, H, and M shown at 3415 can be set dynamically by the recognition system based on the size of the input image so that the features 3417 are outside the input image patch.

Such characteristics of the image database system 3400 are useful, for example, for disambiguating multiple hypotheses. If the database system 3400 reports more than one document could match the input image patch, the features in the rings around the patches would allow the recognition system (e.g., fingerprint matching module 226 or other suitable recognition system) to decide which document best matches the document the user is holding by directing the user to slightly move the image capture device in the direction that would disambiguate the decision. For example (assume OCR-based features are used, although the concept extends to any geometrically indexed feature set), an image patch in document A might be directly below the word-pair "blue-xylophone." The image patch in document B might be directly below the word-pair "blue-thunderbird." The database system 3400 would report the expected locations of these features and the recognition system could instruct the user (e.g., via a user interface) to move the camera up by the amount indicated by the difference in y coordinates of the features and top of the patch. The recognition system could compute the features in that difference area and use the features from documents A and B to determine which matches best. For example, the recognition system could post-process the OCR results from the difference area with the "dictionary" of features comprised of (xylophone, thunderbird). The word that best matches the OCR results corresponds to the document that best matches the input image. Examples of post-processing algorithms include commonly known spelling correction techniques (such as those used by word processor and email applications).

As this example illustrates, the database system 3400 design allows the recognition system to disambiguate multiple candidates in an efficient manner by matching feature descriptions in a way that avoids the need to do further database accesses. An alternative solution would be to process each image independently.

Dynamic Pristine Image Generation

The x-y coordinates for the location the image patch (e.g., x-y coordinates for the center of the image patch) as well as the identification of the document and page can also be input to the relational database 3408 where they can be used to retrieve the stored electronic original for that document and page. That document can then be rendered by the document rendering application module 3414 as a bitmap image. Also, an additional "box size" value provided by module 3414 is used by the sub-image extraction module 3416 to extract a portion of the bitmap around the center. This bitmap is a "pristine" representation for the expected appearance of the image patch and it contains an exact representation for all features that should be present in the input image. The pristine patch can then be returned as a patch characteristic 3412. This solution overcomes the excessive storage required of prior techniques that store image bitmaps by storing a compact non-image representation that can subsequently be converted to bitmap data on demand.

Such as storage scheme is advantageous since it enables the use of a hypothesize-and-test recognition strategy in which a feature representation extracted from an image is used to retrieve a set of candidates that is disambiguated by a detailed feature analysis. Often, it is not possible to predict the features that will optimally disambiguate an arbitrary set of candidates and it is desirable that this be determined from the original images of those candidates. For example, an image of the word-pair "the cat" could be located in two database documents, one of which was originally printed in a Times Roman font and the other in a Helvetica font. Simply determining whether the input image contains one of these fonts would identify the correctly matching database document. Comparing the pristine patches for those documents to the input image patch with a template matching comparison metric like the Euclidean distance would identify the correct candidate.

An example includes a relational database 3408 that stores Microsoft Word ".doc" files (a similar methodology works for other document formats such as postscript, PCL, pdf., or Microsoft's XML paper specification XPS, or other such formats that can be converted to a bitmap by a rendering application such as ghostscript or in the case of XPS, Microsoft's Internet Explorer with the WinFX components installed). Given the identification for a document, page, x-y location, box dimensions, and system parameters that indicate the preferred resolution is 600 dots per inch (dpi), the Word application can be invoked to generate a bitmap image. This will provide a bitmap with 6600 rows and 5100 columns. Additional parameters x=3", y=3", height=1", and width=1" indicate the database should return a patch 600 pixels high and wide that is centered at a point 1800 pixels in x and y away from the top left corner of the page.

Multiple Databases

When multiple database systems 3400 are used, each of which may contain different document collections, pristine patches can be used to determine whether two databases return the same document or which database returned the candidate that better matches the input.

If two databases return the same document, possibly with different identifiers 3410 (i.e., it is not apparent the original documents are the same since they were separately entered in different databases) and characteristics 3412, the pristine patches will be almost exactly the same. This can be determined by comparing the pristine patches to one another, for example, with a Hamming distance that counts the number of pixels that are different. The Hamming distance will be zero if the original documents are exactly the same pixel-for-pixel. The Hamming distance will be slightly greater than zero if the patches are slightly different as might be caused by minor font differences. This can cause a "halo" effect around the edges of characters when the image difference in the Hamming operator is computed. Font differences like this can be caused by different versions of the original rendering application, different versions of the operating system on the server that runs the database, different printer drivers, or different font collections.

The pristine patch comparison algorithm can be performed on patches from more than one x-y location in two documents. They should all be the same, but a sampling procedure like this would allow for redundancy that could overcome rendering differences between database systems. For example, one font might appear radically different when rendered on the two systems but another font might be exactly the same.

If two or more databases return different documents as their best match for the input image, the pristine patches could be compared to the input image by a pixel based comparison metric such as Hamming distance to determine which is correct.

An alternative strategy for comparing results from more than one database is to compare the contents of accumulator arrays that measure the geometric distribution of features in the documents reported by each database. It is desirable that this accumulator be provided directly by the database to avoid the need to perform a separate lookup of the original feature set. Also, this accumulator should be independent of the contents of the database system 3400. In the embodiment shown in FIG. 34A, an activity array 3420 is exported. Two Activity arrays can be compared by measuring the internal distribution of their values.

In more detail, if two or more databases return the same document, possibly with different identifiers 3410 (i.e., it's not apparent the original documents are the same since they were separately entered in different databases) and characteristics 3412, the activity arrays 3420 from each database will be almost exactly the same. This can be determined by comparing the arrays to one another, for example, with a Hamming distance that counts the number of pixels that are different. The Hamming distance will be zero if the original documents are exactly the same.

If two or more databases return different documents as their best match for the input features, their activity arrays 3420 can be compared to determine which document "best" matches the input image. An Activity array that correctly matches an image patch will contain a cluster of high values approximately centered on the location where the patch occurs. An Activity array that incorrectly matches an image patch will contain randomly distributed values. There are many well known strategies for measuring dispersion or the randomness of an image, such as entropy. Such algorithms can be applied to an activity array 3420 to obtain a measure that indicates the presence of a cluster. For example, the entropy of an activity array 3420 that contains a cluster corresponding to an image patch will be significantly different from the entropy of an activity array 3420 whose values are randomly distributed.

Further, it is noted that an individual client 106 might at any time have access to multiple databases 3400 whose contents are not necessarily in conflict with one another. For example, a corporation might have both publicly accessible patches and ones private to the corporation that each refer to a single document. In such cases, a client device 106 would maintain a list of databases D1, D2, D3 . . . , which are consulted in order, and produce combined activity arrays 3420 and identifiers 3410 into a unified display for the user. A given client device 106 might display the patches available from all databases, or allow a user to choose a subset of the databases (only D1, D3, and D7, for example) and only show patches from those databases. Databases might be added to the list by subscribing to a service, or be made available wirelessly when a client device 106 is in a certain location, or because the database is one of several which have been loaded onto client device 106, or because a certain user has been authenticated to be currently using the device, or even because the device is operating in a certain mode. For example, some databases might be available because a particular client device has its audio speaker turned on or off, or because a peripheral device like a video projector is currently attached to the client.

Actions

With further reference to FIG. 34A, the MMR database 3400 receives an action together with a set of features from the MMR feature extraction module 3402. Actions specify commands and parameters. In such an embodiment, the command and its parameters determine the patch characteristics that are returned 3412. Actions are received in a format including, for example, http that can be easily translated into text.

The action processor 3413 receives the identification for a document, page and x-y location within a page determined by the evidence accumulation module 3406. It also receives a command and its parameters. The action processor 3413 is programmed or otherwise configured to transform the command into instructions that either retrieve or store data using the relational database 3408 at a location that corresponds with the given document, page and x-y location.

In one such embodiment, commands include: RETRIEVE, INSERT_TO <DATA>, RETRIEVE_TEXT <RADIUS>, TRANSFER <AMOUNT>, PURCHASE, PRISTINE_PATCH <RADIUS [DOCID PAGEID X Y DPI]>, and ACCESS_DATABASE <DBID>. Each will now be discussed in turn.

RETRIEVE—retrieve data linked to the x-y location in the given document page. The action processor 3413 transforms the RETRIEVE command to the relational database query that retrieves data that might be stored nearby this x-y location. This can require the issuance of more than one database query to search the area surrounding the x-y location. The retrieved data is output as patch characteristics 3412. An example application of the RETRIEVE command is a multimedia browsing application that retrieves video clips or dynamic information objects (e.g., electronic addresses where current information can be retrieved). The retrieved data can include menus that specify subsequent steps to be performed on the MMR device. It could also be static data that could be displayed on a phone (or other display device) such as JPEG images or video clips. Parameters can be provided to the RETRIEVE command that determine the area searched for patch characteristics INSERT_TO <DATA>—insert <DATA> at the x-y location specified by the image patch. The action processor 3413 transforms the INSERT_TO command to an instruction for the relational database that adds data to the specified x-y location. An acknowledgement of the successful completion of the INSERT_TO command is returned as patch characteristics 3412. An example application of the INSERT_TO command is a software application on the MMR device that allows a user to attach data to an arbitrary x-y location in a passage of text. The data can be static multimedia such as JPEG images, video clips, or audio files, but it can also be arbitrary electronic data such as menus that specify actions associated with the given location.

RETRIEVE_TEXT <RADIUS>—retrieve text within <RADIUS> of the x-y location determined by the image patch. The <RADIUS> can be specified, for example, as a number of pixels in image space or it can be specified as a number of characters of words around the x-y location determined by the evidence accumulation module 3406. <RADIUS> can also refer to parsed text objects. In this particular embodiment, the action processor 3413 transforms the RETRIEVE_TEXT command into a relational database query that retrieves the appropriate text. If the <RADIUS> specifies parsed text objects, the Action Processor only returns parsed text objects. If a parsed text object is not located nearby the specified x-y location, the Action Processor returns a null indication. In an alternate embodiment, the Action Processor calls the Feedback-Directed Features Search module to retrieve the text that occurs within a radius of the given x-y location. The text string is returned as patch characteristics 3412. Optional data associated with each word in the text string includes its x-y bounding box in the original document. An example application of the RETRIEVE_TEXT command is choosing text phrases from a printed document for inclusion in another document. This could be used, for example, for composing a presentation file (e.g., in PowerPoint format) on the MMR system.

TRANSFER <AMOUNT>—retrieve the entire document and some of the data linked to it in a form that could be loaded into another database. <AMOUNT> specifies the number and type of data that is retrieved. If <AMOUNT> is ALL, the action processor 3413 issues a command to the database 3408 that retrieves all the data associated with a document. Examples of such a command include DUMP or Unix TAR. If <AMOUNT> is SOURCE, the original source file for the document is retrieved. For example, this could retrieve the Word file for a printed document. If <AMOUNT> is BITMAP the JPEG-compressed version (or other commonly used formats) of the bitmap for the printed document is retrieved. If <AMOUNT> is PDF, the PDF representation for the document is retrieved. The retrieved data is output as patch characteristics 3412 in a format known to the calling application by virtue of the command name. An example application of the TRANSFER command is a "document grabber" that allows a user to transfer the PDF representation for a document to an MMR device by imaging a small area of text.

PURCHASE—retrieve a product specification linked to an x-y location in a document. The action processor 3413 first performs a series of one or more RETRIEVE commands to obtain product specifications nearby a given x-y location. A product specification includes, for example, a vendor name, identification for a product (e.g., stock number), and electronic address for the vendor. Product specifications are retrieved in preference to other data types that might be located nearby. For example, if a jpeg is stored at the x-y location determined by the image patch, the next closest product specification is retrieved instead. The retrieved product specification is output as patch characteristics 3412. An example application of the PURCHASE command is associated with advertising in a printed document. A software application on the MMR device receives the product specification associated with the advertising and adds the user's personal identifying information (e.g., name, shipping address, credit card number, etc.) before sending it to the specified vendor at the specified electronic address.

PRISTINE_PATCH <RADIUS [DOCID PAGEID X Y DPI]>—retrieve an electronic representation for the specified document and extract an image patch centered at x-y with radius RADIUS. RADIUS can specify a circular radius but it can also specify a rectangular patch (e.g., 2 inches high by 3 inches wide). It can also specify the entire document page. The (DocID, PG, x, y) information can be supplied explicitly as part of the action or it could be derived from an image of a text patch. The action processor 3413 retrieves an original representation for a document from the relational database 3408. That representation can be a bitmap but it can also be a renderable electronic document. The original representation is passed to the document rendering application 3414 where it is converted to a bitmap (with resolution provided in parameter DPI as dots per inch) and then provided to sub-image extraction 3416 where the desired patch is extracted. The patch image is returned as patch characteristics 3412.

ACCESS_DATABASE <DBID>—add the database 3400 to the database list of client 106. Client can now consult this database 300 in addition to any existing databases currently in the list. DBID specifies either a file or remote network reference to the specified database.

Index Table Generation Methodology

Figure 35:
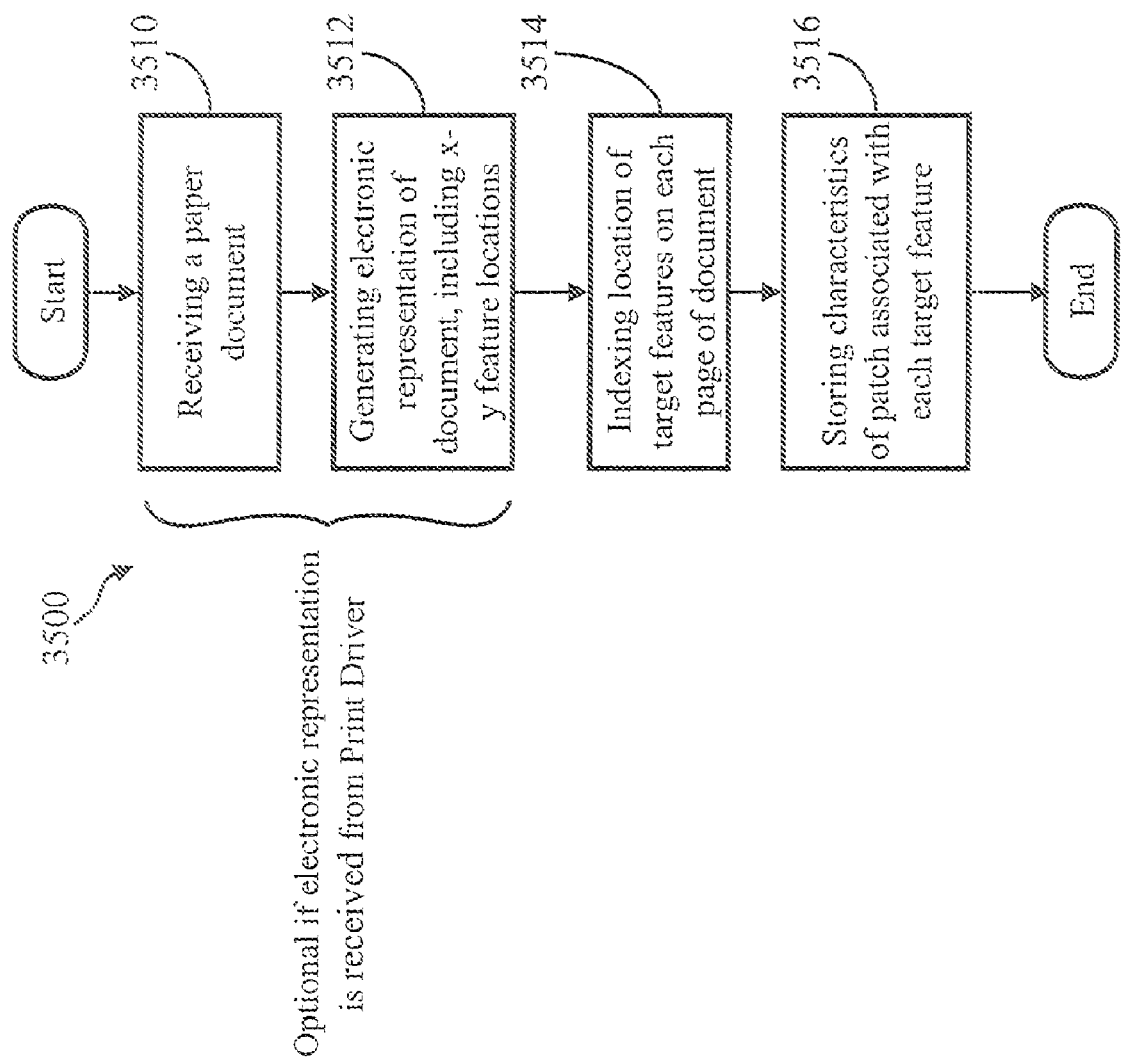
FIG. 35 illustrates a method for generating an MMR index table in accordance with an embodiment of the present invention.

FIG. 35 illustrates a method 3500 for generating an MMR index table in accordance with an embodiment of the present invention. The method can be carried out, for example, by database system 3400 of FIG. 34A. In one such embodiment, the MMR index table is generated, for example, by the MMR index table module 3404 (or some other dedicated module) from a scanned or printed document. The generating module can be implemented in software, hardware (e.g., gate-level logic), firmware (e.g., a microcontroller configured with embedded routines for carrying out the method, or some combination thereof, just as other modules described herein.

The method includes receiving 3510 a paper document. The paper document can be any document, such as a memo having any number of pages (e.g., work-related, personal letter), a product label (e.g., canned goods, medicine, boxed electronic device), a product specification (e.g., snow blower, computer system, manufacturing system), a product brochure or advertising materials (e.g., automobile, boat, vacation resort), service description materials (e.g., Internet service providers, cleaning services), one or more pages from a book, magazine or other such publication, pages printed from a website, hand-written notes, notes captured and printed from a white-board, or pages printed from any processing system (e.g., desktop or portable computer, camera, smartphone, remote terminal).

The method continues with generating 3512 an electronic representation of the paper document, the representation including x-y locations of features shown in the document. The target features can be, for instance, individual words, letters, and/or characters within the document. For example, if the original document is scanned, it is first OCR'd and the words (or other target feature) and their x-y locations are extracted (e.g., by operation of document fingerprint matching module 226' of scanner 127). If the original document is printed, the indexing process receives a precise representation (e.g., by operation of print driver 316 of printer 116) in XML format of the font, point size, and x-y bounding box of every character (or other target feature). In this case, index table generation begins at step 3514 since an electronic document is received with precisely identified x-y feature locations (e.g., from print driver 316). Formats other than XML will be apparent in light of this disclosure. Electronic documents such as Microsoft Word, Adobe Acrobat, and postscript can be entered in the database by "printing" them to a print driver whose output is directed to a file so that paper is not necessarily generated. This triggers the production of the XML file structure shown below. In all cases, the XML as well as the original document format (Word, Acrobat, postscript, etc.) are assigned an identifier (doc i for the ith document added to the database) and stored in the relational database 3408 in a way that enables their later retrieval by that identifier but also based on other "meta data" characteristics of the document including the time it was captured, the date printed, the application that triggered the print, the name of the output file, etc.

An example of the XML file structure is shown here:

$docID.xml :

```
<?xml version="1.0" ?>
<doclayout ID="00001234">
<setup>
<url>file url/path or null if not known</url>
<date>file printed date</date>
<app>application that triggered print</app>
<text>$docID.txt</text>
<prfile>name of output file</prfile>
<dpi>dpi of page for x, y coordinates, eg.600</dpi>
<width>in inch, like 8.5</width>
<height>in inch, eg. 11.0</height>
<imagescale>0.1 is 1/10th scale of dpi</imagescale>
</setup>

<image>$docID_1.jpeg</image>
<sequence box="x y w h">
<text>this string of text</text>
<font>any font info</font>
<word box="x y w h">
<text>word text</text>
<char box="x y w h">a</char>
<char box="x y w h">b</char>
<char>1 entry per char, in sequence</char>
</word>
</sequence>

</doclayout>
```

In one specific embodiment, a word may contain any characters from a-z, A-Z, 0-9, and any of @%$#; all else is a delimiter. The original description of the .xml file can be created by print capture software used by the indexing process (e.g., which executes on a server, such as database 320 server). The actual format is constantly evolving and contains more elements, as new documents are acquired by the system.

The original sequence of text received by the print driver (e.g., print driver 316) is preserved and a logical word structure is imposed based on punctuation marks, except for "_@%$#". Using the XML file as input, the index table module 3404 respects the page boundary, and first tries to group sequences into logical lines by checking the amount of vertical overlap between two consecutive sequences. In one particular embodiment, the heuristic that a line break occurred is used if two sequences overlap by less than half of their average height. Such a heuristic works well for typical text documents (e.g., Microsoft Word documents). For html pages with complex layout, additional geometrical analysis may be needed. However, it is not necessary to extract perfect semantic document structures as long as consistent indexing terms can be generated as by the querying process.

Based on the structure of the electronic representation of the paper document, the method continues with indexing 3514 the location of every target feature on every page of the paper document. In one particular embodiment, this step includes indexing the location of every pair of horizontally and vertically adjacent words on every page of the paper document. As previously explained, horizontally adjacent words are pairs of neighboring words within a line. Vertically adjacent words are words in neighboring lines that vertically align. Other multi-dimensional aspects of the a page can be similarly exploited.

The method further includes storing 3516 patch characteristics associated with each target feature. In one particular embodiment, the patch characteristics include actions attached to the patch, and are stored in a relational database. As previously explained, the combination of such an image index and storage facility allows for the location of objects that match an image patch and characteristics of the patch. The characteristics can be any data related to the path, such as metadata. The characteristics can also include, for example, actions that will carry out a specific function, links that can be selected to provide access to other content related to the patch, and/or bar codes that can be scanned or otherwise processed to cause retrieval of other content related to the patch.

A more precise definition is given for the search term generation, where only a fragment of the line structure is observed. For horizontally adjacent pairs, a query term is formed by concatenating the words with a "-" separator. Vertical pairs are concatenated using a "+". The words can be used in their original form to preserve capitalization if so desired (this creates more unique terms but also produces a larger index with additional query issues to consider such as case sensitivity). The indexing scheme allows the same search strategy to be applied on either horizontal or vertical word-pairs, or a combination of both. The discriminating power of terms is accounted for by the inverse document frequency for any of the cases.

Evidence Accumulation Methodology

Figure 36:
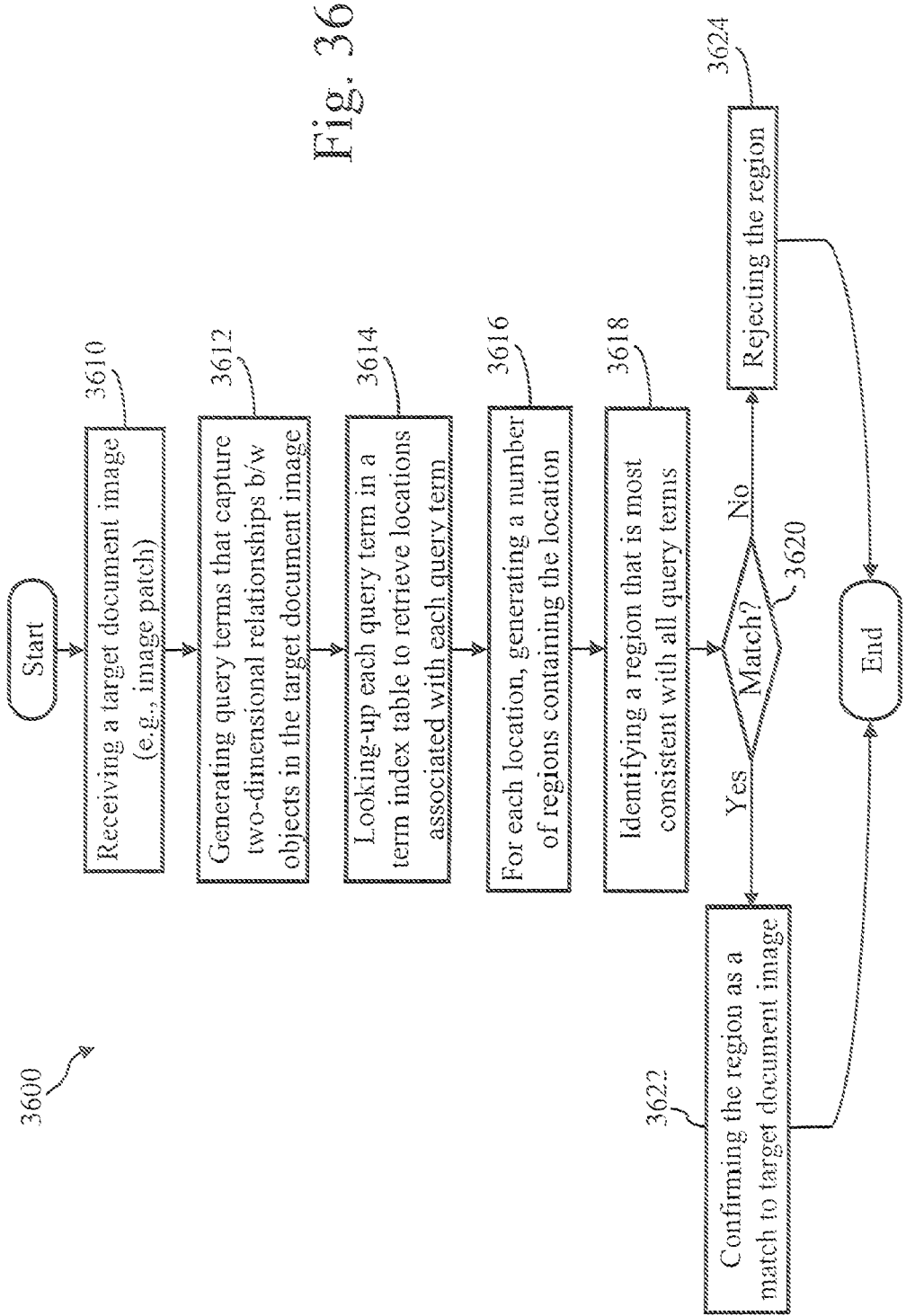
FIG. 36 illustrates a method for computing a ranked set of document, page, and location hypotheses for a target document, in accordance with an embodiment of the present invention.

FIG. 36 illustrates a method 3600 for computing a ranked set of document, page, and location hypotheses for a target document, in accordance with one embodiment of the present invention. The method can be carried out, for example, by database system 3400 of FIG. 34A. In one such embodiment, the evidence accumulation module 3406 computes hypotheses using data from the index table module 3404 as previously discussed.

The method begins with receiving 3610 a target document image, such as an image patch of a larger document image or an entire document image. The method continues with generating 3612 one or more query terms that capture two-dimensional relationships between objects in the target document image. In one particular embodiment, the query terms are generated by a feature extraction process that produces horizontal and vertical word-pairs, as previously discussed with reference to FIG. 34B. However, any number of feature extraction processes as described herein can be used to generate query terms that capture two-dimensional relationships between objects in the target image, as will be apparent in light of this disclosure. For instance, the same feature extraction techniques used to build the index of method 3500 can be used to generate the query terms, such as those discussed with reference to step 3512 (generating an electronic representation of a paper document). Furthermore, note that the two-dimensional aspect of the query terms can be applied to each query term individually (e.g., a single query term that represents both horizontal and vertical objects in the target document) or as a set of search terms (e.g., a first query term that is a horizontal word-pair and a second query term that is a vertical word-pair).

The method continues with looking-up 3614 each query term in a term index table 3422 to retrieve a list of locations associated with each query term. For each location, the method continues with generating 3616 a number of regions containing the location. After all queries are processed, the method further includes identifying 3618 a region that is most consistent with all query terms. In one such embodiment, a score for every candidate region is incremented by a weight (e.g., based on how consistent each region is with all query terms). The method continues with determining 3620 if the identified region satisfies a pre-defined matching criteria (e.g., based on a pre-defined matching threshold). If so, the method continues with confirming 3622 the region as a match to the target document image (e.g., the page that most likely contains the region can be accessed and otherwise used). Otherwise, the method continues with rejecting 3624 the region.

Word-pairs are stored in the term index table 3422 with locations in a "normalized" coordinate space. This provides uniformity between different printer and scanner resolutions. In one particular embodiment, an 85×110 coordinate space is used for 8.5" by 11" pages. In such a case, every word-pair is identified by its location in this 85×110 space.

To improve the efficiency of the search, a two-step process can be performed. The first step includes locating the page that most likely contains the input image patch. The second step includes calculating the x-y location within that page that is most likely the center of the patch. Such an approach does introduce the possibility that the true best match may be missed in the first step. However, with a sparse indexing space, such a possibility is rare. Thus, depending on the size of the index and desired performance, such an efficiency improving technique can be employed.

In one such embodiment, the following algorithm is used to find the page that most likely contains the word-pairs detected in the input image patch.

```
For each given word-pair wp
    idf = 1/log(2 + num_docs(wp))
    For each (doc, page) at which wp occurred
        Accum[doc, page] += idf;
    end /* For each (doc, page) */
end /* For each wp */
(maxdoc, maxpage) = max( Accum[doc, page] );
if (Accum[ maxdoc, maxpage ] > thresh_page)
    return( maxdoc, maxpage);
```

This technique adds the inverse document frequency (idf) for each word-pair to an accumulator indexed by the documents and pages on which it appears. num_docs(wp) returns the number of documents that contain the word pair wp. The accumulator is implemented by the evidence accumulation module 3406. If the maximum value in that accumulator exceeds a threshold, it is output as the page that is the best match to the patch. Thus, the algorithm operates to identify the page that best matches the word-pairs in the query. Alternatively, the Accum array can be sorted and the top N pages reported as the "N best" pages that match the input document.

The following evidence accumulation algorithm accumulates evidence for the location of the input image patch within a single page, in accordance with one embodiment of the present invention.

```
For each given word-pair wp
    idf = 1/log(2 + num_docs(wp))
    For each (x,y) at which wp occurred
        (minx, maxx, miny, maxy) = extent(x,y);
        maxdist = maxdist(minx, maxx, miny, maxy);
        For i=miny to maxy do
            For j = minx to maxx do
                norm_dist = Norm_geometric_dist(i, j, x, y, maxdist)
                Activity[i,j] += norm_dist;
                weight = idf * norm_dist;
                Accum2[i,j] += weight;
            end /* for j */
        end/* for I */
    end /* For each (y,y) */
end /* For each */
```

The algorithm operates to locate the cell in the 85×110 space that is most likely the center of the input image patch. In the embodiment shown here, the algorithm does this by adding a weight to the cells in a fixed area around each word-pair (called a zone). The extent function is given an x,y pair and it returns the minimum and maximum values for a surrounding fixed size region (1.5" high and 2" wide are typical). The extent function takes care of boundary conditions and makes sure the values it returns do not fall outside the accumulator (i.e., less than zero or greater than 85 in x or 110 in y). The maxdist function finds the maximum Euclidean distance between two points in a bounding box described by the bounding box coordinates (minx, maxx, miny, maxy). A weight is calculated for each cell within the zone that is determined by product of the inverse document frequency of the word-pair and the normalized geometric distance between the cell and the center of the zone. This weights cells closer to the center higher than cells further away. After every word-pair is processed by the algorithm, the Accum2 array is searched for the cell with the maximum value. If that exceeds a threshold, its coordinates are reported as the location of the image patch. The Activity array stores the accumulated norm_dist values. Since they aren't scaled by idf, they don't take into account the number of documents in a database that contain particular word pairs. However, they do provide a two-dimensional image representation for the x-y locations that best match a given set of word pairs. Furthermore, entries in the Activity array are independent of the documents stored in the database. This data structure, that's normally used internally, can be exported 3420.

The normalized geometric distance is calculated as shown here, in accordance with one embodiment of the present invention.

```
Norm_geometric_dist(i, j, x, y, maxdist)
    begin
        d = sqrt( (i-x)² + (j-y)² );
        return( maxdist - d );
    end
```

The Euclidean distance between the word-pair's location and the center of the zone is calculated and the difference between this and the maximum distance that could have been calculated is returned.

After every word-pair is processed by the evidence accumulation algorithm, the Accum2 array is searched for the cell with the maximum value. If that value exceeds a pre-defined threshold, its coordinates are reported as the location of the center of the image patch.

MMR Printing Architecture

Figure 37A:
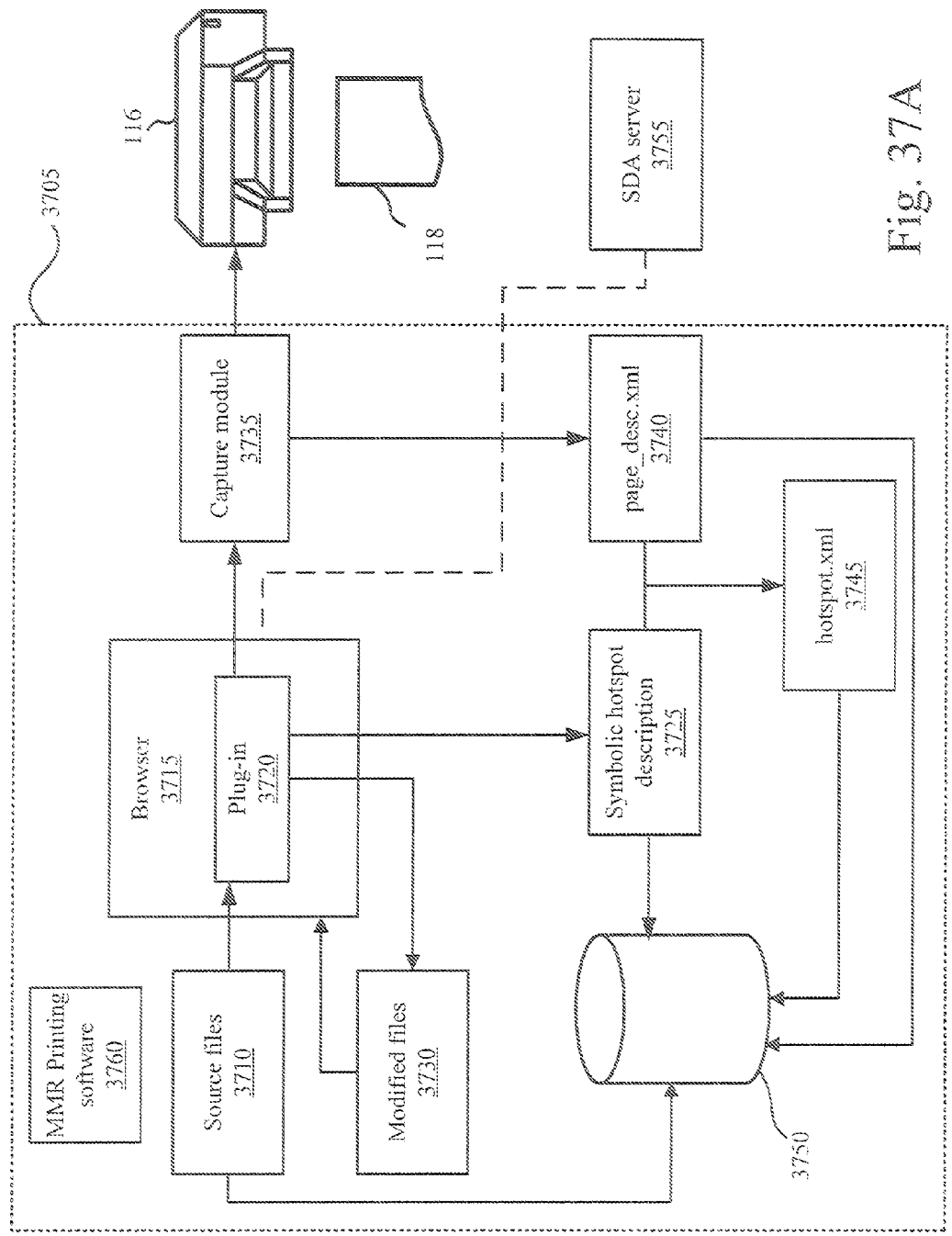
FIG. 37A illustrates a functional block diagram of MMR components configured in accordance with another embodiment of the present invention.

FIG. 37A illustrates a functional block diagram of MMR components in accordance with one embodiment of the present invention. The primary MMR components include a computer 3705 with an associated printer 116 and/or a shared document annotation (SDA) server 3755.

The computer 3705 is any standard desktop, laptop, or networked computer, as is known in the art. In one embodiment, the computer is MMR computer 112 as described in reference to FIG. 1B. User printer 116 is any standard home, office, or commercial printer, as described herein. User printer 116 produces printed document 118, which is a paper document that is formed of one or more printed pages.

The SDA server 3755 is a standard networked or centralized computer that holds information, applications, and/or a variety of files associated with a method of shared annotation. For example, shared annotations associated with web pages or other documents are stored at the SDA server 3755. In this example, the annotations are data or interactions used in MMR as described herein. The SDA server 3755 is accessible via a network connection according to one embodiment. In one embodiment, the SDA server 3755 is the networked media server 114 described in reference to FIG. 1B.

The computer 3705 further comprises a variety of components, some or all of which are optional according to various embodiments. In one embodiment, the computer 3705 comprises source files 3710, browser 3715, plug-in 3720, symbolic hotspot description 3725, modified files 3730, capture module 3735, page_desc.xml 3740, hotspot.xml 3745, data store 3750, SDA server 3755, and MMR printer software 3760.

Source files 3710 are representative of any source files that are an electronic representation of a document. Example source files 3710 include hypertext markup language (HTML) files, Microsoft® Word® files, Microsoft® PowerPoint® files, simple text files, portable document format (PDF) files, and the like. As described herein, documents received at browser 3715 originate from source files 3710 in many instances. In one embodiment, source files 3710 are equivalent to source files 310 as described in reference to FIG. 3.

Browser 3715 is an application that provides access to data that has been associated with source files 3710. For example, the browser 3715 may be used to retrieve web pages and/or documents from the source files 3710. In one embodiment, browser 3715 is an SD browser 312, 314, as described in reference to FIG. 3. In one embodiment, the browser 3715 is an Internet browser such as Internet Explorer.

Plug-in 3720 is a software application that provides an authoring function. Plug-in 3720 is a standalone software application or, alternatively, a plug-in running on browser 3715. In one embodiment, plug-in 3720 is a computer program that interacts with an application, such as browser 3715, to provide the specific functionality described herein. The plug-in 3720 performs various transformations and other modifications to documents or web pages displayed in the browser 3715 according to various embodiments. For example, plug-in 3720 surrounds hotspot designations with an individually distinguishable fiducial marks to create hotspots and returns "marked-up" versions of HTML files to the browser 3715, applies a transformation rule to a portion of a document displayed in the browser 3715, and retrieves and/or receives shared annotations to documents displayed in the browser 3715. In addition, plug-in 3720 may perform other functions, such as creating modified documents and creating symbolic hotspot descriptions 3725 as described herein. Plug-in 3720, in reference to capture module 3735, facilitates the methods described in reference to FIGS. 38, 44, 45, 48, and 50A-B.

Symbolic hotspot description 3725 is a file that identifies a hotspot within a document. Symbolic hotspot description 3725 identifies the hotspot number and content. In this example, symbolic hotspot description 3725 is stored to data store 3750. An example of a symbolic hotspot description is shown in greater detail in FIG. 41.

Modified files 3730 are documents and web pages created as a result of the modifications and transformations of source files 3710 by plug-in 3720. For example, a marked-up HTML file as noted above is an example of a modified file 3730. Modified files 3730 are returned to browser 3715 for display to the user, in certain instances as will be apparent in light of this disclosure.

Capture module 3735 is a software application that performs a feature extraction and/or coordinate capture on the printed representation of documents, so that the layout of characters and graphics on the printed pages can be retrieved. The layout, i.e., the two-dimensional arrangement of text on the printed page, may be captured automatically at the time of printing. For example, capture module 3735 executes all the text and drawing print commands and, in addition, intercepts and records the x-y coordinates and other characteristics of every character and/or image in the printed representation. According to one embodiment, capture module 3735 is a Printcapture DLL as described herein, a forwarding Dynamically Linked Library (DLL) that allows addition or modification of the functionality of an existing DLL. A more detailed description of the functionality of capture module 3735 is described in reference to FIG. 44.

Those skilled in the art will recognize that the capture module 3735 is coupled to the output of browser 3715 for capture of data. Alternatively, the functions of capture module 3735 may be implemented directly within a printer driver. In one embodiment, capture module 3735 is equivalent to PD capture module 318, as described in reference to FIG. 3.

Page_desc.xml 3740 is an extensible markup language ("XML") file to which text-related output is written for function calls processed by capture module 3735 that are text related. The page_desc.xml 3740 includes coordinate information for a document for all printed text by word and by character, as well as hotspot information, printer port name, browser name, date and time of printing, and dots per inch (dpi) and resolution (res) information. page_desc.xml 3740 is stored, e.g., in data store 3750. Data store 3750 is equivalent to MMR database 3400 described with reference to FIG. 34A. FIGS. 42A-B illustrate in greater detail an example of a page_desc.xml 3740 for an HTML file.

hotspot.xml 3745 is an XML file that is created when a document is printed (e.g., by operation of print driver 316, as previously discussed). hotspot.xml is the result of merging symbolic hotspot description 3725 and page_desc.xml 3740. hotspot.xml includes hotspot identifier information such as hotspot number, coordinate information, dimension information, and the content of the hotspot. An example of a hotspot.xml file is illustrated in FIG. 43.

Data store 3750 is any database known in the art for storing files, modified for use with the methods described herein. For example, according to one embodiment data store 3750 stores source files 3710, symbolic hotspot description 3725, page_desc.xml 3740, rendered page layouts, shared annotations, imaged documents, hot spot definitions, and feature representations. In one embodiment, data store 3750 is equivalent to document event database 320 as described with reference to FIG. 3 and to database system 3400 as described with reference to FIG. 34A.

MMR printing software 3760 is the software that facilitates the MMR printing operations described herein, for example as performed by the components of computer 3705 as previously described. MMR printing software 3760 is described below in greater detail with reference to FIG. 37B.

Figure 37B:
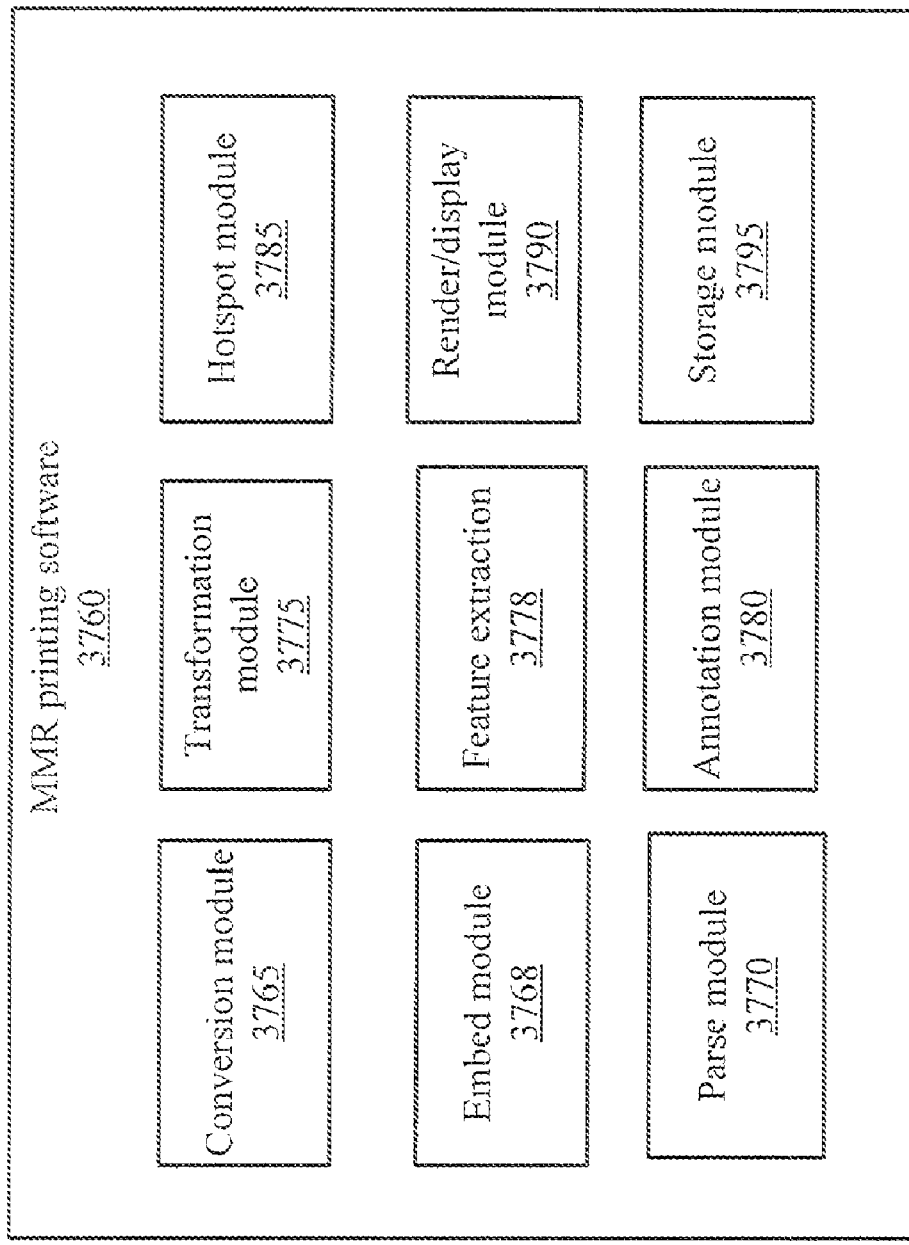
FIG. 37B illustrates a set of software components included in MMR printing software in accordance with an embodiment of the invention.

FIG. 37B illustrates a set of software components included MMR printing software 3760 in accordance with one embodiment of the invention. It should be understood that all or some of the MMR printing software 3760 may be included in the computer 112, 905, the capture device 106, the networked media server 114 and other servers as described herein. While the MMR printing software 3760 will now be described as including these different components, those skilled in the art will recognize that the MMR printing software 3760 could have any number of these components from one to all of them. The MMR printing software 3760 includes a conversion module 3765, an embed module 3768, a parse module 3770, a transform module 3775, a feature extraction module 3778, an annotation module 3780, a hotspot module 3785, a render/display module 3790, and a storage module 3795.

Conversion module 3765 enables conversion of a source document into an imaged document from which a feature representation can be extracted, and is one means for so doing.

Embed module 3768 enables embedding of marks corresponding to a designation for a hot spot in an electronic document, and is one means for so doing. In one particular embodiment, the embedded marks indicate a beginning point for the hot spot and an ending point for the hotspot. Alternatively, a pre-define area around an embodiment mark can be used to identify a hot spot in an electronic document. Various such marking schemes can be used.

Parse module 3770 enables parsing an electronic document (that has been sent to the printer) for a mark indicating a beginning point for a hotspot, and is one means for so doing.

Transformation module 3775 enables application of a transformation rule to a portion of an electronic document, and is one means for so doing. In one particular embodiment, the portion is a stream of characters between a mark indicating a beginning point for a hotspot and a mark indicating an ending point for the hotspot.

Feature extraction module 3778 enables the extraction of features and capture of coordinates corresponding to a printed representation of a document and a hot spot, and is one means for so doing. Coordinate capture includes tapping print commands using a forwarding dynamically linked library and parsing the printed representation for a subset of the coordinates corresponding to a hot spot or transformed characters. Feature extraction module 3778 enables the functionality of capture module 3735 according to one embodiment.

Annotation module 3780 enables receiving shared annotations and their accompanying designations of portions of a document associated with the shared annotations, and is one means for so doing. Receiving shared annotations includes receiving annotations from end users and from a SDA server.

Hotspot module 3785 enables association of one or more clips with one or more hotspots, and is one means for so doing. Hotspot module 3785 also enables formulation of a hotspot definition by first designating a location for a hotspot within a document and defining a clip to associate with the hotspot.

Render/display module 3790 enables a document or a printed representation of a document to be rendered or displayed, and is one means for so doing.

Storage module 3795 enables storage of various files, including a page layout, an imaged document, a hotspot definition, and a feature representation, and is one means for so doing.

The software portions 3765-3795 need not be discrete software modules. The software configuration shown is meant only by way of example; other configurations are contemplated by and within the scope of the present invention, as will be apparent in light of this disclosure.

Embedding a Hot Spot in a Document

Figure 38:
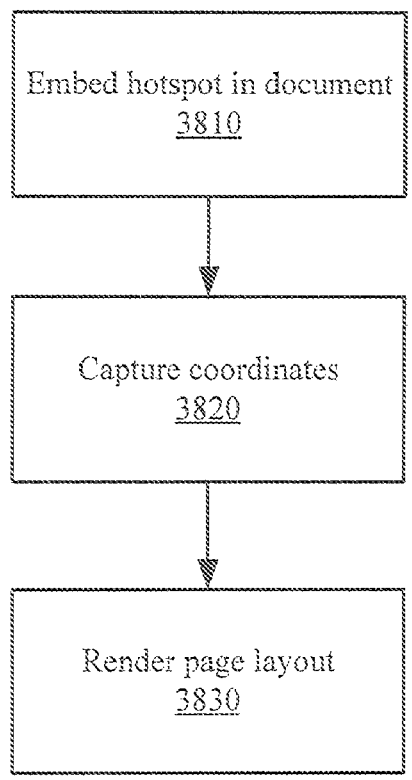
FIG. 38 illustrates a flowchart of a method of embedding a hot spot in a document in accordance with an embodiment of the present invention.

FIG. 38 illustrates a flowchart of a method of embedding a hot spot in a document in accordance with one embodiment of the present invention.

Figure 40A:
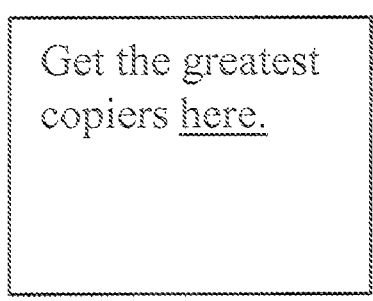
FIG. 40A illustrates an example of the HTML file of FIG. 39A displayed in a browser in accordance with an embodiment of the present invention.

According to the method, marks are embedded 3810 in a document corresponding to a designation for a hotspot within the document. In one embodiment, a document including a hotspot designation location is received for display in a browser, e.g., a document is received at browser 3715 from source files 3710. A hot spot includes some text or other document objects such as graphics or photos, as well as electronic data. The electronic data can include multimedia such as audio or video, or it can be a set of steps that will be performed on a capture device when the hot spot is accessed. For example, if the document is a HyperText Markup Language (HTML) file, the browser 3715 may be Internet Explorer, and the designations may be Uniform Resource Locators (URLs) within the HTML file. FIG. 39A illustrates an example of such an HTML file 3910 with a URL 3920. FIG. 40A illustrates the text of HTML file 3910 of FIG. 39A as displayed in a browser 4010, e.g., Internet Explorer.

To embed 3810 the marks, a plug-in 3720 to the browser 3715 surrounds each hotspot designation location with an individually distinguishable fiducial mark to create the hotspot. In one embodiment, the plug-in 3720 modifies the document displayed in the browser 3715, e.g., HTML displayed in Internet Explorer continuing the example above, and inserts marks, or tags, that bracket the hotspot designation location (e.g., URL). The marks are imperceptible to the end user viewing the document either in the browser 3715 or a printed version of the document, but can be detected in print commands. In this example a new font, referred to herein as MMR Courier New, is used for adding the beginning and ending fiducial marks. In MMR Courier New font, the typical glyph or dot pattern representation for the characters "b," "e," and the digits are represented by an empty space.

Referring again to the example HTML page shown in FIGS. 39A and 40A, the plug-in 3720 embeds 3810 the fiducial mark "b0" at the beginning of the URL ("here") and the fiducial mark "e0" at the end of the URL, to indicate the hotspot with identifier "0." Since the b, e, and digit characters are shown as spaces, the user sees little or no change in the appearance of the document. In addition, the plug-in 3720 creates a symbolic hotspot description 3725 indicating these marks, as shown in FIG. 41. The symbolic hotspot description 3725 identifies the hotspot number as zero 4120, which corresponds to the 0 in the "b0" and "e0" fiducial markers. In this example, the symbolic hotspot description 3725 is stored, e.g., to data store 3750.

The plug-in 3720 returns a "marked-up" version of the HTML 3950 to the browser 3715, as shown in FIG. 39B. The marked-up HTML 3950 surrounds the fiducial marks with span tags 3960 that change the font to 1-point MMR Courier New. Since the b, e, and digit characters are shown as spaces, the user sees little or no change in the appearance of the document. The marked-up HTML 3950 is an example of a modified file 3730. This example uses a single page model for simplicity, however, multiple page models use the same parameters. For example, if a hotspot spans a page boundary, it would have fiducial marks corresponding to each page location, the hotspot identifier for each is the same.

Next, in response to a print command, coordinates corresponding the printed representation and the hot spot are captured 3820. In one embodiment, a capture module 3735 "taps" text and drawing commands within a print command. The capture module 3735 executes all the text and drawing commands and, in addition, intercepts and records the x-y coordinates and other characteristics of every character and/or image in the printed representation. In this example, the capture module 3735 references the Device Context (DC) for the printed representation, which is a handle to the structure of the printed representation that defines the attributes of text and/or images to be output dependent upon the output format (i.e., printer, window, file format, memory buffer, etc.). In the process of capturing 3820 the coordinates for the printed representation, the hotspots are easily identified using the embedded fiducial marks in the HTML. For example, when the begin mark is encountered, the x-y location if recorded of all characters until the end mark is found.

According to one embodiment, the capture module 3735 is a forwarding DLL, referred to herein as "Printcapture DLL," which allows addition or modification of the functionality of an existing DLL. Forwarding DLLs appear to the client exactly as the original DLL, however, additional code (a "tap") is added to some or all of the functions before the call is forwarded to the target (original) DLL. In this example, the Printcapture DLL is a forwarding DLL for the Windows Graphics Device Interface (Windows GDI) DLL gdi32.dll. gdi32.dll has over 600 exported functions, all of which need to be forwarded. The Printcapture DLL, referenced herein as gdi32_mmr.dll, allows the client to capture printouts from any Windows application that uses the DLL gdi32.dll for drawing, and it only needs to execute on the local computer, even if printing to a remote server.

According to one embodiment, gdi32_mmr.dll is renamed as gdi32.dll and copied into C:\Windows\system32, causing it to monitor printing from nearly every Windows application. According to another embodiment, gdi32_mmr.dll is named gdi32.dll and copied it into the home directory of the application for which printing is monitored. For example, C:\Program Files\Internet Explorer for monitoring Internet Explorer on Windows XP. In this example, only this application (e.g., Internet Explorer) will automatically call the functions in the Printcapture DLL.

Figure 44:
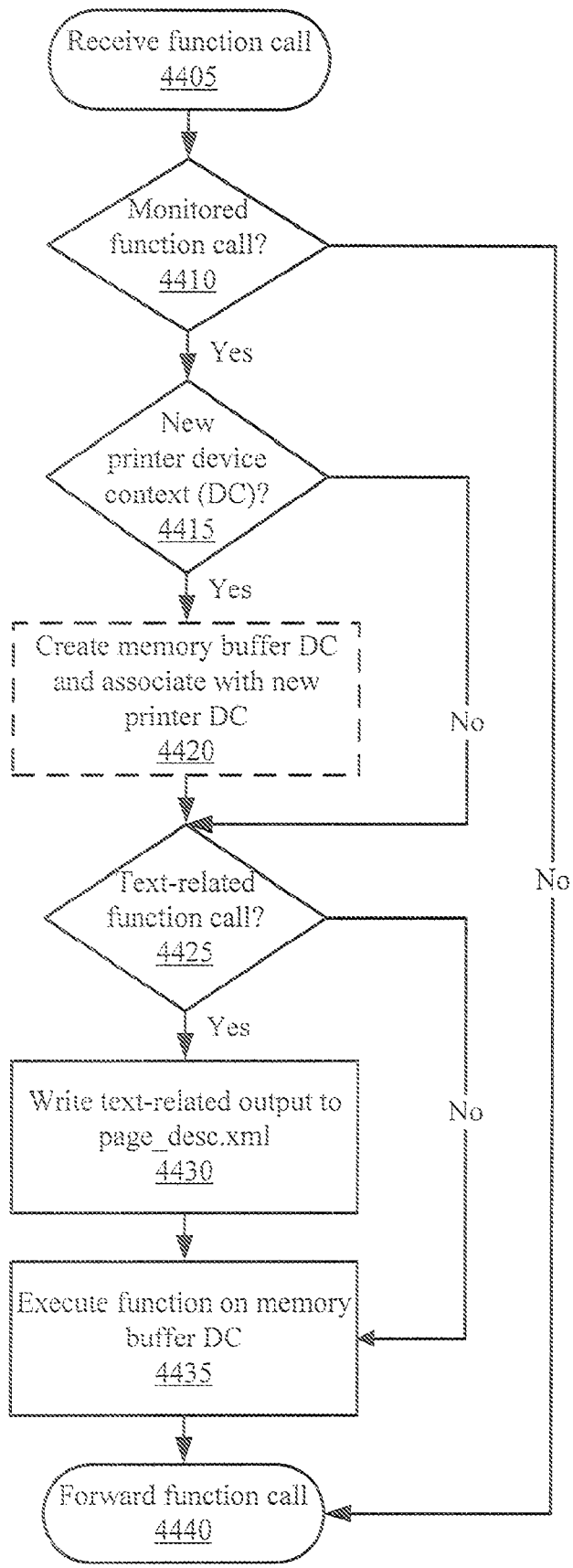
FIG. 44 illustrates a flowchart of the process used by a forwarding DLL in accordance with an embodiment of the present invention.

FIG. 44 illustrates a flowchart of the process used by a forwarding DLL in accordance with one embodiment of the present invention. The Printcapture DLL gdi32_mmr.dll first receives 4405 a function call directed to gdi32.dll. In one embodiment, gdi32_mmr.dll receives all function calls directed to gdi32.dll. gdi32.dll monitors approximately 200 of about 600 total function calls, which are for functions that affect the appearance of a printed page in some way. Thus, the Printcapture DLL next determines 4410 whether the received call is a monitored function call. If the received call is not a monitored function call, the call bypasses steps 4415 through 4435, and is forwarded 4440 to gdi32.dll.

If it is a monitored function call, the method next determines 4415 whether the function call specifies a "new" printer device context (DC), i.e., a printer DC that has not been previously received. This is determined by checking the printer DC against an internal DC table. A DC encapsulates a target for drawing (which could be a printer, a memory buffer, etc.), as previously noted, as well as drawing settings like font, color, etc. All drawing operations (e.g., LineTo( ), DrawText( ), etc) are performed upon a DC. If the printer DC is not new, then a memory buffer already exists that corresponds with the printer DC, and step 4420 is skipped. If the printer DC is new, a memory buffer DC is created 4420 that corresponds with the new printer DC. This memory buffer DC mirrors the appearance of the printed page, and in this example is equivalent to the printed representation referenced above. Thus, when a printer DC is added to the internal DC table, a memory buffer DC (and memory buffer) of the same dimensions is created and associated with the printer DC in the internal DC table.

gdi32_mmr.dll next determines 4425 whether the call is a text-related function call. Approximately 12 of the 200 monitored gdi32.dll calls are text-related. If it is not, step 4430 is skipped. If the function call is text-related, the text-related output is written 4430 to an xml file, referred to herein as page_desc.xml 3740, as shown in FIG. 37A. page_desc.xml 3740 is stored, e.g., in data store 3750.

FIGS. 42A and 42B show an example page_desc.xml 3740 for the HTML file 3910 example discussed in reference to FIGS. 39A and 40A. The page_desc.xml 3740 includes coordinate information for all printed text by word 4210 (e.g., Get), by x, y, width, and height, and by character 4220 (e.g., G). All coordinates are in dots, which are the printer equivalent of pixels, relative to the upper-left-corner of the page, unless otherwise noted. The page_desc.xml 3740 also includes the hotspot information, such as the beginning mark 4230 and the ending mark 4240, in the form of a "sequence." For a hotspot that spans a page boundary (e.g., of page N to page N+1), it shows up on both pages (N and N+1); the hotspot identifier in both cases is the same. In addition, other important information is included in page_desc.xml 3740, such as the printer port name 4250, which can have a significant effect on the .xml and .jpeg files produced, the browser 3715 (or application) name 4260, and the date and time of printing 4270, as well as dots per inch (dpi) and resolution (res) for the page 4280 and the printable region 4290.

Referring again to FIG. 44, following the determination that the call is not text related, or following writing 4430 the text-related output to page_desc.xml 3740, gdi32_mmr.dll executes 4435 the function call on the memory buffer for the DC. This step 4435 provides for the output to the printer to also get output to a memory buffer on the local computer. Then, when the page is incremented, the contents of the memory buffer are compressed and written out in JPEG and PNG format. The function call then is forwarded 4440 to gdi32.dll, which executes it as it normally would.

Figure 40B:
FIG. 40B illustrates an example of a printed version of the HTML file of FIG. 40A, in accordance with an embodiment of the present invention.

Referring again to FIG. 38, a page layout is rendered 3830 comprising the printed representation including the hot spot. In one embodiment, the rendering 3830 includes printing the document. FIG. 40B illustrates an example of a printed version 4011 of the HTML file 3910 of FIGS. 39A and 40A. Note that the fiducial marks are not visibly perceptible to the end user. The rendered layout is saved, e.g., to data store 3750.

According to one embodiment, the Printcapture DLL merges the data in the symbolic hotspot description 3725 and the page_desc.xml 3740, e.g., as shown in FIGS. 42A-B, into a hotspot.xml 3745, as shown in FIG. 43. In this example, hotspot.xml 3745 is created when the document is printed. The example in FIG. 43 shows that hotspot 0 occurs at x=1303, y=350 and is 190 pixels wide and 71 pixels high. The content of the hotspot is also shown, i.e., http://www.ricoh.com.

According to an alternate embodiment of capture module 3820, a filter in a Microsoft XPS (XML print specification) print driver, commonly known as an "XPSDrv filter," receives text drawing commands and creates the page_desc.xml file as described above.

Visibly Perceptible Hotspots

Figure 45:
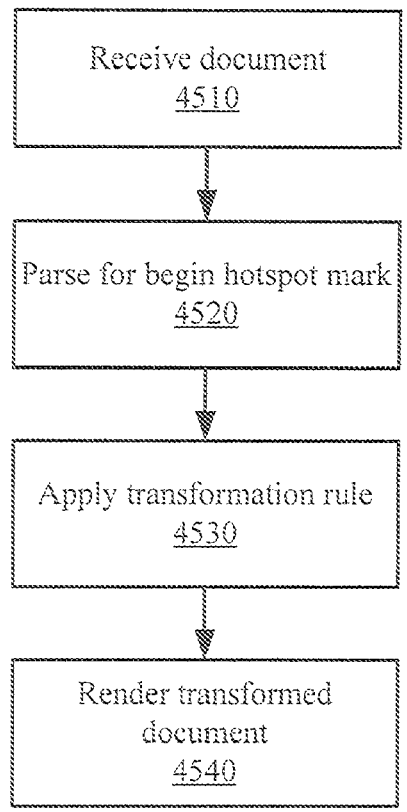
FIG. 45 illustrates a flowchart of a method of transforming characters corresponding to a hotspot in a document in accordance with an embodiment of the present invention.

FIG. 45 illustrates a flowchart of a method of transforming characters corresponding to a hotspot in a document in accordance with one embodiment of the present invention. The method modifies printed documents in a way that indicates to both the end user and MMR recognition software that a hot spot is present.

Figure 46:
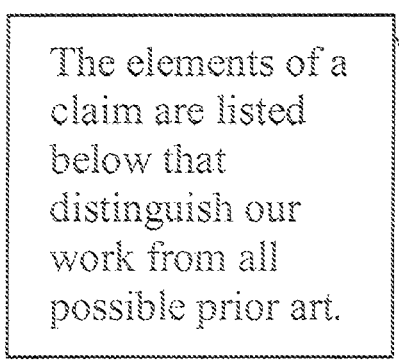
FIG. 46 illustrates an example of an electronic version of a document according to an embodiment of the present invention.

Initially, an electronic document to be printed is received 4510 as a character stream. For example, the document may be received 4510 at a printer driver or at a software module capable of filtering the character stream. In one embodiment, the document is received 4510 at a browser 3715 from source files 3710. FIG. 46 illustrates an example of an electronic version of a document 4610 according to one embodiment of the present invention. The document 4610 in this example has two hotspots, one associated with "are listed below" and one associated with "possible prior art." The hotspots are not visibly perceptible by the end user according to one embodiment. The hotspots may be established via the coordinate capture method described in reference to FIG. 38, or according to any of the other methods described herein.

The document is parsed 4520 for a begin mark, indicating the beginning of a hotspot. The begin mark may be a fiducial mark as previously described, or any other individually distinguishable mark that identifies a hotspot. Once a beginning mark is found, a transformation rule is applied 4530 to a portion of the document, i.e., the characters following the beginning mark, until an end mark is found. The transformation rule causes a visible modification of the portion of the document corresponding to the hotspot according to one embodiment, for example by modifying the character font or color. In this example, the original font, e.g., Times New Roman, may be converted to a different known font, e.g., OCR-A. In another example, the text is rendered in a different font color, e.g., blue #F86A. The process of transforming the font is similar to the process described above according to one embodiment. For example, if the document 4610 is an HTML file, when the fiducial marks are encountered in the document 4510 the font is substituted in the HTML file.

Figure 47:
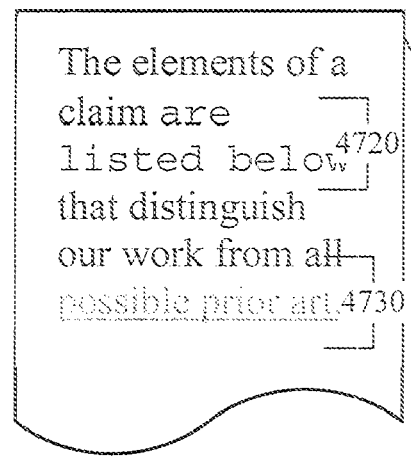
FIG. 47 illustrates an example of a printed modified document according to an embodiment of the present invention.

According to one embodiment, the transformation step is accomplished by a plug-in 3720 to the browser 3715, yielding a modified document 3730. FIG. 47 illustrates an example of a printed modified document 4710 according to one embodiment of the present invention. As illustrated, hotspots 4720 and 4730 are visually distinguishable from the remaining text. In particular, hotspot 4720 is visually distinguishable based on its different font, and hotspot 4730 is visually distinguishable based on its different color and underlining.

Next, the document with the transformed portion is rendered 4540 into a page layout, comprising the electronic document and the location of the hot spot within the electronic document. In one embodiment, rendering the document is printing the document. In one embodiment, rendering includes performing feature extraction on the document with the transformed portion, according to any of the methods of so doing described herein. In one embodiment, feature extraction includes, in response to a print command, capturing page coordinates corresponding to the electronic document, according to one embodiment. The electronic document is then parsed for a subset of the coordinates corresponding to the transformed characters. According to one embodiment, the capture module 3735 of FIG. 37A performs the feature extraction and/or coordinate capture.

MMR recognition software preprocesses every image using the same transformation rule. First it looks for text that obeys the rule, e.g., it's in OCR-A or blue #F86A, and then it applies its normal recognition algorithm.

This aspect of the present invention is advantageous because it reduces substantially the computational load of MMR recognition software because it uses a very simple image preprocessing routine that eliminates a large amount of the computing overhead. In addition, it improves the accuracy of feature extraction by eliminating the large number of alternative solutions that might apply from selection, e.g., if a bounding box over a portion of the document, e.g., as discussed in reference to FIGS. 51A-D. In addition, the visible modification of the text indicates to the end user which text (or other document objects) are part of a hot spot.

Shared Document Annotation

Figure 48:
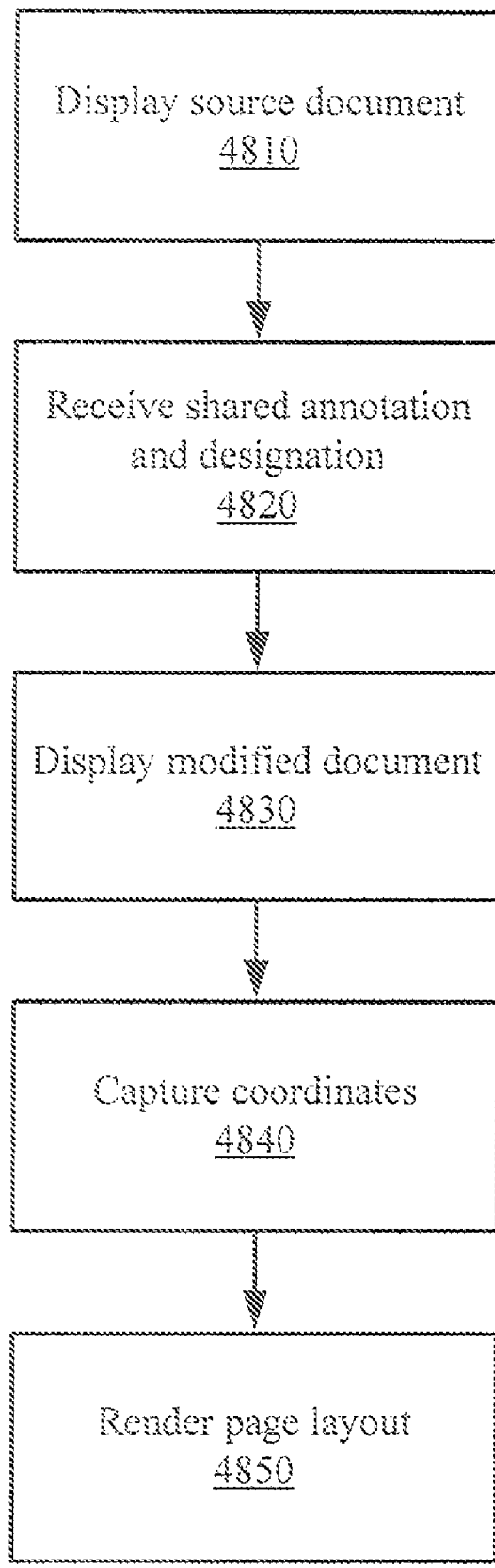
FIG. 48 illustrates a flowchart of a method of shared document annotation in accordance with an embodiment of the present invention.

FIG. 48 illustrates a flowchart of a method of shared document annotation in accordance with one embodiment of the present invention. The method enables users to annotate documents in a shared environment. In the embodiment described below, the shared environment is a web page being viewed by various users; however, the shared environment can be any environment in which resources are shared, such as a workgroup, according to other embodiments.

According to the method, a source document is displayed 4810 in a browser, e.g., browser 3715. In one embodiment, the source document is received from source files 3710; in another embodiment, the source document is a web page received via a network, e.g., Internet connection. Using the web page example, FIG. 49A illustrates a sample source web page 4910 in a browser according to one embodiment of the present invention. In this example, the web page 4910 is an HTML file for a game related to a popular children's book character, the Jerry Butter Game.

Upon display 4810 of the source document, a shared annotation and a designation of a portion of the source document associated with the shared annotation associated with the source document are received 4820. A single annotation is used in this example for clarity of description, however multiple annotations are possible. In this example, the annotations are data or interactions used in MMR as discussed herein. The annotations are stored at, and received by retrieval from, a Shared Documentation Annotation server (SDA server), e.g., 3755 as shown in FIG. 37A, according to one embodiment. The SDA server 3755 is accessible via a network connection in one embodiment. A plug-in for retrieval of the shared annotations facilitates this ability in this example, e.g., plug-in 3720 as shown in FIG. 37A. According to another embodiment, the annotations and designations are received from a user. A user may create a shared annotation for a document that does not have any annotations, or may add to or modify existing shared annotations to a document. For example, the user may highlight a portion of the source document, designating it for association with a shared annotation, also provided by the user via various methods described herein.

Next, a modified document is displayed 4830 in the browser. The modified document includes a hotspot corresponding to the portion of the source document designated in step 4820. The hotspot specifies the location for the shared annotation. The modified document is part of the modified files 3730 created by plug-in 3720 and returned to browser 3715 according to one embodiment. FIG. 49B illustrates a sample modified web page 4920 in a browser according to one embodiment of the present invention. The web page 4920 shows a designation for a hotspot 4930 and the associated annotation 4940, which is a video clip in this example. The designation 4930 may be visually distinguished from the remaining web page 4920 text, e.g., by highlighting. According to one embodiment, the annotation 4940 displays when the designation 4930 is clicked on or moused over.

In response to a print command, text coordinates corresponding to a printed representation of the modified document and the hotspot are captured 4840. The details of coordinate capture are according to any of the methods for that purpose described herein.

Then, a page layout of the printed representation including the hot spot is rendered 4850. According to one embodiment, the rendering 4850 is printing the document. FIG. 49C illustrates a sample printed web page 4950 according to one embodiment of the present invention. The printed web page layout 4950 includes the hotspot 4930 as designated, however the line breaks in the print layout 4950 differ from the web page 4920. The hotspot 4930 boundaries are not visible on the printed layout 4950 in this example.

In an optional final step, the shared annotations are stored locally, e.g., in data storage 3750, and are indexed using their associations with the hotspots 4930 in the printed document 4950. The printed representation also may be saved locally. In one embodiment, the act of printing triggers the downloading and creation of the local copy.

Hotspots for Imaged Documents

FIG. 50A illustrates a flowchart of a method of adding a hotspot to an imaged document in accordance with one embodiment of the present invention. The method allows hotspots to be added to a paper document after it is scanned, or to a symbolic electronic document after it is rendered for printing.

Figure 51A:
FIG. 51A illustrates an example of a user interface showing a portion of a newspaper page that has been scanned according to an embodiment.

First, a source document is converted 5010 to an imaged document. The source document is received at a browser 3715 from source files 3710 according to one embodiment. The conversion 5010 is by any method that produces a document upon which a feature extraction can be performed, to produce a feature representation. According to one embodiment, a paper document is scanned to become an imaged document. According to another embodiment, a renderable page proof for an electronic document is rendered using an appropriate application. For example, if the renderable page proof is in a PostScript format, Ghostscript is used. FIG. 51A illustrates an example of a user interface 5105 showing a portion of a newspaper page 5110 that has been scanned according to one embodiment. A main window 5115 shows an enlarged portion of the newspaper page 5110, and a thumbnail 5120 shows which portion of the page is being displayed.

Next, feature extraction is applied 5020 to the imaged document to create a feature representation. Any of the various feature extraction methods described herein may be used for this purpose. The feature extraction is performed by the capture module 3735 described in reference to FIG. 37A according to one embodiment. Then one or more hotspots 5125 is added 5030 to the imaged document. The hotspot may be pre-defined or may need to be defined according to various embodiments. If the hotspot is already defined, the definition includes a page number, the coordinate location of the bounding box for the hot spot on the page, and the electronic data or interaction attached to the hot spot. In one embodiment, the hotspot definition takes the form of a hotspot.xml file, as illustrated in FIG. 43.

If the hotspot is not defined, the end user may define the hotspot. FIG. 50B illustrates a flowchart of a method of defining a hotspot for addition to an imaged document in accordance with one embodiment of the present invention. First, a candidate hotspot is selected 5032. For example, in FIG. 51A, the end user has selected a portion of the document as a hotspot using a bounding box 5125. Next, for a given database, it is determined in optional step 5034 whether the hotspot is unique. For example, there should be enough text in the surrounding n"×n" patch to uniquely identify the hot spot. An example of a typical value for n is 2. If the hotspot is not sufficiently unique for the database, the end user is presented with options in one embodiment regarding how to deal with an ambiguity. For example, a user interface may provide alternatives such as selecting a larger area or accepting the ambiguity but adding a description of it to the database. Other embodiments may use other methods of defining a hotspot.

Figure 51B:
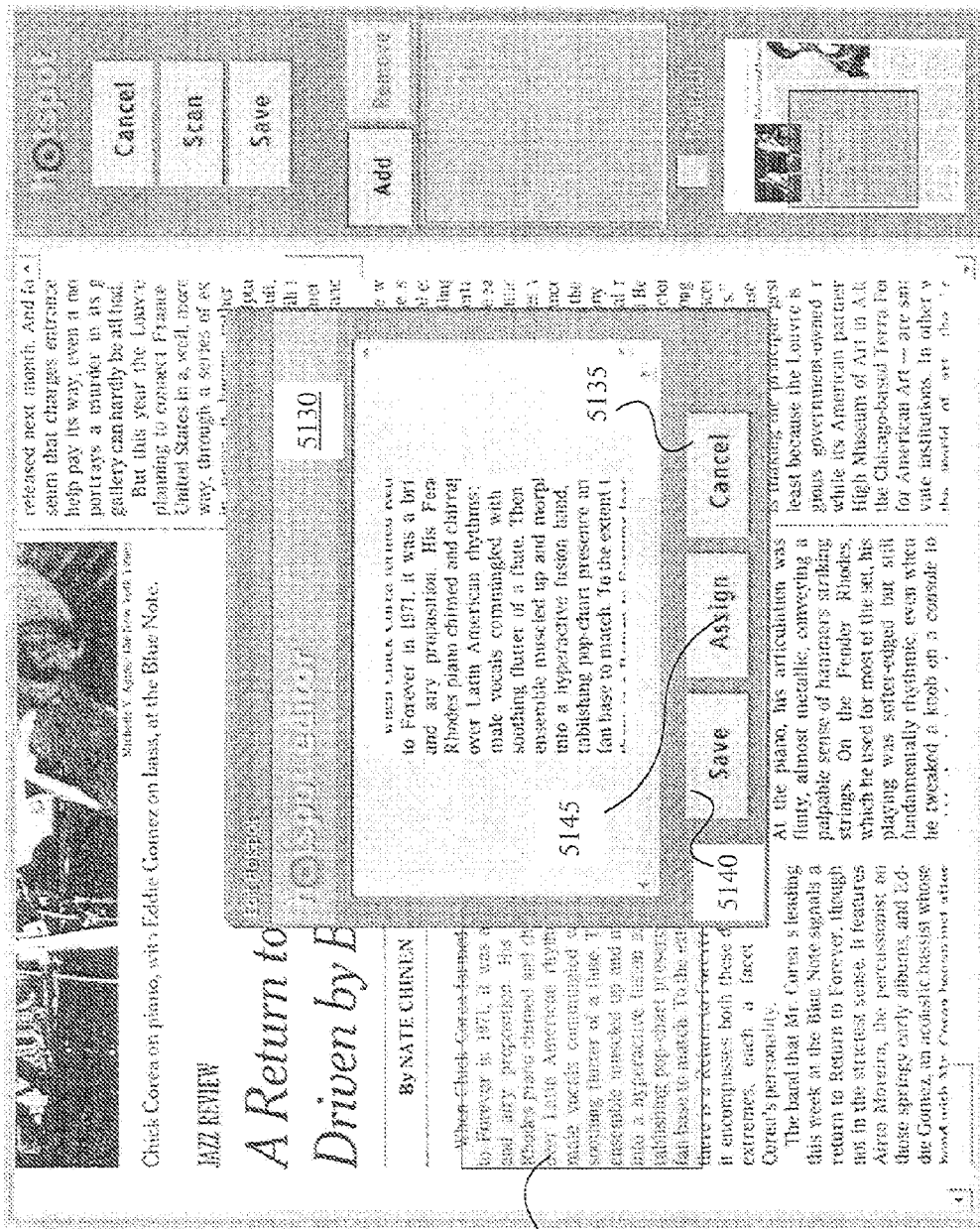
FIG. 51B illustrates a user interface for defining the data or interaction to associate with a selected hotspot.
Figure 51C:
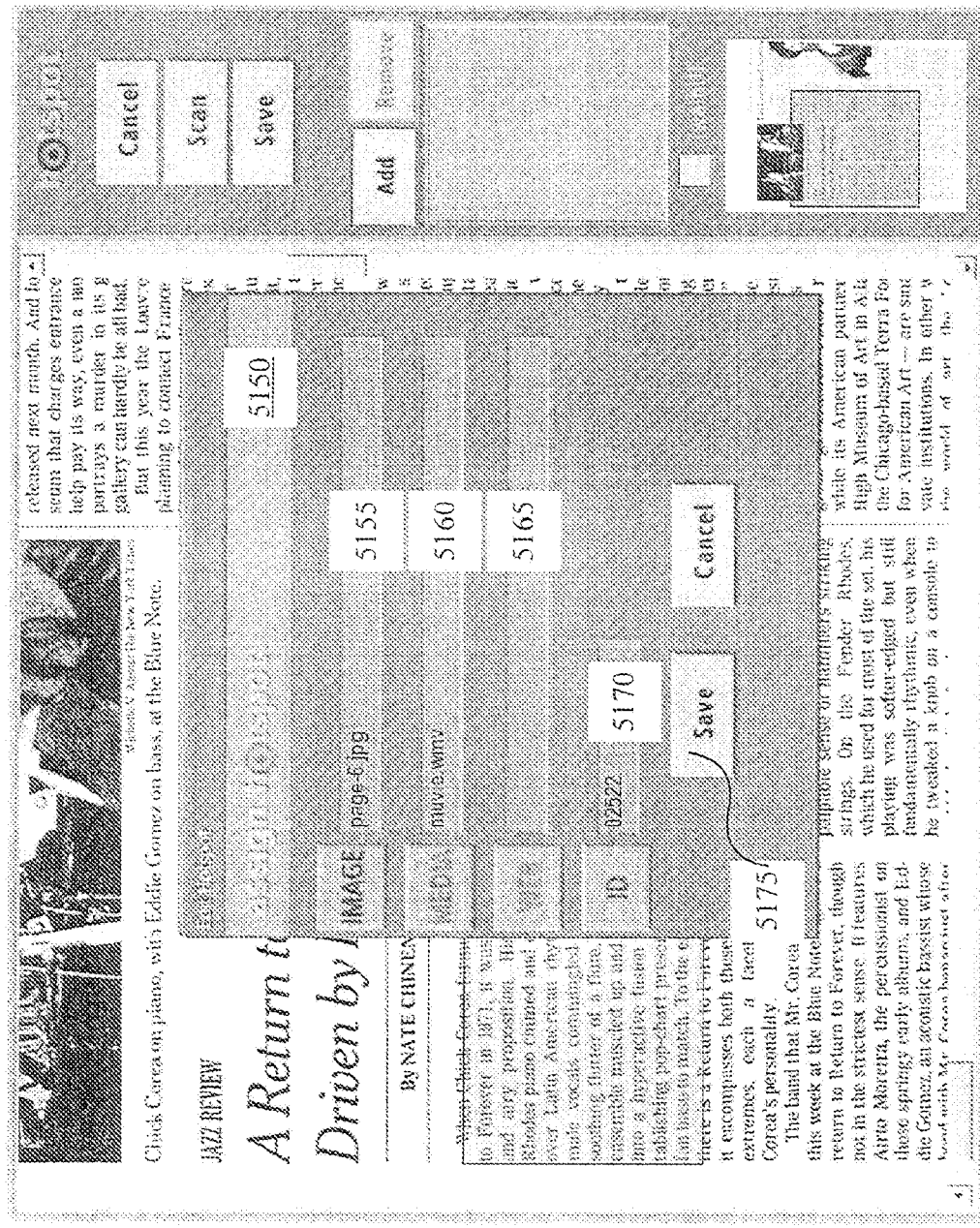
FIG. 51C illustrates the user interface of FIG. 51B including an assign box in accordance with an embodiment of the present invention.
Figure 51D:
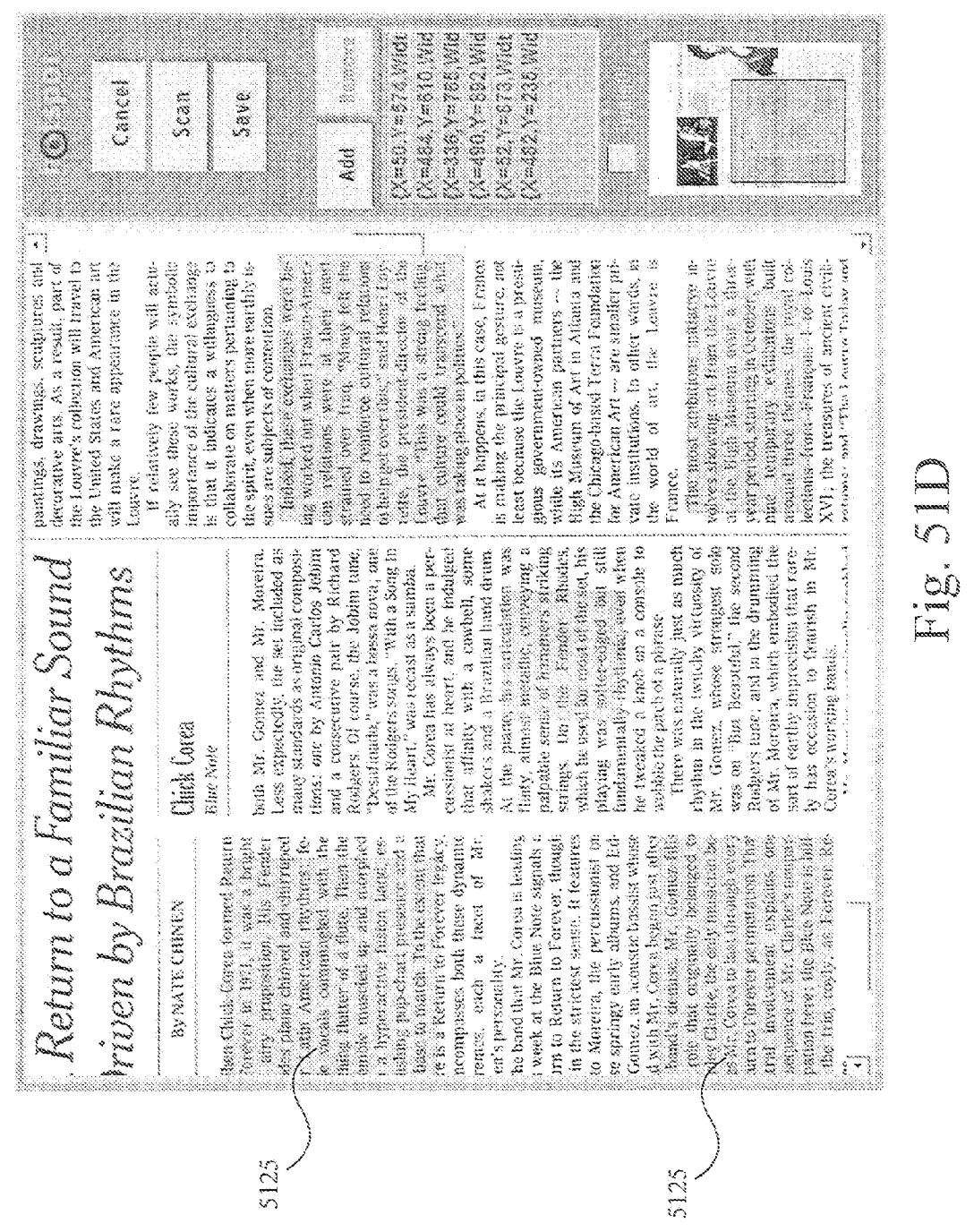

Once the hotspot location is selected 5032, data or an interaction is defined 5036 and attached to the hotspot. FIG. 51B illustrates a user interface for defining the data or interaction to associate with a selected hotspot. For example, once the user has selected the bounding box 5125, an edit box 5130 is displayed. Using associated buttons, the user may cancel 5135 the operation, simply save 5140 the bounding box 5125, or assign 5145 data or interactions to the hotspot. If the user selects to assign data or interactions to the hotspot, an assign box 5150 is displayed, as shown in FIG. 51C. The assign box 5150 allows the end user to assign images 5155, various other media 5160, and web links 5165 to the hotspot, which is identified by an ID number 5170. The user then can select to save 5175 the hotspot definition. Although a single hotspot has been described for simplicity, multiple hotspots are possible. FIG. 51D illustrates a user interface for displaying hotspots 5125 within a document. In one embodiment, different color bounding boxes correspond to different data and interaction types.

In an optional step, the imaged document, hot spot definition, and the feature representation are stored 5040 together, e.g., in data store 3750.

Figure 52:
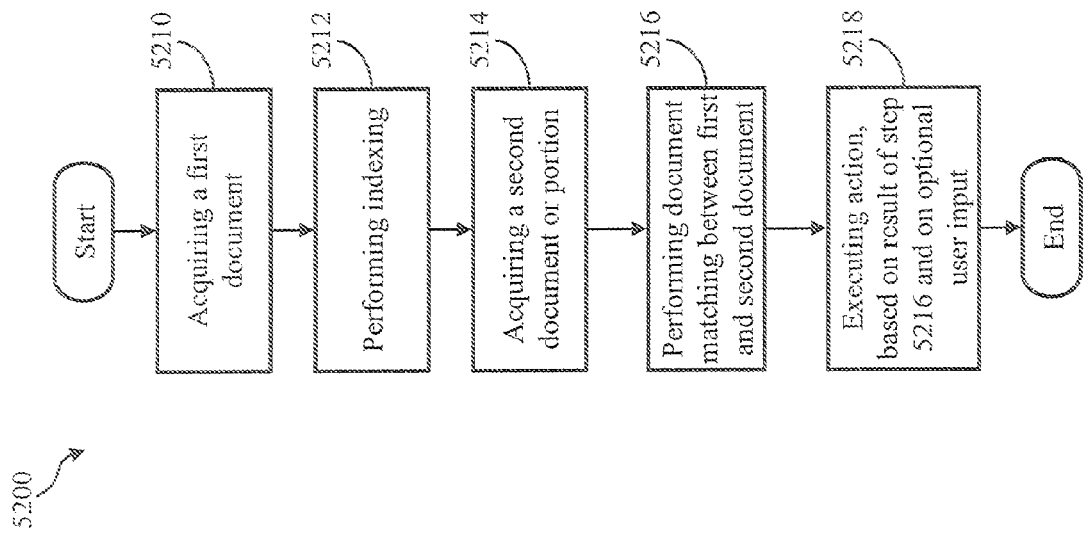
FIG. 52 illustrates a flowchart of a method of using an MMR document and the MMR system in accordance with an embodiment of the present invention.

FIG. 52 illustrates a method 5200 of using an MMR document 500 and the MMR system 100b in accordance with an embodiment of the present invention.

The method 5200 begins by acquiring 5210 a first document or a representation of the first document. Example methods of acquiring the first document include the following: (1) the first document is acquired by capturing automatically, via PD capture module 318, the text layout of a printed document within the operating system of MMR computer 112; (2) the first document is acquired by capturing automatically the text layout of a printed document within printer driver 316 of MMR computer 112; (3) the first document is acquired by scanning a paper document via a standard document scanner device 127 that is connected to, for example, MMR computer 112; and (4) the first document is acquired by transferring, uploading or downloading, automatically or manually, a file that is a representation of the printed document to the MMR computer 112. While the acquiring step has been described as acquiring most or all of the printed document, it should be understood that the acquiring step 5210 could be performed for only the smallest portion of a printed document. Furthermore, while the method is described in terms of acquiring a single document, this step may be performed to acquire a number of documents and create a library of first documents.

Once the acquiring step 5210 is performed, the method 5200 performs 5212 an indexing operation on the first document. The indexing operation allows identification of the corresponding electronic representation of the document and associated second media types for input that matches the acquired first document or portions thereof. In one embodiment of this step, a document indexing operation is performed by the PD capture module 318 that generates the PD index 322. Example indexing operations include the following: (1) the x-y locations of characters of a printed document are indexed; (2) the x-y locations of words of a printed document are indexed; (3) the x-y locations of an image or a portion of an image in a printed document are indexed; (4) an OCR imaging operation is performed, and the x-y locations of characters and/or words are indexed accordingly; (4) feature extraction from the image of the rendered page is performed, and the x-y locations of the features are indexed; and (5) the feature extraction on the symbolic version of a page are simulated, and the x-y locations of the features are indexed. The indexing operation 5212 may include any of the above or groups of the above indexing operations depending on application of the present invention.

The method 5200 also acquires 5214 a second document. In this step 5214, the second document acquired can be the entire document or just a portion (patch) of the second document. Example methods of acquiring the second document include the following: (1) scanning a patch of text, by means of one or more capture mechanisms 230 of capture device 106; (2) scanning a patch of text by means of one or more capture mechanisms 230 of capture device 106 and, subsequently, preprocessing the image to determine the likelihood that the intended feature description will be extracted correctly. For example, if the index is based on OCR, the system might determine whether the image contains lines of text and whether the image sharpness is sufficient for a successful OCR operation. If this determination fails, another patch of text is scanned; (3) scanning a machine-readable identifier (e.g., international standard book number (ISBN) or universal produce code (UPC) code) that identifies the document that is scanned; (4) inputting data that identifies a document or a set of documents (e.g., 2003 editions of Sports Illustrated magazine) that is requested and, subsequently, a patch of text is scanned by use of items (1) or (2) of this method step; (5) receiving email with a second document attached; (6) receiving a second document by file transfer; (7) scanning a portion of an image with one or more capture mechanisms 230 of capture device 106; and (9) inputting the second document with an input device 166.

Once the steps 5210 and 5214 have been performed, the method performs 5216 document or pattern matching between the first document and the second document. In one embodiment, this is done by performing document fingerprint matching of the second document to the first document. A document fingerprint matching operation is performed on the second media document by querying PD index 322. An example of document fingerprint matching is extracting features from the image captured in step 5214, composing descriptors from those features, and looking up the document and patch that contains a percentage of those descriptors. It should be understood that this pattern matching step may be performed a plurality of times, once for each document where the database stores numerous documents to determine if any documents in a library or database match the second document. Alternatively, the indexing step 5212 adds the document 5210 to an index that represents a collection of documents and the pattern matching step is performed once.

Finally, the method 5200 executes 5218 an action based on result of step 5216 and on optionally based on user input. In one embodiment, the method 5200 looks up a predetermined action that is associated with the given document patch, as for example, stored in the second media 504 associated with the hotspot 506 found as matching in step 5216. Examples of predetermined actions include: (1) retrieving information from the document event database 320, the Internet, or elsewhere; (2) writing information to a location verified by the MMR system 100*b* that is ready to receive the system's output; (3) looking up information; (4) displaying information on a client device, such as capture device 106, and conducting an interactive dialog with a user; (5) queuing up the action and the data that is determined in method step 5216, for later execution (the user's participation may be optional); and (6) executing immediately the action and the data that is determined in method step 5216. Example results of this method step include the retrieval of information, a modified document, the execution of some other action (e.g., purchase of stock or of a product), or the input of a command sent to a cable TV box, such as set-top box 126, that is linked to the cable TV server (e.g., service provider server 122), which streams video back to the cable TV box. Once step 5218 has been done, the method 5200 is complete and ends.

Figure 53:
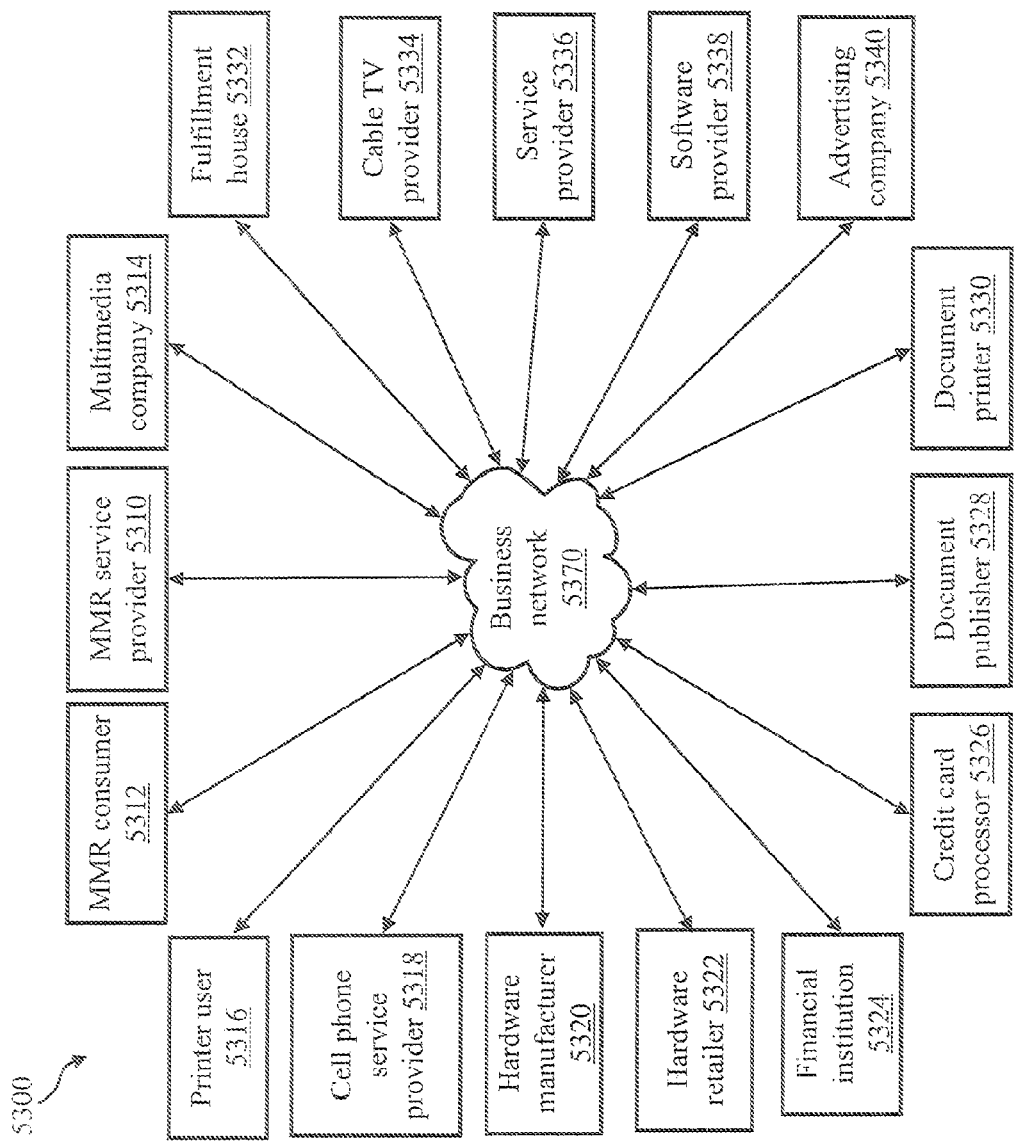
FIG. 53 illustrates a block diagram of an exemplary set of business entities associated with the MMR system, in accordance with an embodiment of the present invention.

FIG. 53 illustrates a block diagram of an example set of business entities 5300 that are associated with MMR system 100*b*, in accordance with an embodiment of the present invention. The set of business entities 5300 comprise an MMR service provider 5310, an MMR consumer 5312, a multimedia company 5314, a printer user 5316, a cell phone service provider 5318, a hardware manufacturer 5320, a hardware retailer 5322, a financial institution 5324, a credit card processor 5326, a document publisher 5328, a document printer 5330, a fulfillment house 5332, a cable TV provider 5334, a service provider 5336, a software provider 5338, an advertising company 5340, and a business network 5370.

MMR service provider 5310 is the owner and/or administrator of an MMR system 100 as described with reference to FIGS. 1A through 5 and 52. MMR consumer 5312 is representative of any MMR user 110, as previously described with reference to FIG. 1B.

Multimedia company 5314 is any provider of digital multimedia products, such as Blockbuster Inc. (Dallas, Tex.), that provides digital movies and video games and Sony Corporation of America (New York, N.Y.) that provides digital music, movies, and TV shows.

Printer user 5316 is any individual or entity that utilizes any printer of any kind in order to produce a printed paper document. For example, MMR consumer 5312 may be printer user 5316 or document printer 5330.

Cell phone service provider 5318 is any cell phone service provider, such as Verizon Wireless (Bedminster, N.J.), Cingular Wireless (Atlanta, Ga.), T-Mobile USA (Bellevue, Wash.), and Sprint Nextel (Reston, Va.).

Hardware manufacturer 5320 is any manufacturer of hardware devices, such as manufacturers of printers, cellular phones, or PDAs. Example hardware manufacturers include Hewlett-Packard (Houston, Tex.), Motorola, Inc, (Schaumburg, Ill.), and Sony Corporation of America (New York, N.Y.). Hardware retailer 5322 is any retailer of hardware devices, such as retailers of printers, cellular phones, or PDAs. Example hardware retailers include, but are not limited to, RadioShack Corporation (Fort Worth, Tex.), Circuit City Stores, Inc. (Richmond, Va.), Wal-Mart (Bentonville, Ark.), and Best Buy Co. (Richfield, Minn.).

Financial institution 5324 is any financial institution, such as any bank or credit union, for handling bank accounts and the transfer of funds to and from other banking or financial institutions. Credit card processor 5326 is any credit card institution that manages the credit card authentication and approval process for a purchase transaction. Example credit card processors include, but are not limited to, ClickBank, which is a service of Click Sales Inc, (Boise Id.), ShareIt! Inc. (Eden Prairie, Minn.), and CCNow Inc. (Eden Prairie, Minn.).

Document publisher 5328 is any document publishing company, such as, but not limited to, The Gregath Publishing Company (Wyandotte, Okla.), Prentice Hall (Upper Saddle River, N.J.), and Pelican Publishing Company (Gretna, La.). Document printer 5330 is any document printing company, such as, but not limited to, PSPrint LLC (Oakland Calif.), PrintLizard, Inc., (Buffalo, N.Y.), and Mimeo, Inc. (New York, N.Y.). In another example, document publisher 5328 and/or document printer 5330 is any entity that produces and distributes newspapers or magazines.

Fulfillment house 5332 is any third-party logistics warehouse that specializes in the fulfillment of orders, as is well known. Example fulfillment houses include, but are not limited to, Corporate Disk Company (McHenry, Ill.), OrderMotion, Inc. (New York, N.Y.), and Shipwire.com (Los Angeles, Calif.).

Cable TV provider 5334 is any cable TV service provider, such as, but not limited to, Comcast Corporation (Philadelphia, Pa.) and Adelphia Communications (Greenwood Village, Colo.). Service provider 5336 is representative of any entity that provides a service of any kind.

Software provider 5338 is any software development company, such as, but not limited to, Art & Logic, Inc. (Pasadena, Calif.), Jigsaw Data Corp. (San Mateo, Calif.), DataMirror Corporation (New York, N.Y.), and DataBank IMX, LCC (Beltsville, Md.).

Advertising company 5340 is any advertising company or agency, such as, but not limited to, D and B Marketing (Elhurst, Ill.), BlackSheep Marketing (Boston, Mass.), and Gotham Direct, Inc. (New York, N.Y.).

Business network 5370 is representative of any mechanism by which a business relationship is established and/or facilitated.

Figure 54:
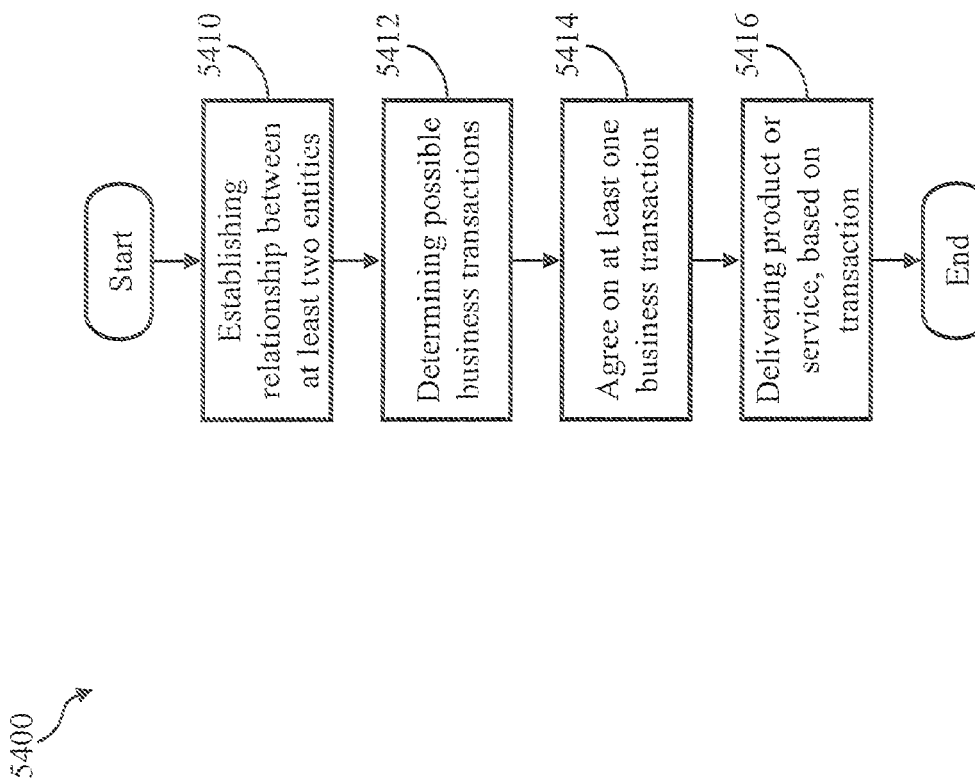
FIG. 54 illustrates a flowchart of a method, which is a generalized business method that is facilitated by use of the MMR system, in accordance with an embodiment of the present invention.

FIG. 54 illustrates a method 5400, which is a generalized business method that is facilitated by use of MMR system 100*b*, in accordance with an embodiment of the present invention. Method 5400 includes the steps of: establishing relationship between at least two entities, determining possible business transactions; executing at least one business transaction and delivering product or service for the transaction.

First, a relationship is established 5410 between at least two business entities 5300. The business entities 5300 may be aligned within, for example, four broad categories, such as (1) MMR creators, (2) MMR distributors, (3) MMR users, and (4) others, and within which some business entities fall into more than one category. According to this example, business entities 5300 are categorized as follows:

MMR creators—MMR service provider 5310, multimedia company 5314, document publisher 5328, document printer 5330, software provider 5338 and advertising company 5340;

MMR distributors—MMR service provider 5310, multimedia company 5314, cell phone service provider 5318, hardware manufacturer 5320, hardware retailer 5322, document publisher 5328, document printer 5330, fulfillment house 5332, cable TV provider 5334, service provider 5336 and advertising company 5340;

MMR users—MMR consumer 5312, printer user 5316 and document printer 5330; and Others—financial institution 5324 and credit card processor 5326.

For example in this method step, a business relationship is established between MMR service provider 5310, which is an MMR creator, and MMR consumer 5312, which is an MMR user, and cell phone service provider 5318 and hardware retailer 5322, which are MMR distributors. Furthermore, hardware manufacturer 5320 has a business relationship with hardware retailer 5322, both of which are MMR distributors.

Next, the method 5400 determines 5412 possible business transactions between the parties with relationships established in step 5410. In particular, a variety of transactions may occur between any two or more business entities 5300. Example transactions include: purchasing information; purchasing physical merchandise; purchasing services; purchasing bandwidth; purchasing electronic storage; purchasing advertisements; purchasing advertisement statistics; shipping merchandise; selling information; selling physical merchandise; selling services, selling bandwidth; selling electronic storage; selling advertisements; selling advertisement statistics; renting/leasing; and collecting opinions/ratings/voting.

Once the method 5400 has determined possible business transactions between the parties, the MMR system 100 is used to reach 5414 agreement on at least one business transaction. In particular, a variety of actions may occur between any two or more business entities 5300 that are the result of a transaction. Example actions include: purchasing information; receiving an order; clicking-through, for more information; creating ad space; providing local/remote access; hosting; shipping; creating business relationships; storing private information; passing-through information to others; adding content; and podcasting.

Once the method 5400 has reached agreement on the business transaction, the MMR system 100 is used to deliver 5416 products or services for the transaction, for example, to the MMR consumer 5312. In particular, a variety of content may be exchanged between any two or more business entities 5300, as a result of the business transaction agreed to in method step 5414. Example content includes: text; web link; software; still photos; video; audio; and any combination of the above. Additionally, a variety of delivery mechanisms may be utilized between any two or more business entities 5300, in order to facilitate the transaction. Example delivery mechanisms include: paper; personal computer; networked computer; capture device 106; personal video device; personal audio device; and any combination of the above.

Figure 55:
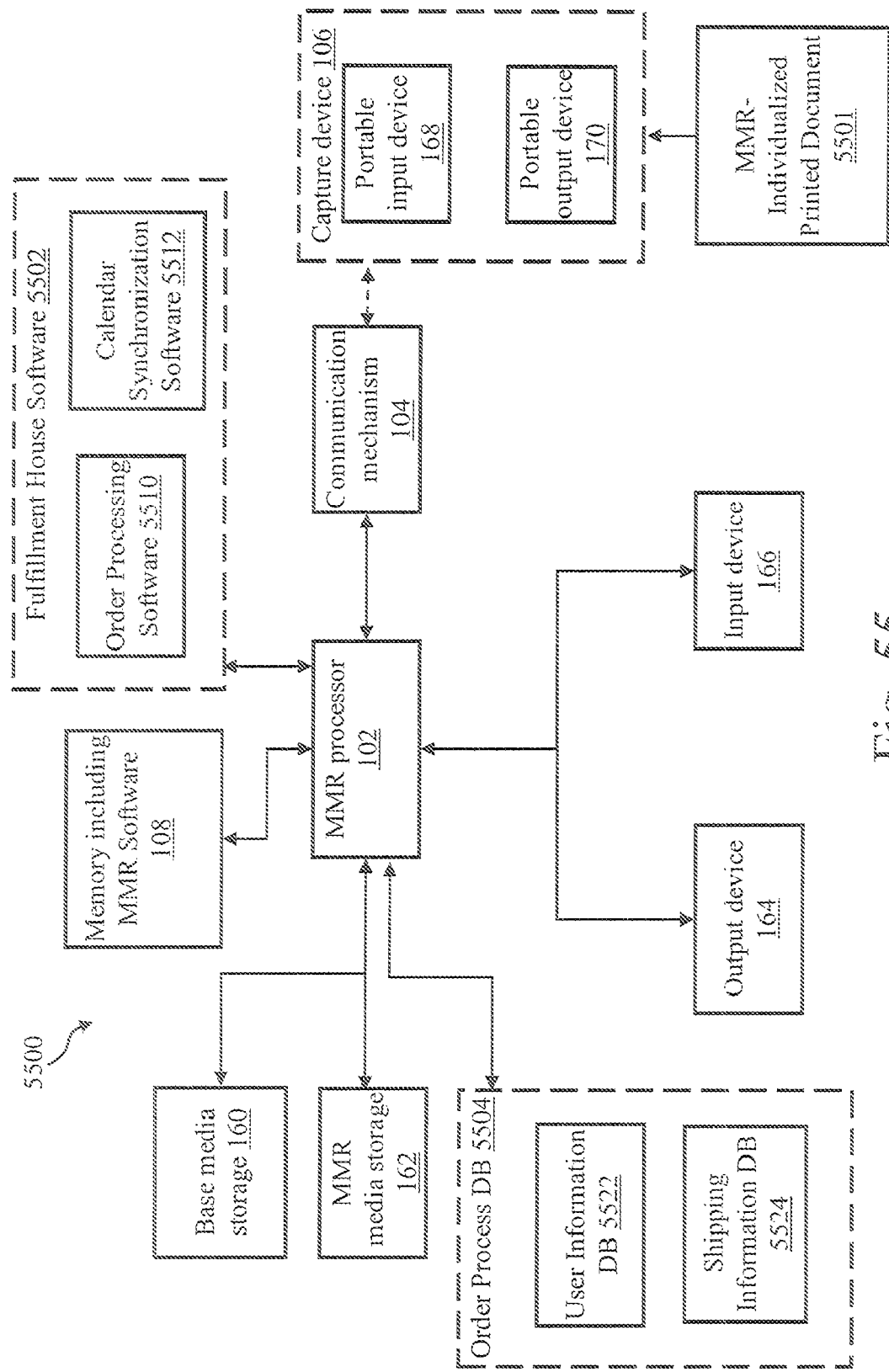
FIG. 55 illustrates a functional block diagram of one embodiment of the MMR system in accordance with the invention for use in ordering goods or services using MMR-individualized documents.

FIG. 55 illustrates a functional block diagram of one embodiment of the MMR system in accordance with the invention for use in ordering goods or services using MMR-individualized documents. The MMR system 5500 is configured for ordering and processing goods or services from a fulfillment house using a MMR-individualized commercially printed document 5501. Although FIG. 55 illustrates the example of using the MMR-individualized document 5501 with the MMR system 5500 for ordering goods or services, note that the MMR-individualized document 5501 may be used for any other types of business transaction. The MMR system 5500 is substantially same as the MMR system 100*a* illustrated in FIG. 1A, except that it additionally includes the fulfillment house software 5502 and the order process database (DB) 5504 for use with the MMR-individualized printed document 5501.

The MMR-individualized printed document 5501 is a MMR document printed in accordance with the MMR system and method as illustrated in, for example, FIGS. 1A, 1B, 4, and 52. The MMR document 5501 includes one or more hotspots or portions of the document that uniquely identify an individual or a user of the document 5501 as well as other hotspots identifying the document 5501. The hotspots are indexed and stored in the PD index 322 (or equivalently MMR database 3400) similar to other MMR documents as described herein. In one embodiment, the MMR document 5501 is a printed catalogue for ordering goods or services (a book, grocery, a travel package, home repair services, etc.) and includes hotspot text or images that identify the document (catalogue) as well as hotspots that identify one or more users or individuals associated with the catalogue.

The MMR documents 5501 are "individualized" in the sense that the hotspots contain textual or image identifiers that identify one or more users or individuals associated with the document. For example, the document 5501 may include the name and address of the recipient of the document 5501 which can be recognized as a hotspot for identification of the user. For another example, the document 5501 may include bar codes or other identification numbers or images which can be recognized as a hotspot for identification of the user. In a specific implementation, the user identification information can appear as a mailing label on the document. The user can be identified by OCR (Optical Character Recognition) of the label or recognition of the postal bar code (known as the POSTNET bar code in the United States). The mailing label can also contain a bar code or other information (e.g., printed text) that identifies the specific edition of the catalog, e.g., the Victoria Secrets November 2006 catalog for the San Francisco Bay area. Thus, the mailing label contains information that identifies the individual user in the database 5522 who was sent the catalog and the catalog itself. This is sufficient to retrieve the user's identifying information and a list of hotspots in the catalog. The hotspot data would include identification for items in the catalog, the pages on which they appear, and information needed to order the items. The user interface on the capture device 106 could use this information to provide the ability to order goods and services. Alternatively, the hotspot information could include information about the image features that correspond to each hotspot that could be used in a subsequent comparison step by the MMR recognition system.

For still another example, the document 5501 does not include separate text or image for identification of the user, but includes minor variations in the appearance of the original text in the document itself, e.g., the shape, font size, orientation, color, etc. of the text and images that are originally included in the document 5501, which can be recognized as hotspots for identification of the user. An example is to have the descriptions of the items on the catalogue to include minor variations in the appearance, shape, font size, orientation, color, etc., so that the users would not easily recognize the differences in the individualized MMR document 5501 but the MMR system 5500 may recognize the user by matching the hotspots with the fingerprints of the documents. In one example implementation, combinations of image characteristics, e.g., font and color, are associated with user identification information in database 5522. For example, a catalog might be printed with hotspots in an OCR-A font with blue #F86A ink. That font-color combination is assigned to the user in database 5522 who is sent the corresponding catalog. The MMR recognition software preprocesses every image for the font-color combination and sends the identity of the font and color to the order processing database 5504 that uses the font-color combination to look up the user identification information. A unique combination of image characteristics can be assigned to each user. This has the advantage that each hotspot uniquely identifies the intended recipient of the catalog. The same capability can be provided by shifting the positions of characters or words by small amounts horizontally or vertically. The shift amounts can encode digital information (e.g., user identification and hot spots) in a text such that it's almost imperceptible to the reader but easily decoded by a recognition algorithm. In an alternate implementation, a combination of image characteristics is chosen from a limited set and assigned to each user in the database 5522. The MMR recognition software still recognizes the presence of those image characteristics and sends their identities to the order processing database (e.g., it might find OCR-A font in blue #F86A or certain character or word position shifts in the input image). However, it also sends secondary user identification information from the MMR device 106, such as the registered owner of the device, as determined from a profile stored on the device, its telephone number, or the registered owner of the device as provided by the cell phone service provider 5318, service provider 5336, cable TV provider 5334, or other provider of an MMR-related service. The order processing database 5504 verifies that those image characteristics recognized by the MMR recognition system correspond with the secondary user identification information.

Figure 56:
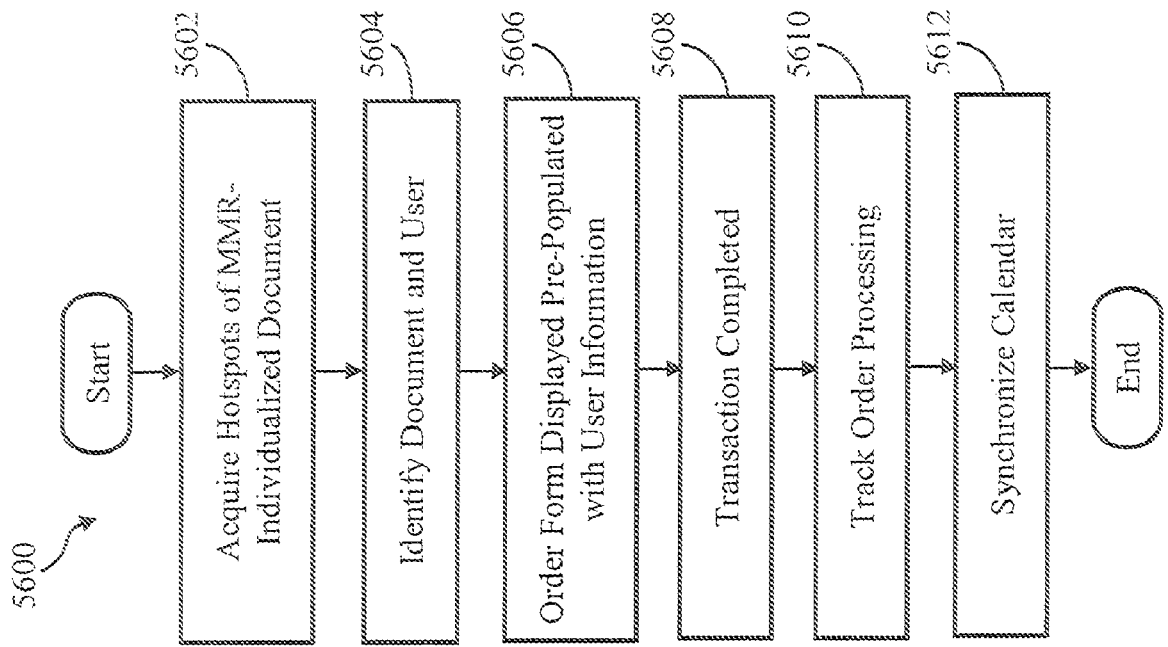
FIG. 56 illustrates a flow diagram of a method for ordering goods or services using MMR-individualized documents.

The capture device 106 can be any one of the capture devices illustrated in FIGS. 1A, 1B, and 2A-2E. For illustration purposes only, the capture device 106 for the application described in FIGS. 55 and 56 is a camera phone that includes both digital camera capabilities as well as cellular telephone capabilities. Note that the third-party software module 228 running on the capture device 106 includes a calendar application such as that included in Microsoft Outlook™ to keep track of various schedules. A user may point the capture device 106 over the MMR-individualized document 5501 over hotspots to scan the hotspot images. For example, the MMR document 5501 is a book catalogue listing a variety of books for an intended user of the catalogue. MMR hotspots identifying the book catalogue itself are included in the catalogue. In addition, hotspot(s) uniquely identifying the user are also included in the catalogue.

The document fingerprint matching module 226 of the capture device 106 (or alternatively on the MMR computer 112) extracts hotspot features from the captured hotspot images. The document fingerprint matching module 226, as further described with reference to FIGS. 6-33, accesses the document indices stored in the document event database 320 and matches the extracted features of the captured image and the indices to identify the particular MMR-individualized document 5501 from a database of documents as well as the user or individual associated with the document. In other words, the identities of the document (catalogue) 5501 and the user associated with the document are confirmed.

The fulfillment house software 5502 includes software applications run by the computers of a fulfillment house 5332. For example, the MMR-individualized document 5501 is a book catalogue and the fulfillment house 5332 is a book company selling books using the book catalogue. The fulfillment house software 5502 includes order processing software 5510 and calendar synchronization software 5512.

Once the document and the associated user are identified, the order processing software 5510 accesses the user information database 5522 to retrieve user information associated with the identified user. User information may include the user's name, address, telephone number, credit card information, and any other information that can be associated with the individual user.

The order processing software 5510 causes an order form (not shown) to be displayed on the display 212 of the capture device 106 remotely through the communication mechanism 104. The order form is displayed using known techniques for causing an application to run on remote devices through the communication mechanism 104, for example using Java™ applets. The capture device 106 can be accessed using known wireless communication techniques using, for example, the telephone number of the camera phone capture device 106. The order processing software 5510 causes the order form to be pre-populated with the user information retrieved from the user information DB 5522 so that the user does not have to enter the user information to complete the order. This allows for a much faster and more convenient purchase experience for the consumer.

Once the order is completed, the purchase order is processed as is typical with any on-line order of goods or services. Typically, order processing information such as expected or actual shipping date and expected or actual delivery date are stored in the shipping information database 5524. The order processing information is stored in the shipping information database 5524 associated with the identified user. The calendar synchronization software 5512 accesses the shipping information database 5524 and retrieves the order processing information. The calendar synchronization software 5512 causes the order processing information to be added to the calendar application 228 running on the capture device 106. If there is any change in the order processing information (such as expected shipping or expected delivery date), the calendar synchronization software 5524 causes the calendar application 228 to be updated and to reflect such change as well. In this manner, the user may effectively track the processing and shipping of his order in real time.

FIG. 56 illustrates a flow diagram of a method 5600 for ordering goods or services using an MMR-individualized document, such as a product or service catalogue embedded with hotspot images identifying the document and the user of the document. Referring to both FIGS. 55 and 56, the capture device 106 captures 5602 hotspot images of the MMR-individualized document 5501. Using the hotspot images, the MMR system 5500 identifies 5604 the particular document and the user associated with the document. The order processing software 5510 remotely causes an order form for goods or services to be displayed 5606 on the capture device 106 through the communication mechanism 104, with the order form pre-populated with the user information retrieved based on the user identity information obtained in step 5604.

The user fills out the order form to complete 5608 the order transaction. The calendar synchronization software 5512 tracks 5610 the processing of the order (e.g., estimated and actual shipping dates or estimated and actual delivery dates), and adds or updates such processing dates to the calendar application 228 running on the identified user's capture device 106 so that the information in the calendar application 228 is synchronized 5612 with the order processing information stored in the shipping information DB 5524.

Although FIGS. 55 and 56 illustrate use of the MMR-individualized document in the context of purchasing goods or services, the MMR-individualized documents may be used for other purposes as well. For example, publishers who want to control illegal distribution of copyrighted materials may embed information (e.g., stenographic codes) of authorized users who have appropriately purchased the copyrighted materials in the printed MMR documents. The embedded user information may be used to identify authorized users, and thus will allow the publishers to track how their documents are used and to potentially identify those who illegally distribute or copy the copyrighted material without permission.

The algorithms presented herein are not inherently related to any particular computer or other apparatus. Various general-purpose and/or special purpose systems may be programmed or otherwise configured in accordance with embodiments of the present invention. Numerous programming languages and/or structures can be used to implement a variety of such systems, as will be apparent in light of this disclosure. Moreover, embodiments of the present invention can operate on or work in conjunction with an information system or network. For example, the invention can operate on a stand alone multifunction printer or a networked printer with functionality varying depending on the configuration. The present invention is capable of operating with any information system from those with minimal functionality to those providing all the functionality disclosed herein.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A computer-implemented method of using a printed document, comprising:
    receiving a captured image of at least a portion of a printed document describing goods or services, the portion including information uniquely identifying the printed document and uniquely identifying a user of the printed document;
    extracting features from the captured image including the information;
    comparing the extracted features with a plurality of indices of mixed media reality documents to identify a particular mixed media reality document;
    retrieving user information associated with the user using the particular mixed media reality document; and
    causing an order form to be displayed on a capture device of the user, the displayed order form pre-populated with the user information.

2. The computer-implemented method of claim 1, wherein the information comprises a printed name of the user.

3. The computer-implemented method of claim 1, wherein the information comprises a printed identification number or a printed bar code corresponding to the user.

4. The computer-implemented method of claim 1, wherein the information comprises text of the printed document having varied appearance that uniquely identifies the user.

5. The computer-implemented method of claim 1, further comprising:
    in response to an order of the goods or services by the identified user, accessing order processing schedule information associated with the order of the goods or services by the identified user; and
    updating a calendar application running on the capture device to reflect the order processing schedule information.

6. Computer readable storage medium comprising computer program code and adapted to perform a computer-implemented method of using a printed document, the method comprising:
    receiving a captured image of at least a portion of a printed document describing goods or services, the portion including information uniquely identifying the printed document and uniquely identifying a user of the printed document;
    extracting features from the captured image including the information;
    comparing the extracted features with a plurality of indices of mixed media reality documents to identify a particular mixed media reality document;
    retrieving user information associated with the user using the particular mixed media reality document; and
    causing an order form to be displayed on a capture device of the user, the displayed order form pre-populated with the user information.

7. The computer program product of claim 6, wherein the information comprises a printed name of the user.

8. The computer program product of claim 6, wherein the information comprises a printed identification number or a bar code corresponding to the user.

9. The computer program product of claim 6, wherein the information comprises text of the printed document having varied appearance that uniquely identifies the user.

10. The computer program product of claim 1, wherein the method farther comprises:
    in response to an order of the goods or services by the identified user, accessing order processing schedule information associated with the order of the goods or services by the identified user; and
    updating a calendar application running on the capture device to reflect the order processing schedule information.

11. A system for using a printed document describing goods or services, comprising:
    a memory for storing computer instructions;
    a storage device storing a plurality of mixed media reality documents; and
    a processor for executing the computer instructions,
    wherein the memory includes:
        a document fingerprint matching module for receiving a captured image of at least a portion of the printed document, the portion including information uniquely identifying the printed document and uniquely identifying a user of the printed document, extracting features from the captured image including the information, and comparing the extracted features with the plurality of mixed media reality documents stored in the storage device to identify a particular mixed media reality document; and
    an order processing module for retrieving user information associated with the user using the particular mixed media reality document and causing an order form to be displayed on a capture device of the user, the displayed order form pre-populated with the user information.

12. The system of claim 11, wherein the information comprises a printed name of the user.

13. The system of claim 11, wherein the information comprises a printed identification number or a bar code corresponding to the user.

14. The system of claim 11, wherein the information comprises text of the printed document having varied appearance that uniquely identifies the user.

15. The system of claim 11, wherein the memory further includes a calendar synchronization module for, in response to an order of the goods or services by the identified user, accessing order processing schedule information associated with the order of the goods or services by the identified user and updating a calendar application running on the capture device to reflect the order processing schedule information.

16. The method of claim 1, wherein the information uniquely identifying the printed document and uniquely identifying the user of the printed document associates the printed document with the particular mixed media reality document.

17. The method of claim 1, farther comprising, printing the printed document, wherein the printing comprises including in the printed document a marking corresponding to the information uniquely identifying the printed document and uniquely identifying the user of the printed document.

18. The computer program product of claim 6, wherein the information uniquely identifying the printed document and uniquely identifying the user of the printed document associates the printed document with the particular mixed media reality document.

19. The computer program product of claim 6, the method farther comprising printing the printed document, wherein the printing comprises including in the printed document a marking corresponding to the information uniquely identifying the printed document and uniquely identifying the user of the printed document.

20. The system of claim 11, wherein the information uniquely identifying the printed document and uniquely identifying the user of the printed document associates the printed document with the particular mixed media reality document.

* * * * *

UNITED STATES PATENT AND TRADEMARK OFFICE
CERTIFICATE OF CORRECTION

| | | |
|---|---|---|
| PATENT NO. | : 7,551,780 B2 | Page 1 of 1 |
| APPLICATION NO. | : 11/461090 | |
| DATED | : June 23, 2009 | |
| INVENTOR(S) | : Geoffrey H. Nudd et al. | |

It is certified that error appears in the above-identified patent and that said Letters Patent is hereby corrected as shown below:

Title Pg, Item (56)

In the "References Cited" section, under "U.S. Patent Documents," please add U.S. Patent No. 5,392,447.

In column 74, line 1, after "claim 1," please insert --further--.

Signed and Sealed this

Tenth Day of November, 2009

David J. Kappos
*Director of the United States Patent and Trademark Office*